(12) United States Patent
Merrill et al.

(10) Patent No.: US 10,350,818 B2
(45) Date of Patent: Jul. 16, 2019

(54) HEAT SETTING OPTICAL FILMS

(71) Applicant: 3M INNOVATIVE PROPERTIES COMPANY, St. Paul, MN (US)

(72) Inventors: William W. Merrill, Mahtomedi, MN (US); Timothy J. Hebrink, Scandia, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 821 days.

(21) Appl. No.: 14/682,622

(22) Filed: Apr. 9, 2015

(65) Prior Publication Data
US 2015/0210023 A1 Jul. 30, 2015

Related U.S. Application Data

(62) Division of application No. 13/647,048, filed on Oct. 8, 2012, which is a division of application No.
(Continued)

(51) Int. Cl.
| | |
|---|---|
| *B29C 55/08* | (2006.01) |
| *G02B 5/30* | (2006.01) |
| *C08G 63/181* | (2006.01) |
| *B29C 55/06* | (2006.01) |
| *B29D 11/00* | (2006.01) |
| *C08J 5/18* | (2006.01) |
| *G02B 1/08* | (2006.01) |

(Continued)

(52) U.S. Cl.
CPC .............. *B29C 55/08* (2013.01); *B29C 55/06* (2013.01); *B29C 55/085* (2013.01); *B29D 11/00644* (2013.01); *C08G 63/181* (2013.01);

*C08J 5/18* (2013.01); *G02B 5/3083* (2013.01); *B29C 35/0277* (2013.01); *B29K 2067/003* (2013.01); *B29K 2069/00* (2013.01); *B29K 2995/0034* (2013.01); *B29K 2995/0051* (2013.01); *C08J 2367/03* (2013.01)

(58) Field of Classification Search
CPC ....... B29C 55/06; B29C 55/08; B29C 55/143; B29C 55/146
USPC .......................................... 264/210.5, 210.7
See application file for complete search history.

(56) References Cited

U.S. PATENT DOCUMENTS

| | | |
|---|---|---|
| 2,473,404 A | 6/1949 | Young |
| 2,618,012 A | 11/1952 | Milne |

(Continued)

FOREIGN PATENT DOCUMENTS

| | | |
|---|---|---|
| CN | 1101603 | 4/1995 |
| CN | 1576890 | 2/2005 |

(Continued)

OTHER PUBLICATIONS

U.S. Appl. No. 60/294,940, entitled "Processes and Apparatus for Making Transversely Drawn Films with Substantially Uniaxial Character", Merrill et al., filed May 31, 2001.
(Continued)

*Primary Examiner* — Atul P. Khare
(74) *Attorney, Agent, or Firm* — Robert S. Moshrefzadeh

(57) ABSTRACT

A method of making an optical film includes providing a film, substantially uniaxially orienting the film, and heat setting the oriented film. The film includes a polymeric material capable of developing birefringence.

26 Claims, 19 Drawing Sheets

Related U.S. Application Data

12/555,421, filed on Sep. 8, 2009, which is a division of application No. 11/397,992, filed on Apr. 5, 2006.

(60) Provisional application No. 60/669,865, filed on Apr. 8, 2005.

(51) Int. Cl.
*B29C 35/02* (2006.01)
*B29K 67/00* (2006.01)
*B29K 69/00* (2006.01)

(56) References Cited

U.S. PATENT DOCUMENTS

| | | |
|---|---|---|
| 2,823,421 A | 2/1958 | Scarlett |
| 2,998,772 A | 9/1961 | Land |
| 3,055,048 A | 9/1962 | Koppehele |
| 3,078,504 A | 2/1963 | Koppehele |
| 3,110,927 A | 11/1963 | Koppehele et al. |
| 3,142,108 A | 7/1964 | Gageur |
| 3,150,433 A | 9/1964 | Kampf |
| 3,172,150 A | 3/1965 | Dornier |
| 3,193,873 A | 7/1965 | Weinand |
| 3,296,351 A | 1/1967 | Rasmussen |
| 3,502,766 A | 3/1970 | Tsuruta et al. |
| 3,577,586 A | 5/1971 | Kalwaites et al. |
| 3,807,004 A | 4/1974 | Andersen |
| 3,816,584 A | 6/1974 | Schmidt |
| 3,890,421 A | 6/1975 | Habozit |
| 4,134,957 A | 1/1979 | Yoshimura et al. |
| 4,330,499 A | 5/1982 | von und zu Aufsess et al. |
| 4,349,500 A | 9/1982 | Yazawa et al. |
| 4,434,128 A | 2/1984 | Okada et al. |
| 4,525,317 A | 6/1985 | Okada et al. |
| 4,577,586 A | 3/1986 | Morris et al. |
| 4,732,799 A | 3/1988 | Sakamoto et al. |
| 4,853,602 A | 8/1989 | Hommes et al. |
| 4,862,564 A | 9/1989 | Kwack |
| 5,000,806 A | 3/1991 | Merkatoris et al. |
| 5,043,036 A | 8/1991 | Swenson |
| 5,072,493 A | 12/1991 | Hommes et al. |
| 5,125,334 A | 6/1992 | Marx et al. |
| 5,188,930 A * | 2/1993 | Funaki ................. G03C 1/795 156/308.8 |
| 5,296,080 A | 3/1994 | Merkatoris et al. |
| 5,517,737 A | 5/1996 | Viltro et al. |
| 5,560,793 A | 10/1996 | Ruscher et al. |
| 5,587,276 A * | 12/1996 | Katoh ................... G03C 1/061 430/265 |
| 5,699,188 A | 12/1997 | Gilbert et al. |
| 5,717,737 A | 2/1998 | Doviak et al. |
| 5,771,547 A | 6/1998 | Hommes et al. |
| 5,783,120 A | 7/1998 | Ouderkirk et al. |
| 5,825,543 A | 10/1998 | Ouderkirk et al. |
| 5,826,314 A | 10/1998 | Aihara et al. |
| 5,867,316 A | 2/1999 | Carlson et al. |
| 5,882,574 A | 3/1999 | Geisinger |
| 5,882,774 A | 3/1999 | Jonza et al. |
| 5,885,501 A | 3/1999 | Gardner et al. |
| 5,912,063 A | 6/1999 | Osawa et al. |
| 5,962,114 A | 10/1999 | Jonza et al. |
| 5,965,247 A | 10/1999 | Jonza et al. |
| 6,022,612 A * | 2/2000 | Wilkie ................. B32B 27/32 428/215 |
| 6,045,894 A * | 4/2000 | Jonza ................... B32B 27/36 428/141 |
| 6,057,961 A | 5/2000 | Allen et al. |
| 6,096,375 A | 8/2000 | Ouderkirk et al. |
| 6,111,696 A | 8/2000 | Allen et al. |
| 6,113,811 A | 9/2000 | Kausch et al. |
| 6,179,948 B1 | 1/2001 | Merrill et al. |
| 6,297,906 B1 | 10/2001 | Allen |
| 6,368,699 B1 | 4/2002 | Gilbert et al. |
| 6,447,899 B1 | 9/2002 | Dutton |
| 6,449,093 B2 | 9/2002 | Hebrink et al. |
| 6,590,705 B1 | 7/2003 | Allen et al. |
| 6,609,795 B2 | 8/2003 | Weber et al. |
| 6,654,170 B1 | 11/2003 | Merrill et al. |
| 6,673,425 B1 | 1/2004 | Hebrink et al. |
| 6,788,463 B2 | 9/2004 | Merrill et al. |
| 6,829,071 B2 | 12/2004 | Allen et al. |
| 6,916,440 B2 | 7/2005 | Jackson et al. |
| 6,926,410 B2 | 8/2005 | Weber et al. |
| 6,936,209 B2 | 8/2005 | Jackson et al. |
| 6,939,499 B2 | 9/2005 | Merrill et al. |
| 6,949,212 B2 | 12/2005 | Merrill et al. |
| 7,104,776 B2 | 9/2006 | Merrill et al. |
| 7,153,122 B2 | 12/2006 | Jackson et al. |
| 7,153,123 B2 | 12/2006 | Jackson et al. |
| 7,213,958 B2 | 5/2007 | Ouderkirk et al. |
| 7,229,271 B2 | 6/2007 | Merrill et al. |
| 7,316,558 B2 | 1/2008 | Merrill et al. |
| 7,357,555 B2 | 4/2008 | Ouderkirk et al. |
| 2002/0154406 A1 * | 10/2002 | Merrill ................. B32B 7/02 359/489.15 |
| 2002/0180107 A1 * | 12/2002 | Jackson ................ B29C 55/08 264/288.4 |
| 2002/0190406 A1 | 12/2002 | Merrill |
| 2003/0035972 A1 | 2/2003 | Hanson |
| 2003/0072931 A1 * | 4/2003 | Hebrink ............... B32B 7/02 428/212 |
| 2003/0148131 A1 | 8/2003 | Tsunekawa et al. |
| 2004/0032658 A1 * | 2/2004 | Fleming ............... B32B 17/10 359/489.15 |
| 2004/0043205 A1 * | 3/2004 | Jonza .................. B29C 55/023 428/212 |
| 2004/0099992 A1 | 5/2004 | Merrill et al. |
| 2004/0227994 A1 | 11/2004 | Ma |
| 2005/0019530 A1 | 1/2005 | Merrill et al. |
| 2006/0141220 A1 | 6/2006 | Merrill et al. |
| 2006/0226561 A1 | 10/2006 | Johnson et al. |
| 2006/0226562 A1 | 10/2006 | Jackson et al. |
| 2006/0228559 A1 | 10/2006 | Denker |
| 2007/0098829 A1 | 5/2007 | Jackson et al. |
| 2007/0116793 A1 | 5/2007 | Jackson et al. |
| 2007/0134364 A1 | 6/2007 | Jackson et al. |
| 2012/0068371 A1 | 3/2012 | Merrill |
| 2012/0105957 A1 | 5/2012 | Merrill |

FOREIGN PATENT DOCUMENTS

| | | |
|---|---|---|
| DE | 1 206 575 | 12/1965 |
| DE | 1 259 558 | 1/1968 |
| EP | 0 225 630 | 12/1986 |
| EP | 0 236 171 | 9/1987 |
| EP | 0 337 316 | 10/1989 |
| EP | 0 778 477 | 6/1996 |
| EP | 0 969 699 | 1/2000 |
| EP | 1 078 285 | 2/2001 |
| EP | 1 164 817 | 12/2001 |
| EP | 1517163 A1 | 3/2005 |
| JP | 41-13634 | 7/1941 |
| JP | 50-080367 | 6/1975 |
| JP | 55-077530 | 6/1980 |
| JP | 56-49223 | 5/1981 |
| JP | 59-185630 | 10/1984 |
| JP | 61-227019 | 10/1986 |
| JP | 62-134244 | 6/1987 |
| JP | 03-284934 | 11/1987 |
| JP | 62-263023 | 11/1987 |
| JP | 62-268629 | 11/1987 |
| JP | 02-89006 | 3/1990 |
| JP | 03-124426 | 5/1991 |
| JP | 03-182701 | 8/1991 |
| JP | 03-275332 | 12/1991 |
| JP | 04-029827 | 1/1992 |
| JP | 05-241021 | 2/1992 |
| JP | 05-288931 | 4/1992 |
| JP | 05-288932 | 4/1992 |
| JP | 05-011113 | 1/1993 |
| JP | 05-011114 | 1/1993 |
| JP | 05-150115 | 1/1993 |

(56) References Cited

FOREIGN PATENT DOCUMENTS

| | | |
|---|---|---|
| JP | 06-027321 | 2/1994 |
| JP | 06-034815 | 2/1994 |
| JP | 06-043321 | 2/1994 |
| JP | 06-051116 | 2/1994 |
| JP | 06-051119 | 2/1994 |
| JP | 08-108467 | 4/1996 |
| JP | 11-006905 | 1/1999 |
| JP | 2000-162419 | 6/2000 |
| JP | 2002-178398 | 6/2002 |
| WO | WO 95/17303 | 6/1995 |
| WO | WO 96/19347 | 6/1996 |
| WO | WO 97/032224 | 9/1997 |
| WO | WO 99/36248 | 7/1999 |
| WO | WO 99/36812 | 7/1999 |
| WO | WO 00/07046 | 2/2000 |
| WO | WO 00/29197 | 5/2000 |
| WO | WO 01/33598 | 5/2001 |
| WO | WO 2003/022575 | 3/2003 |
| WO | WO 2004/050331 | 6/2004 |
| WO | WO 2006/107970 | 10/2006 |

OTHER PUBLICATIONS

U.S. Appl. No. 60/669,865, entitled "Heat Setting Optical Films", Merrill et al., filed Apr. 8, 2005.
U.S. Appl. No. 60/668,944, entitled "Diffuse Reflective Polarizing Films with Orientable Polymer Blends", Johnson et al., filed Apr. 6, 2005.
Ito et al., Two-Stage Drawing of Poly(Ethylene 2,6-Naphthalate), 1992, Journal of Applied Polymer Science, vol. 46, pp. 1013-1023.
Sperling, "Interpenetrating Polymer Networks: An Overview," Chapter, 1, *Interpenetrating Polymer Networks*, 1994, pp. 3-38.
Sperling, "Microphase Structure," *Encyclopedia of Polymer Science and Engineering*, 2nd Ed., vol. 9, 760-788, 1987.
Weber, Michael F., et al., "Giant Birefringent Optics in Multilayer Polymer Mirrors," *Science*, vol. 287, pp. 2451-2456 (Mar. 31, 2000).

\* cited by examiner

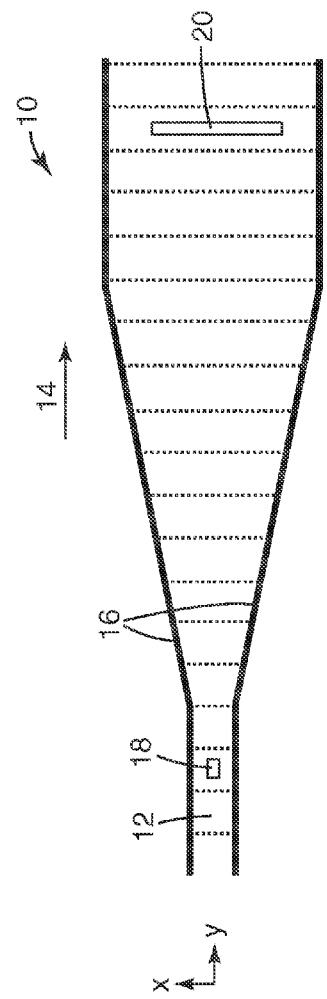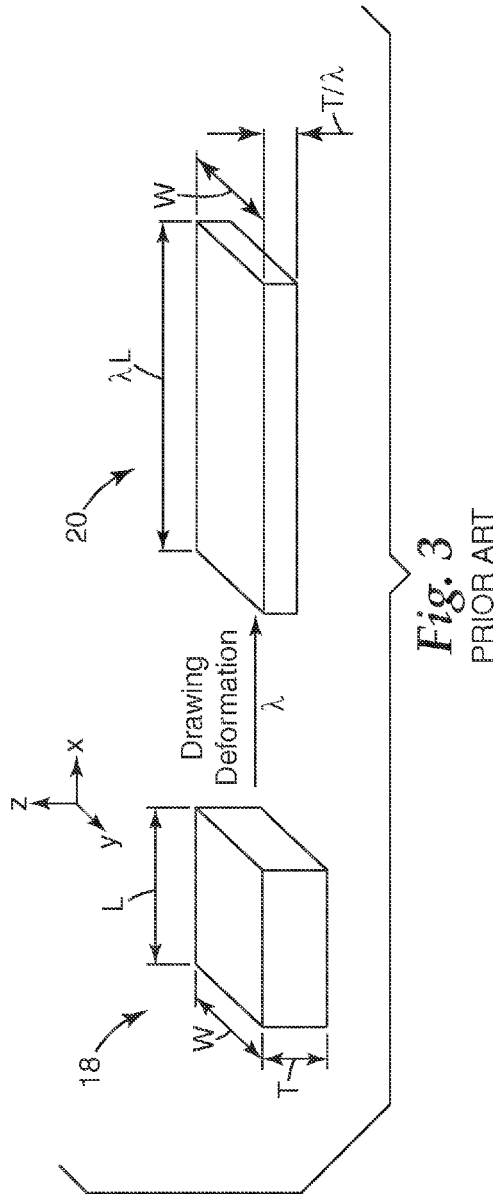
Fig. 2
PRIOR ART
Fig. 3
PRIOR ART

HEAT SETTING OPTICAL FILMS

TECHNICAL FIELD

The present disclosure relates to heat setting processes for making optical films, as well as films made by these processes.

BACKGROUND

Typically, an optical film that functions as a linear polarizer includes an in-plane block state ("x" direction) and in-plane pass state ("y" direction) for light normally incident to the plane of the film. Thus, light normally incident with a linear polarization state aligned with the x direction is maximally blocked (i.e. minimally transmitted) and light normally incident with a linear polarization state aligned with the y direction is minimally blocked (i.e. maximally transmitted). Light incident off-normal has intermediate levels of transmittance as a function of its alignment relative to the film. The axis normal to the plane of the film is referred to as the "z" direction.

SUMMARY

The present disclosure describes a method of making an optical film that includes providing a film, substantially uniaxially orienting the film, and heat setting the oriented film. The film includes a polymeric material capable of developing birefringence.

The details of one or more embodiments of the present disclosure are set forth in the accompanying drawings and the description below. Other features, objects, and advantages of the present disclosure will be apparent from the description and drawings, and from the claims.

BRIEF DESCRIPTION OF DRAWINGS

FIG. 2 is a schematic top view of a prior art tenter apparatus used to stretch film;

FIG. 3 is a perspective view of a portion of film in the prior art process depicted in FIG. 2 both before and after the stretching process;

Figure 1:
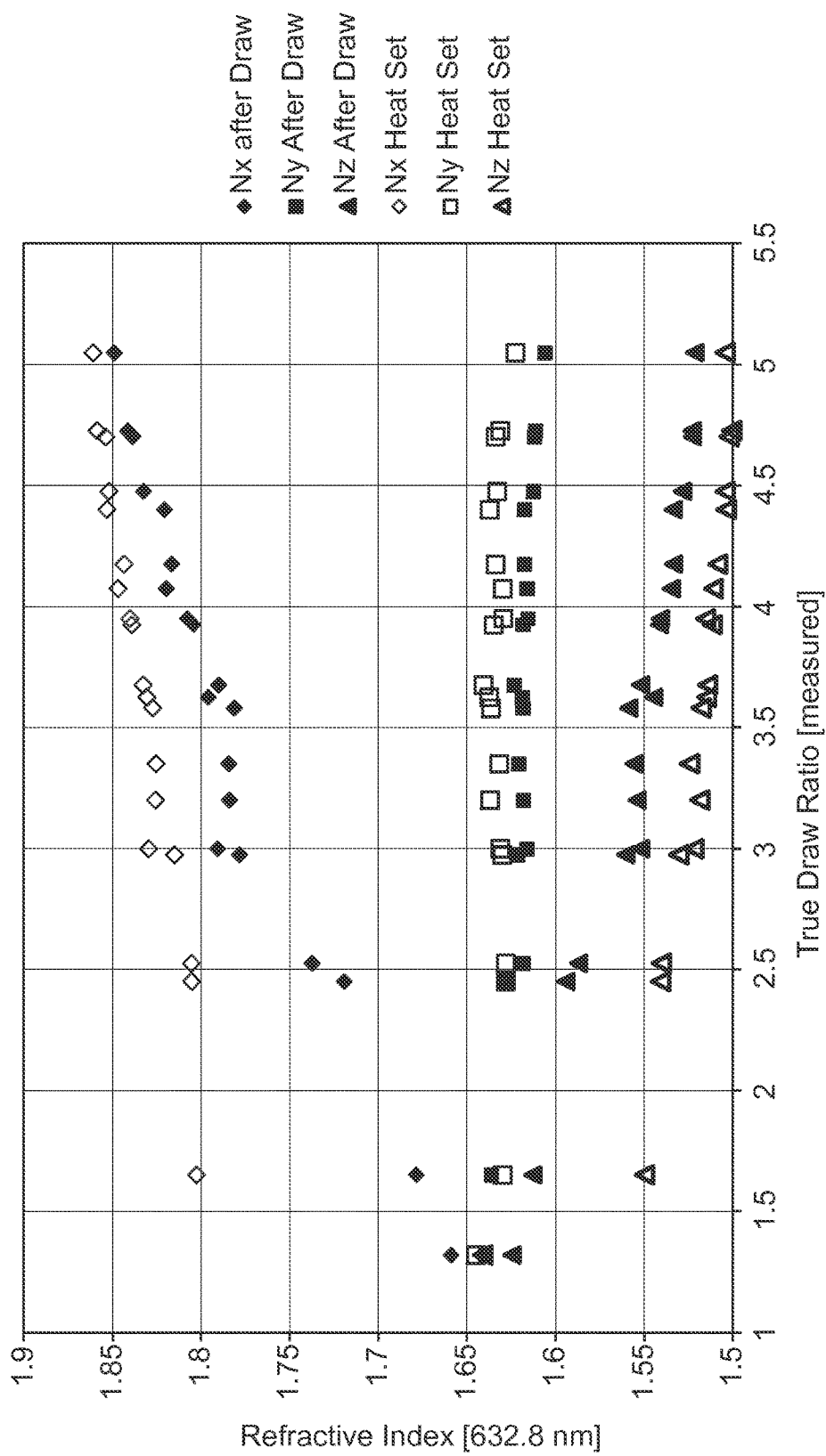
FIG. 1 is a plot of principal refractive index trends for PEN.

While the above-identified drawing figures set forth several exemplary embodiments of the disclosure, other embodiments are also contemplated. This disclosure presents illustrative embodiments of the present invention by way of representation and not limitation. Numerous other modifications and embodiments can be devised by those skilled in the art which fall within the scope and spirit of the principles of the present disclosure. The drawing figures are not drawn to scale.

Moreover, while embodiments and components are referred to by the designations "first," "second," "third," etc., it is to be understood that these descriptions are bestowed for convenience of and do not imply an order of p. The designations are presented merely to distinguish between different embodiments for purposes of clarity.

Unless otherwise indicated, all numbers expressing feature sizes, amounts, and physical properties used in the specification and claims are to be understood as being modified in all instances by the term "about." Accordingly, unless indicated to the contrary, the numbers set forth are approximations that can vary depending upon the desired properties using the teachings disclosed herein.

DETAILED DESCRIPTION

Many optical films used in polarizer or polarizing film applications suffer from an asymmetry, e.g. a refractive index difference, between "y" and "z" principal directions. For example, off-axis color, that is, color variations in the pass state as a function of off-normal angle of incidence, can be amplified or created by a mismatch between the y and z refractive indices, ny and nz, respectively, (Here, nx is the refractive index for light polarized along the x direction.).

An illustration of the space of typical refractive index sets (nx, ny, nz), for a film or a layer of film consisting of 2,6 polyethylene napthalate (PEN), is provided in FIG. 1. The development of the refractive index set as a function of draw ratio at an illustrative stretch temperature of 130° C. is exemplified by the data with the solid markings. The films were stretched in a laboratory scale stretching device from initially unoriented cast samples. The samples were stretched in one in-plane direction while constraining the film in the other in-plane direction at selected gripping points along the edge, with a nominal initial rate of 20%/sec using a stretch profile that increased the nominal draw ratio linearly in time. The true final draw ratio was measured using fiducial line markings marked upon the sample across the location where the refractive indices were measured. For illustration purposes, the refractive index was measured at 632.8 nm using a Metricon Prism Coupler (available from Metricon, Picataway N.J.), the red light source provided by He—Ne laser.

FIG. 2 illustrates a conventional tenter stretching process 10 that stretches film 12 transversely to the direction of film travel 14. Film 12 may be continuously fed or introduced as a non-continuous portion of film 12. The film travel direction is referred to as the machine direction (MD), and the stretch direction is referred to as the transverse or tenter direction (TD). The film 12 is gripped at both edges 16 by some gripping apparatus, typically an arrangement of tenter clips (not shown in FIG. 2). The tenter clips can be connected to tenter chains that ride along linearly diverging tenter tracks or rails. This arrangement propels the film forward in a machine direction 14 of film travel and stretches the film 12 in the transverse direction. Thus an initial, unoriented portion 18 in the film may be stretched into a final, oriented portion 20 in one example. As shown in FIG. 3, the unoriented portion 18 of the film shown in FIG. 2 may have dimensions T (thickness), W (width) and L (length). After the film is stretched by a factor of λ, the dimensions of that portion of film have changed to those shown on portion 20.

While the data of FIG. 1 derive from a batch stretching device with discontinuous edge grips both along the x and y directions, these data exemplify a typical film stretched in the conventional tenter process of FIG. 2: one-directional stretching, in which the film 12 is stretched in a first in-plane principal direction (x) while the second in-plane direction (y) is maintained at constant or nearly constant draw ratio, e.g., the y direction draw ratio is nearly unity. In one embodiment, the continuous film is fed at a constant rate into a transversely stretching device and exits the device at the same constant rate.

FIG. 1 demonstrates the asymmetry in the refractive indices, e.g. the differences in the ny and nz, that develops due to the asymmetric treatment of the stretch on the material in the y and z directions. In this illustrated case, the draw ratio remains nearly constant in y while the draw ratio in z decreases with increasing draw ratio in x (e.g. as required by near volume conservation as weakly adjusted due to densification with crystallization).

When the film is heat set following the stretching process, the asymmetry is further increased. This situation is exemplified by the open markers in FIG. 1. In this case, the film was heat set for 2 minutes at 175° C.

FIG. 1 shows that the nx and ny values tend to increase under these heat setting conditions, while the nz values drop, for samples stretched above a critical draw ratio level for the given stretch temperature and rate (or equivalently, for a given level of initial refractive index development).

Figure 4:
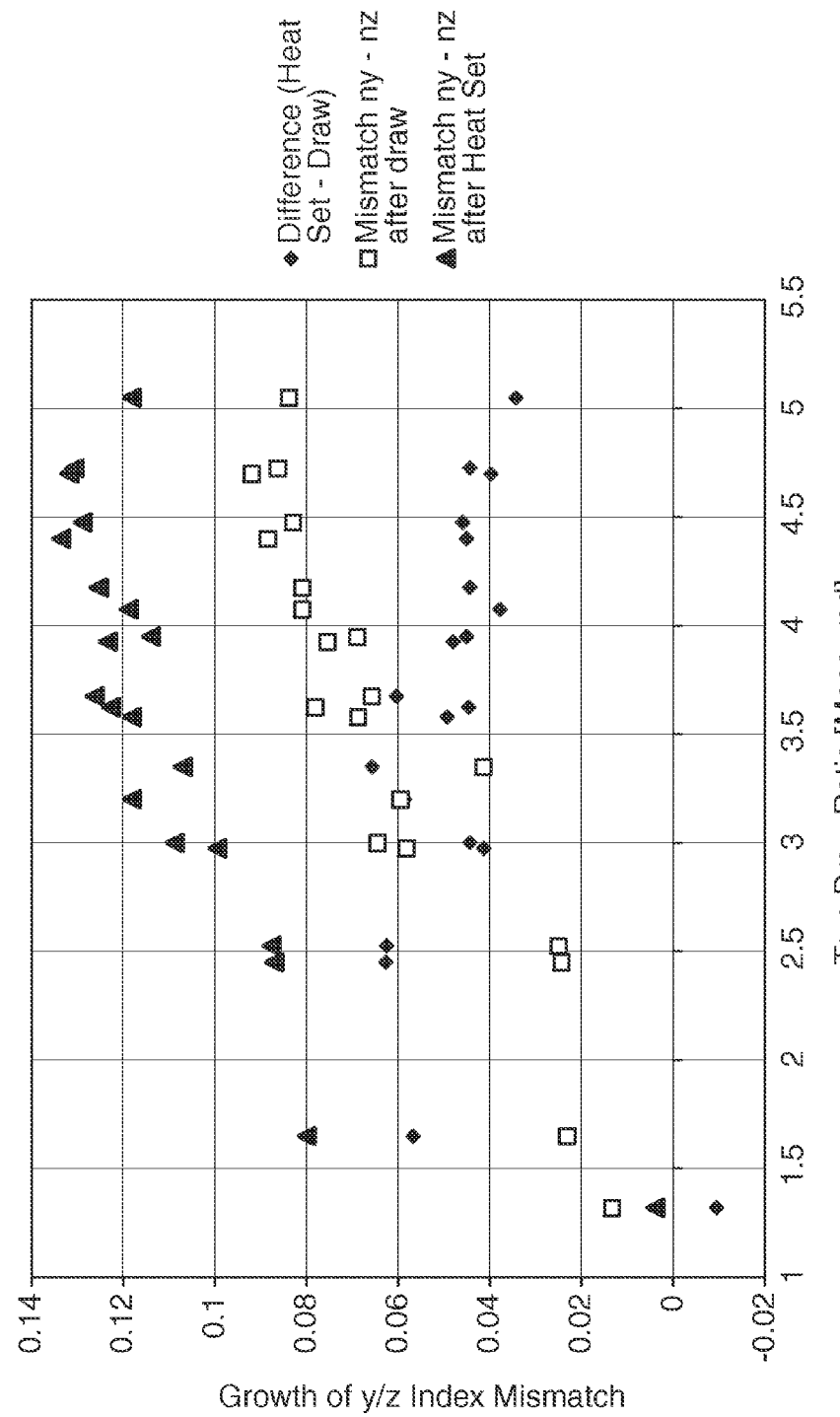
FIG. 4 is a plot of asymmetric index growth upon heat setting in PEN.

FIG. 4 further illustrates how heat setting increases the differences between the ny and nz refractive indices. The square markers indicate the index difference after stretch without heat setting whereas the triangular markers indicate the index difference after the stretching and heat setting. The offset increase in asymmetry is nearly constant, with a small decreasing slope with increasing x draw ratio, as depicted by the diamond markers. Therefore, when y/z "asymmetric" films, e.g. films with significant differences in ny and nz immediately following stretch, such as those stretched in a conventional tenter (FIGS. 2-3), are heat set following the stretching step, the asymmetry in refractive index increases. Such a difference in the refractive indices in the y & z directions can lead to an undesirable color effect in some applications.

Figure 5:
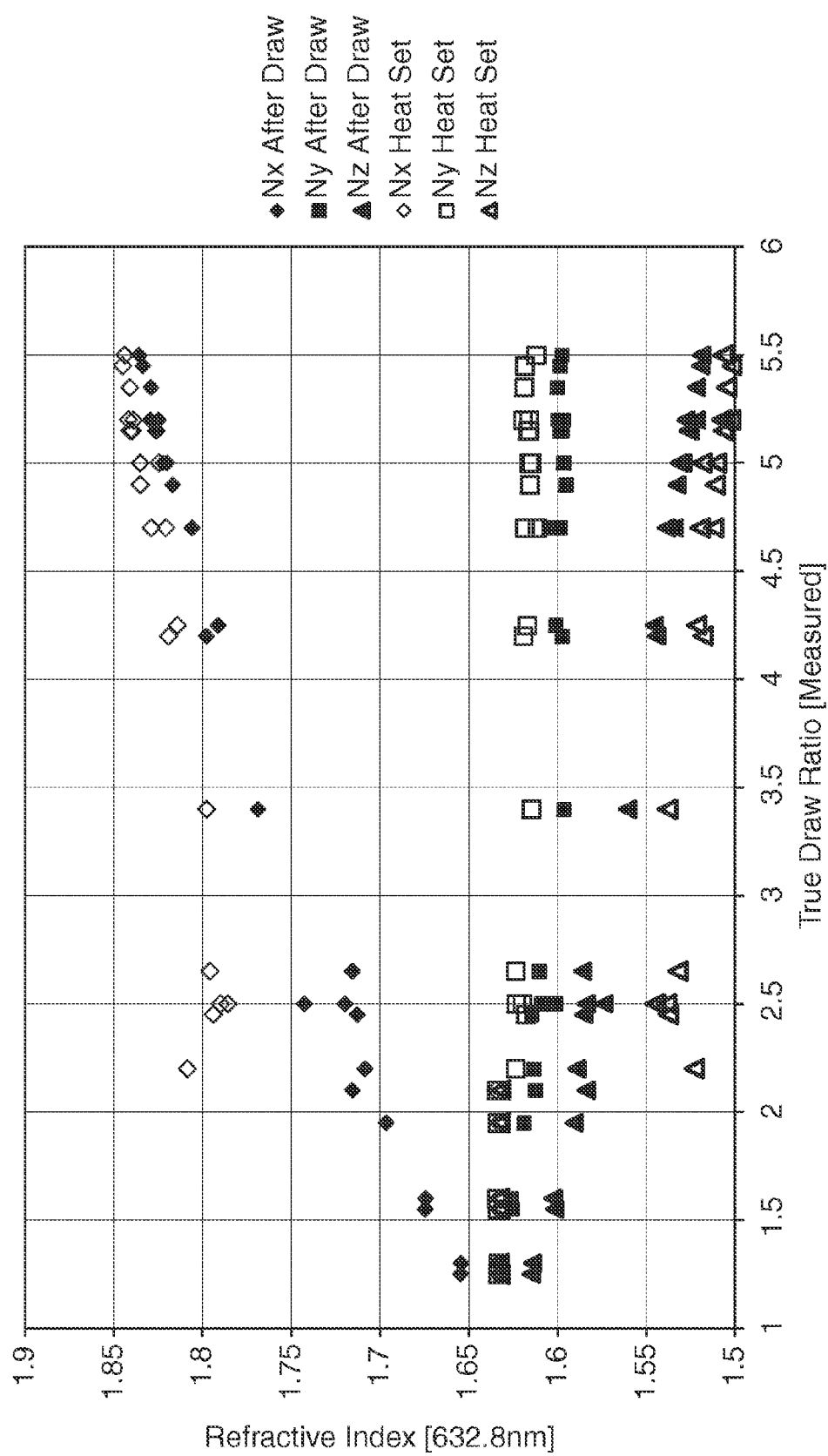
FIG. 5 is a plot of principal refractive index trends for CoPEN.

The general trends shown in FIGS. 1 and 4 are applicable to a variety of polyesters. Of particular interest are PEN, polyethylene terephthalate (PET) and copolymers of intermediate composition. FIG. 5 illustrates the case of 85/15 mole percent mixture of PEN-like and PET-like moieties in the co-polymer, a so-called "85/15 coPEN." The term "PEN-like" moiety includes block copolymers of PEN. The term "PET-like" moiety includes block copolymers of PET. The methods of stretch are nearly identical to those of the PEN in FIG. 1, except the stretch temperature was set at 120° C.

As shown in FIG. 5, in some embodiments, heat, setting allows one to achieve a given refractive index at a different draw ratio than without heat setting. For example, if one desires an nx of about 1.8, one could either use a 4.5 draw ratio or use a lower 2.5 draw ratio and then heat set the film; both processes lead to nx equal to about 1.8. As another example, if one desires an nz of about 1.54, one could either use a 4.25 draw ratio or use a lower 2.5 draw ratio and then heat set the film; both processes lead to nz equal to about 1.54.

Figure 6:
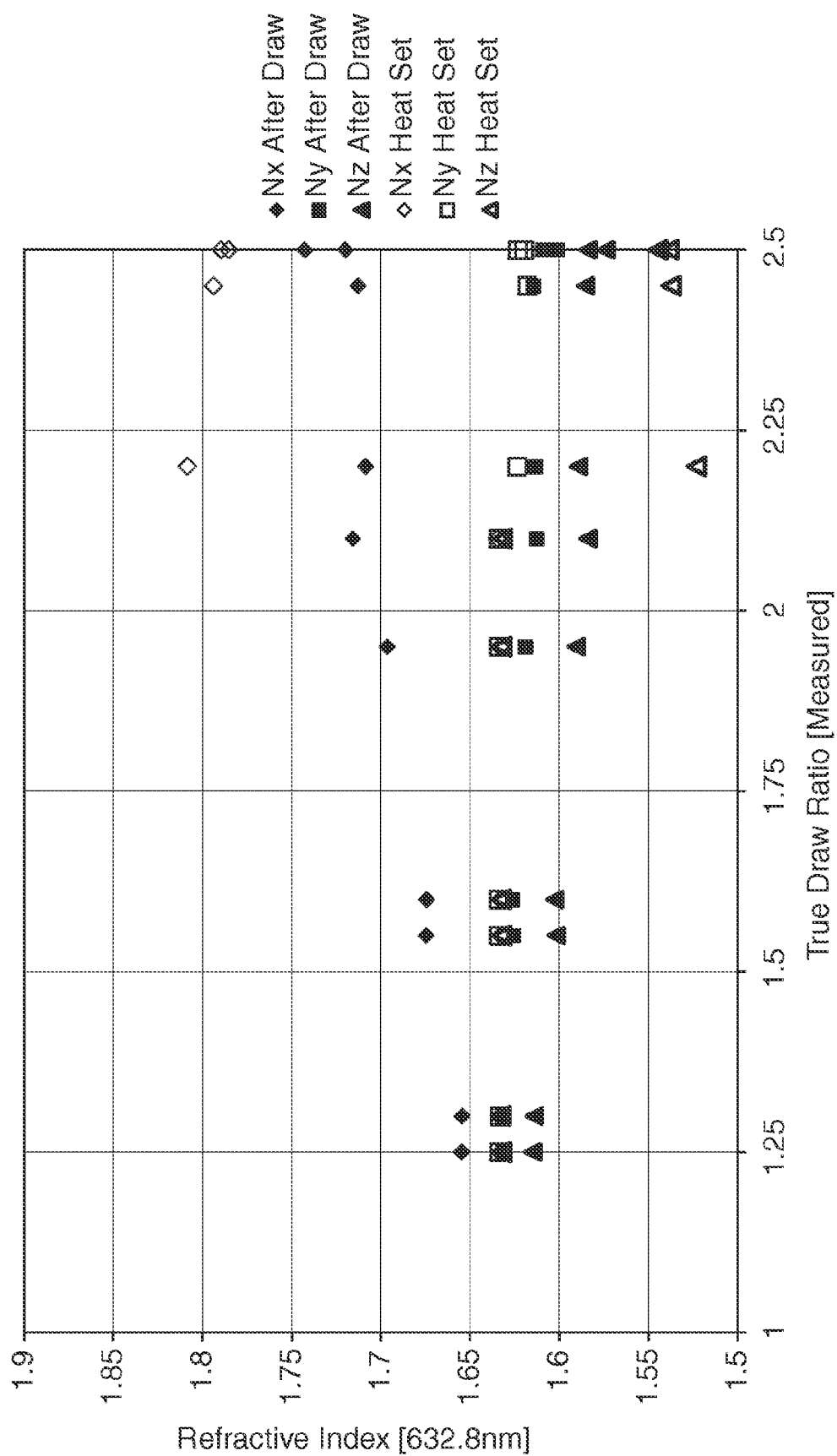
FIG. 6 is a plot of principal refractive index trends for CoPEN.

Under the conditions of FIG. 5, the effective point of significant strain-induced crystallization is at an x draw ratio of about 2.2. FIG. 6 illustrates the sharpness of this transition, with materials stretched to an x draw ratio of about 2.1 exhibiting relaxation to isotropy after heat setting. Below an x draw ratio of about 2.1, nx=ny=nz after heat setting. Above an x draw ratio of about 2.2, index development leads to a result of nx>ny>nz after heat setting. This point will shift in different examples, depending on factors such as the selected materials and processing conditions.

Use of a parabolic tenter (discussed with to FIG. 10, below) can lead to uniaxial stretching at relatively high draw ratios in some embodiments. Use of other machines and processes can lead to uniaxial stretching at lower draw ratios, but the resulting film may lack the desired level of refractive index development. Heat setting can be used to achieve the desired level of index development, as discussed with to FIGS. 5 and 6. In some cases, lower draw ratios are used with certain films, such as films including microstructures, because higher draw ratios could damage the microstructures. In these and other cases, heat setting can also be used to promote refractive index development in the stretched films.

Commonly owned U.S. Pat. Nos. 6,939,499; 6,916,440; 6,949,212; and 6,936,209; incorporated herein by reference, describe continuous processes for processing optical films, such as multilayer optical films. In such processes, the optical film is oriented by stretching along a first in-plane axis of the film (x direction) while allowing contraction of the film in the second in-plane axis (y or machine direction (MD)) and in the thickness (z or normal direction (ND)) of the film. The stretching is achieved by grasping edge portions of the film and moving the edge portions of the film along predetermined paths that diverge to create substantially similar proportional dimensional changes in the second in-plane axis of the film (y) and in the thickness direction (z) of the film.

In exemplary embodiments, in contrast to the heat set behavior of conventional one-direction stretched materials, which have significant differences in ny and nz immediately following stretching, the heat setting of substantially uniaxially stretched films, in which contraction is allowed in the y and z directions to minimize differences in ny and nz, has a completely different effect. Heat setting following a substantially uniaxial stretching process maintains or decreases any small existing refractive index asymmetry of these films. Thus, where the refractive indices in the y & z directions become more equal, fewer problems with undesirable color effects arise.

The heat setting procedures described below may be applied following any process that provides substantially uniaxial stretching of an optical film such as, for example, a multilayer optical film (MOF). The heat setting procedures described in this disclosure are particularly useful for substantially uniaxially stretched films including one or more polyester layers.

Figure 7:
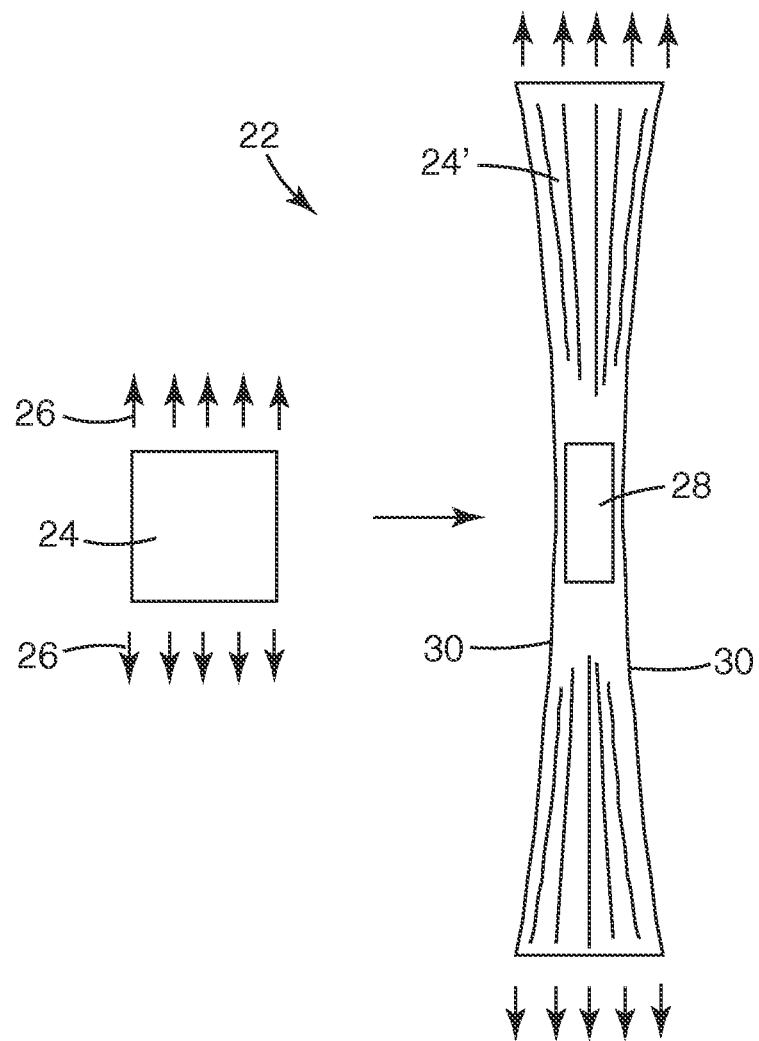
FIG. 7 is a schematic illustration of a prior art batch process for drawing a multilayer optical film showing the film both before and after the stretch.

FIG. 7 illustrates a batch technique 22 for substantially uniaxially stretching an optical film such as, for example, a multilayer optical film, suitable for use as a component in an optical body such as a polarizer. The film 24 is stretched in the direction of the arrows 26, and the central portion 28 necks down so that two edges 30 of the film 24' are no longer parallel after the stretching process. The central portion 28 of the film 24' provides the most useful optical properties because it is far enough removed from the shear boundary conditions to experience low levels of shear aberrations such as caliper variation.

While the batch process described in FIG. 7 may in some cases provide suitable film properties, the substantially uniaxial stretching processes described in commonly owned U.S. Pat. Nos. 6,939,499; 6,916,440; 6,949,212; and 6,936,209; all incorporated herein by reference, are particularly suitable in some embodiments.

Figure 8:
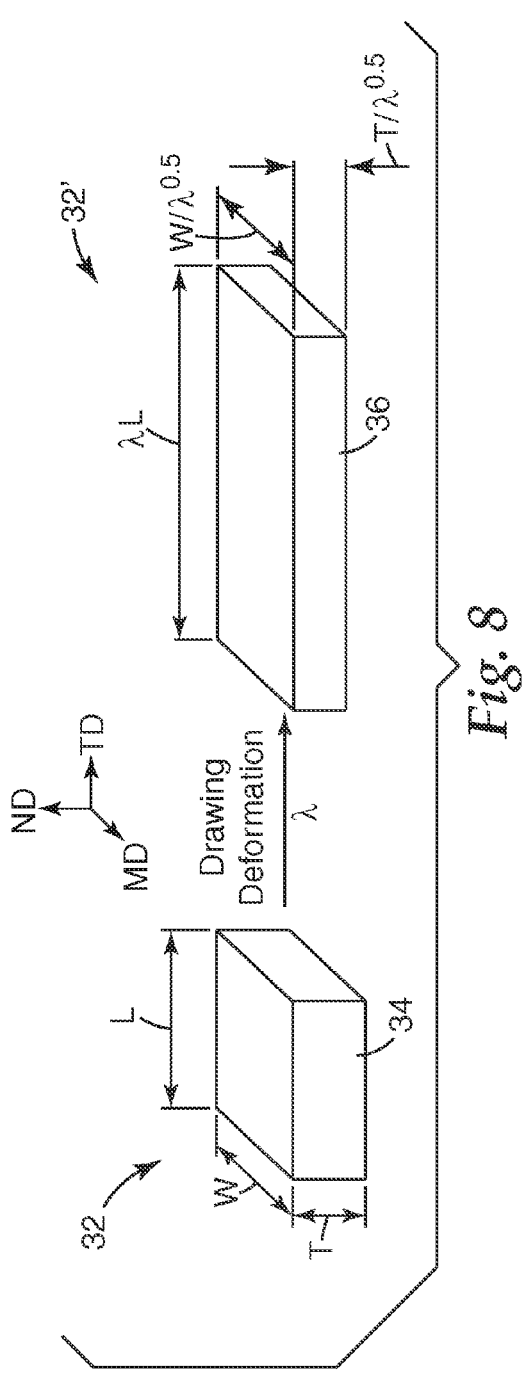
FIG. 8 is a schematic illustration of the stretching process according to one embodiment of the present disclosure.

In general, uniaxial orientation of a birefringent polymer provides an optical film (or layer of a film) in which the index of refraction in two of three orthogonal directions is substantially the same (for example, the width (W) and thickness (T) direction of a film, as illustrated in FIG. 8). The index of refraction in the third direction (for example, along the length (L) direction of the film) is different from the indices of refraction in the other two directions. Typically, perfect uniaxial orientation is not required and some degree of deviation from the optimal conditions can be allowed depending on a variety of factors including the end-use application of the optical film. Moreover, it should be understood that while the present disclosure refers to three "orthogonal directions," the corresponding directions may not be exactly orthogonal due to non-uniformities in the film.

Figure 10:
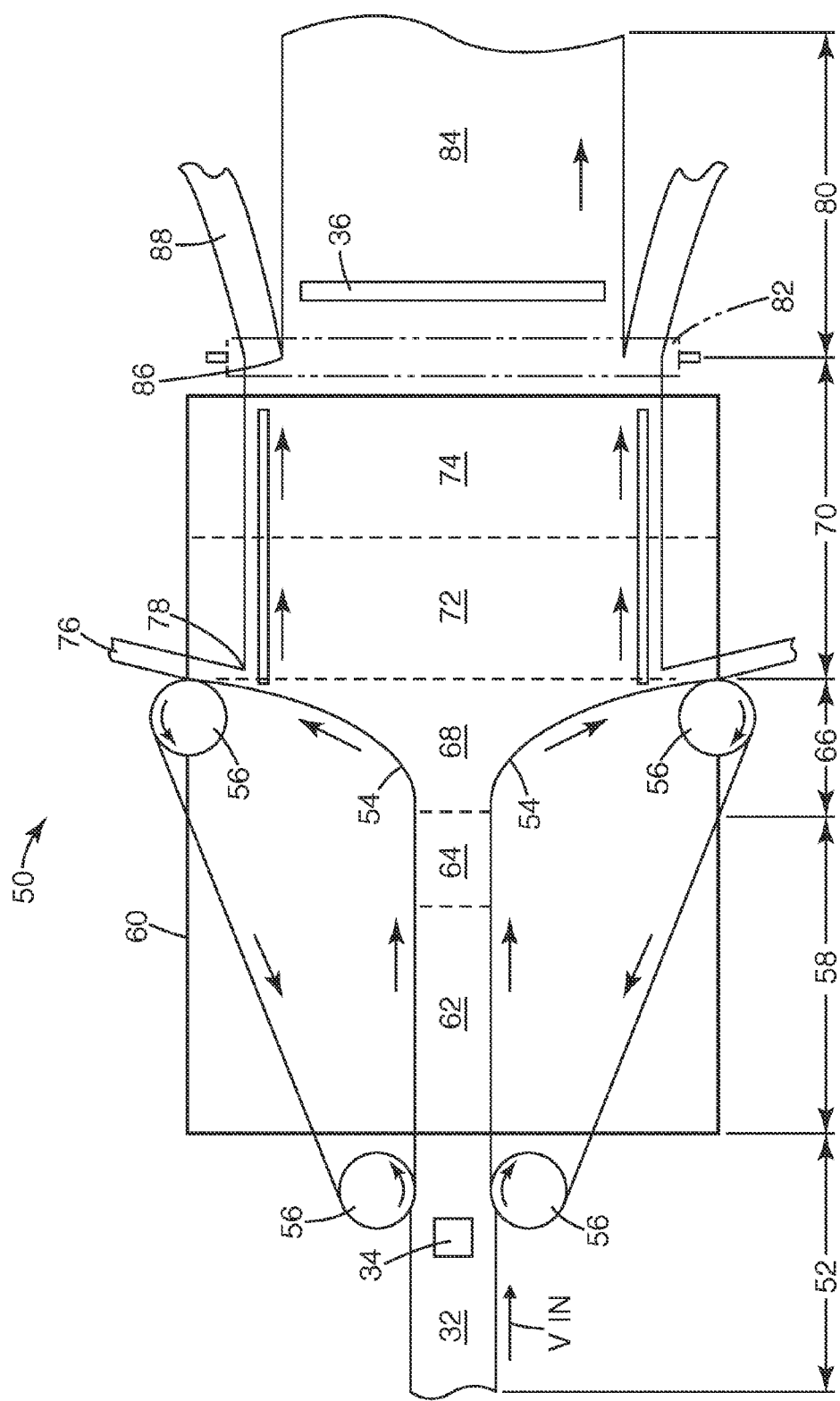
FIG. 10 is a schematic top view of a portion of a stretching apparatus.

In general, the substantially uniaxial stretching process includes stretching a film that can be described with reference to three mutually orthogonal axes corresponding to the machine direction (MD), the transverse direction (TD), and the normal direction (ND). These axes correspond to the width, length, and thickness of the film, as illustrated in FIG. 8. A substantially uniaxial stretching process stretches film 32 from an initial configuration 34 to a final configuration 36. The machine direction (MD) is the general direction along which the film travels through a stretching device, for example, the apparatus as illustrated in FIG. 10. The transverse direction (TD) is the second axis within the plane of the film and is orthogonal to the machine direction. The normal direction (ND) is orthogonal to both MD and TD and corresponds generally to the thickness dimension of the polymer film.

Figure 9:
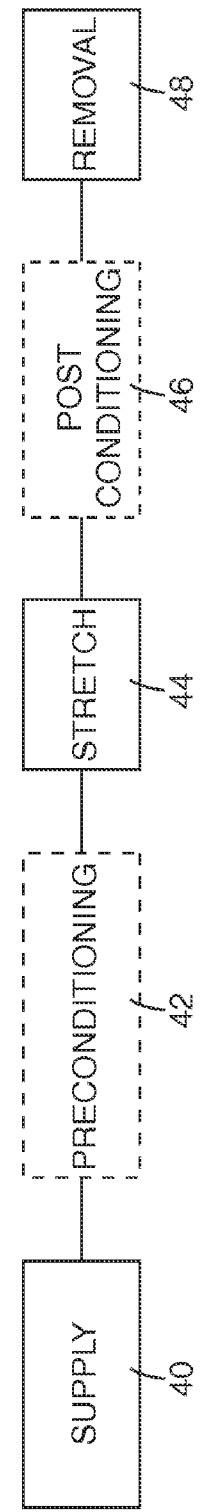
FIG. 9 is a block diagram showing process steps according to an embodiment of the present disclosure.

FIG. 9 is a block diagram of a typical substantially uniaxial stretching process 38 as described in this disclosure. In step 40, a film is supplied or provided to a stretching apparatus. The process optionally includes a preconditioning step 42. The film is stretched in step 44. The film is post-conditioned in step 46. The film is removed from the stretching apparatus in step 48.

FIG. 10 illustrates one embodiment of a substantially uniaxial stretching process and an apparatus 50 for achieving the substantially uniaxial stretch. This process may be used with the heat setting procedures described in this disclosure. It will be recognized that the process illustrated by FIG. 9 can be accomplished using one or more apparatuses apart from a stretching apparatus (which at a minimum performs step 44 of FIG. 9). These one or more additional apparatuses may perform one or more of the functions (for example, functions represented by steps 40, 42, 46 and 48 illustrated in FIG. 9.

In the illustrated embodiment of FIG. 10, the apparatus 50 includes a region 52 where the film 32 is introduced into the stretching apparatus 50. The film 32 can be provided by any desirable method. For example, the film 32 can be produced in a roll or other form and then provided to stretching apparatus 50. As another example, the stretching apparatus 50 can be configured to receive the film 32 from an extruder (if, for example, the film 32 is generated by extrusion and ready for stretching after extrusion) or a coater (if, for example, the film 32 is generated by coating or is ready for stretching after receiving one or more coated layers) or a laminator (if, for example the film 32 is generated by lamination or is ready for stretching after receiving one or more laminated layers).

Generally, the film 32 is presented in region 52 to one or more gripping members that hold opposing edges of the film and convey the film along opposing tracks 54 defining conveyance paths. The gripping members (see FIG. 12, for example) typically hold the film 32 at or near the edges of the film 32. The portions of the film 32 held by the gripping members are often unsuitable for use after stretching, so the position of the gripping members is typically selected to provide sufficient grip on the film 32 to permit stretching while controlling the amount of waste material generated by the process.

Gripping members, such as clips, can be directed along the track 54 by, for example, rollers 56 rotating a chain along the track 54 with the gripping members coupled to the chain. The rollers 56 are connected to a driver mechanism that controls the speed and direction of the film 32 as it is conveyed through the stretching apparatus 50. Rollers 56 can also be used to rotate and control the speed of belt-type gripping members. The belts and rollers 56 optionally include interlocking teeth to reduce or prevent slippage between the belt and roller 56.

The apparatus 50 optionally includes a preconditioning region 58 that in one embodiment is enclosed by an oven 60 or other apparatus or arrangement to heat the film 32 in preparation for stretching. The preconditioning region 58 can include a preheating zone 62, a heat soak zone 64, or both. In at least some embodiments, there may be a small amount of film stretching that occurs in order to set the contact between the gripping members and the film, as illustrated by the boundary trajectory of FIG. 13. In at least some instances, there may not actually be any stretching but the increase in separation between the opposing tracks may account, at least in part, for thermal expansion of the film 32 as the film 32 is heated.

The film 32 is stretched in the primary stretching region 66. Typically, within the primary stretching region 66 the film zone undergoing stretching 68 is heated or maintained in a heated environment above the glass transition of the polymer(s) of the film 68. For polyesters, the temperature range is typically between about 80° C. and about 160° C. Examples of suitable heating elements include convective and radiative heating elements, although other heating elements can also be used. In some embodiments, the heating elements used to heat the film 32 can be controlled individually or in groups to provide a variable amount of heat. Such control can be maintained by a variety of processes including those that allow for variability in the temperature of the heating elements or in the direction or speed of air directed from the heating element to the film 68. The control of the heating elements can be used, if desired, to variably heat regions of the film 68 to improve or otherwise alter uniformity of stretching across the film 68. For example, areas of the film 68 that do not stretch as much as other areas under uniform heating can be heated more to allow easier stretching.

Within the primary stretching region 66, the gripping members follow generally diverging tracks 54 to stretch the polymer film 68 by a desired amount. The tracks 54 in the primary stretching region 66 and in other regions of the apparatus 50 can be formed using a variety of structures and materials. Outside of the primary stretching region 66, the tracks 54 are typically substantially linear. The opposing linear tracks 54 can be parallel or can be arranged to be converging or diverging. Within the primary stretching region 66, the tracks 54 are generally diverging and are generally curvilinear. In some exemplary embodiments, the generally curvilinear shapes of the tracks may be approximated using linear track segments.

In one example, the apparatus 50 typically includes a post-conditioning region 70. For example, the film 32 may be heat set in zone 72 and quenched in zone 74. The film 32 is quenched when all components reach a temperature level below their glass transition temperatures. In some other embodiments, quenching is performed outside the stretching apparatus 50.

In the embodiment illustrated in FIG. 10, a takeaway system is used to remove the film 32 from the primary stretching region 66. In the illustrated embodiment, this takeaway system is independent of (i.e., not directly connected to) the tracks 54 upon which the film 32 was conveyed through the primary stretching region 66.

For the purposes of this disclosure, the term heat set refers to a heating protocol in which the film 32 is heated following orientation to enhance film properties such as, for example, crystal growth, dimensional stability, and/or overall optical performance. The heat setting is a function of both temperature and time, and factors must be considered such as, for example, commercially useful line speed and heat transfer properties of the film, as well as the optical clarity of the final product. In an exemplary embodiment, the heat setting process involves heating the film 32 to above the glass transition temperature (Tg) of at least one polymeric component thereof, and preferably above the Tg of all polymeric components thereof. Exemplary polymeric materials include PEN, PET, coPENS, polypropylene and syndiotactic polystyrene. In one embodiment of the heat setting process, the film 32 is heated above the stretch temperature of the film 32, although this is not required. In another embodiment, in the heat setting process the film 32 is heated to a temperature between the Tg and the melting point of the film 32.

In general, there is an optimal temperature for the rate of crystallization that results from a balance of the kinetic and thermodynamics of the system. This temperature is useful when minimization of the heat set time is a primary consideration. A typical starting point for tuning the conditions to find the best balance between the various product and process considerations is about halfway between the Tg and the melting point of the film 32. For example, the glass transition temperatures for PET and PEN are approximately 80° C. and 120° C., respectively, under dry conditions. The glass transition temperatures of copolymers of intermediate compositions of PET and PEN (so-called "coPENs") are intermediate between those of the homopolymers. The melting points cover a range of temperatures due to the range of imperfections in the physical crystals due to their size and constraints. A rough estimate for the melting points of PET and PEN is about 260° C. for PET and about 270° C. for PEN. The melting points of the so-called coPENs are typically less than those of the homopolymers and can be measured approximately, for example by Differential Scanning Calorimetry (DSC).

Thus, the starting point range for heat setting in PET and PEN is, for example, between about 170 and 195° C. Actual process setpoints depend on residence times and heat transfer within a given process. Residence times may range from about 1 second to about 10 minutes and depend not only on process conditions but also the desired final effect, for example, the amount of crystallinity, the increase in delamination resistance, and optimization of haze given other properties. Minimizing the residence time is often useful for considerations such as minimizing equipment size. Higher temperatures may reduce the required time to attain a certain level of crystallinity. However, higher temperatures also may cause melting of imperfect crystalline structures that may then re-form into larger structures. This may produce unwanted haze for some applications.

In one embodiment, the portions of the film that were held by the gripping members through the primary stretching region 66 are removed. To maintain a substantially uniaxial stretch throughout substantially all of the stretch history (as shown in FIG. 10), at the end of the transverse stretch, the rapidly diverging edge portions 76 are preferably severed from the stretched film 68 at a slitting point 78. A cut can be made at 78 and flash or unusable portions 76 can be discarded.

In one embodiment, the process also includes a removal region 80. Optionally a roller 82 is used to advance the film, but this may be eliminated. In one embodiment, the roller 82 is not used as it would contact the final film 84 with the attendant potential to damage the final film 84. In one embodiment, another cut 86 is made and unused portion 88 is discarded.

The removal region 80 may also include an optional isolation zone (not shown in FIG. 10) in which the film temperature is controlled to reduce and/or eliminate undesirable film properties such as bowing. In the isolation zone, the film may be wound onto a roll, but winding is not required. Following removal from the optional isolation zone, the film may optionally be coated or laminated, or subjected to processing to impart a surface texture or surface structures.

In one embodiment, direct converting to a finished product takes place after take-away. In another embodiment, film 84 leaving the take-away system is typically wound on rolls for later use. In one example, the film 84 may be unwound and transferred to an optional second heating unit (not shown in FIG. 10). In the second heating unit, the film 84 may be gripped and placed under tension as needed to prevent wrinkling. This process typically takes place at a temperature below the original stretch temperature applied in the stretching zone 66. The second heating unit may simply be an oven where the film 84 may be placed in roll or sheet form to enhance its properties. For example, a second heat soak procedure may be applied in the second heating zone in which the film 84 is heated to a temperature below the Tg of at least one film component, preferably below the Tg of all film components. Again, the second heat soak is typically performed below the initial stretch temperature applied to the film 84 in the stretching zone 66. The second heat soak may continue for an extended period such as, for example, hours or days, until the desired film properties such as shrinkage resistance, or creep resistance are achieved. For example, heat soak, for PET is typically performed at about 50-75° C. for several hours to days, while heat soak for PEN is typically performed at about 60-115° C. for several hours to days. Heat soaking can also be achieved in part under some post-processing activities. For example, the film 84 may be coated and dried or cured in an oven with some heat soaking effect.

Following the second heating zone, the film 84 may optionally be transferred to a second quench and/or set zone (not shown in FIG. 10). In the second quench and/or set zone, the film 84 may be placed under tension and/or toed-in along converging rails to control shrinkage and warping. Following the optional second quench and/or set zone, the film may be re-rolled.

Figure 11:
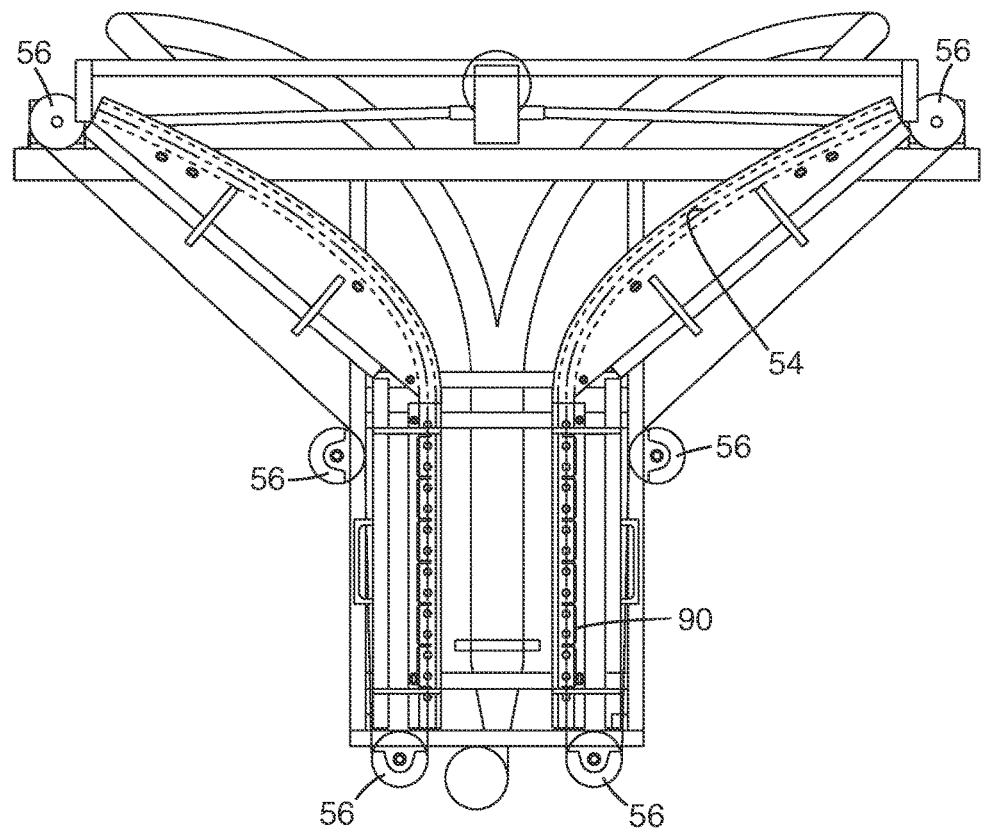
FIG. 11 is a top view of a portion of the apparatus of FIG. 10.
Figure 12:
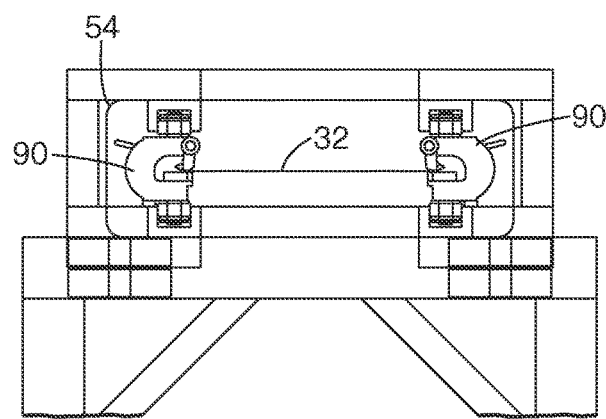
FIG. 12 illustrates an end view of an arrangement of gripping members that may be used in the apparatus of FIG. 10.

FIGS. 11-12 illustrate one embodiment of the gripping members and track. One example of suitable gripping members 90 includes a series of clips that sequentially grip the film 32 between opposing surfaces and then travel around a track 54. The gripping members can nest or ride in a groove or a channel along the track 54. Another example is a belt system that holds the film 32 between opposing belts or treads, or a series of belts or treads, and directs the film 32 along the track 54. Belts and treads can, if desired, provide a flexible and continuous, or semi-continuous, film conveyance mechanism. A variety of opposing, multiple belt methods are described, for example, in U.S. Pat. No. 5,517,737 and in European Patent Application Publication No. 0236171 A1 (the entire contents of each of which are herein incorporated by ). The tension of the belts is optionally adjustable to obtain a desired level of gripping.

A belt or clip can be made of any material. For example, a belt can be of composite construction. One example of a suitable belt includes an inner layer made of metal, such as steel, to support high tension and an outer layer of elastomer to provide good gripping. Other belts can also be used. In some embodiments, the belt includes discontinuous tread to provide good gripping.

Other methods of gripping and conveying the film through a stretcher are known and may be used. In some embodiments, different portions of the stretching apparatus can use different types of gripping members 90.

The gripping members 90 of the embodiment illustrated in FIGS. 11 and 12 are a series of tenter clips. These clips can afford overall flexibility via segmentation. The discrete clips are typically closely packed and attached to a flexible structure such as a chain. The flexible structure rides along or in channels along the track 54. Strategically placed cams and cam surfaces open and close the tenter clips at desired points. The clip and chain assembly optionally rides on wheels or bearings or the like. In one example, the gripping members 90 are tenter clips mounted on top and bottom bearings roiling between two pairs of inner and outer rails. These rails form, at least in part, the track 54.

The edges of the gripping members 90 define a boundary edge for the portion of the film 32 that will be stretched. The motion of the gripping members 90 along the tracks 54 provides a boundary trajectory that is, at least in part, responsible for the motion and stretching of the film 32. Other effects (e.g., downweb tension and take-up devices) may account for other portions of the motion and stretching. The boundary trajectory is typically more easily identified from the track 54 or rail along which the gripping members 90 travel. For example, the effective edge of the center of the gripping member 90, e.g. a tenter clip, can be aligned to trace the same path as a surface of the track 54 or rail. This surface then coincides with the boundary trajectory. In practice, the effective edge of the gripping members 90 can be somewhat obscured by slight film slippage from or flow out from under the gripping members 90, but these deviations can be made small.

In addition, for gripping members 90 such as tenter clips the length of the edge face can influence the actual boundary trajectory. Smaller clips will in general provide better approximations to the boundary trajectories and smaller stretching fluctuations. In at least some embodiments, the length of a clip face edge is no more than about one-half the total initial distance between the opposing boundary trajectories or tracks. In a particularly suitable embodiment, the length of a clip face edge is no more than about ¼ the total initial distance between the opposing boundary trajectories or tracks.

The two opposing tracks 54 are optionally disposed on two separate or separable platforms or are otherwise configured to allow the distance between the opposing tracks 54 to be adjustable. This can be particularly useful if different sizes of film 32 are to be stretched by the apparatus 50 or if there is a desire to vary the stretching configuration in the primary stretching region 66, as discussed below. Separation or variation between the opposing tracks 54 can be performed manually, mechanically (for example, using a computer or other device to control a driver that can alter the separation distance between the tracks 54), or both.

Since the film 32 is held by two sets of opposing gripping members 90 mounted on opposing tracks 54, there are two opposing boundary trajectories. In at least some embodiments, these trajectories are mirror images about an MD center line of the stretching film 32. In other embodiments, the opposing tracks 54 are not mirror images. Such a non-mirror image arrangement can be useful in providing a variation (for example, a gradient or rotation of principal axes) in one or more optical or physical properties across the film 32.

Figure 13:
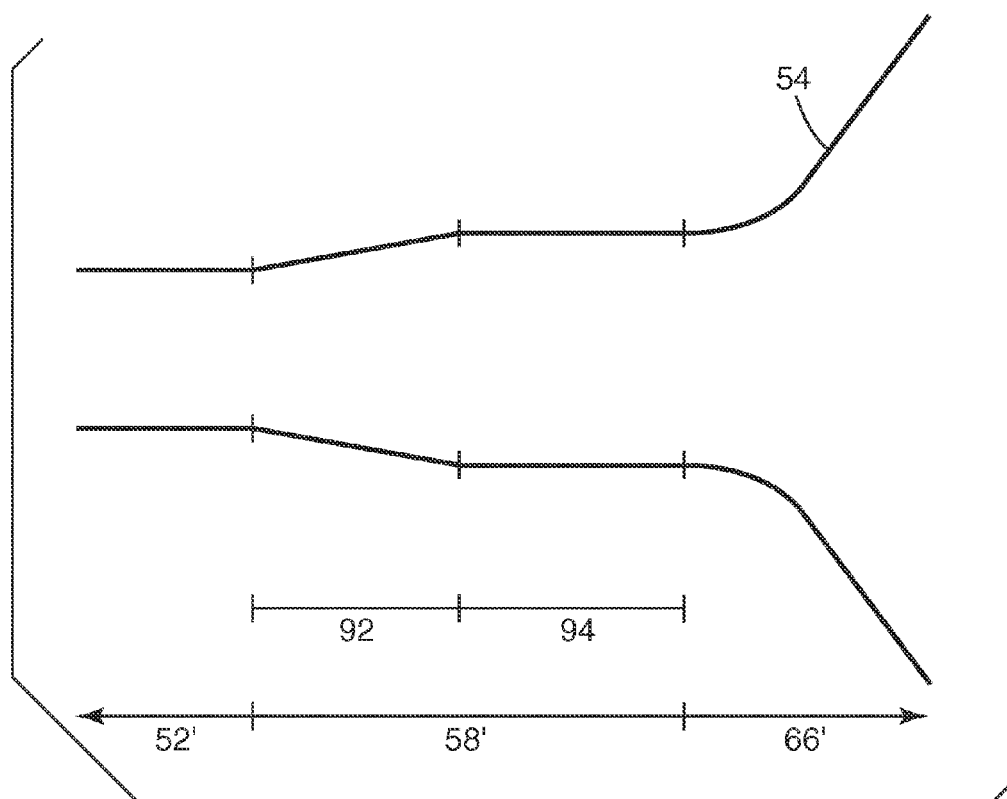
FIG. 13 is a schematic illustration of a portion of the tracks illustrating one embodiment of a stretching apparatus.

FIG. 13 illustrates one embodiment of a supply region 52 followed by a preconditioning region 58 and primary stretching region 66. Within the preconditioning region 58 (or optionally in the supply region 52) a gripping member set zone 92 is provided in which the tracks 54 diverge slightly to set the gripping members 90 (for example, tenter clips) on the film 32. The film 32 is optionally heated within this zone 92. In one embodiment, this initial TD stretch is no more than about 5% of the final TD stretch and generally less than about 2% of the final TD stretch and often less than about 1% of the final TD stretch. In some embodiments, the zone 92 in which this initial stretch occurs is followed by a zone 94 in which the tracks 54 are substantially parallel and the film 32 is heated or maintained at an elevated temperature.

In all regions of the stretching apparatus 50, the tracks 54 can be formed using a series of linear or curvilinear segments that are optionally coupled together. The tracks 54 can be made using segments that allow two or more (or even all) of the individual regions to be separated (for example, for maintenance or construction). As an alternative or in particular regions or groups of regions, the tracks 54 can be formed as a single continuous construction. The tracks 54 can include a continuous construction spanning one or more adjacent regions 52, 58, 66, 70, 80 of the stretcher 50. The tracks 54 can have any combination of continuous constructions and individual segments.

In some embodiments, the tracks 54 in the primary stretching region 66 are coupled to, but separable from, the tracks 54 of the preceding regions. In some embodiments, the tracks in the succeeding post-conditioning or removal regions 70, 80 are typically separated from the tracks 54 of the primary stretching region 66, as illustrated, for example, in FIGS. 22-27.

Although the tracks in the primary stretching region 66 are curvilinear in FIG. 10, linear track segments can also be used in some embodiments. In one embodiment, these segments are aligned (by, for example, pivoting individual linear segments about an axis) with respect to each other to produce a linear approximation to a desired curvilinear track configuration. Generally, the shorter the linear segments are, the better the curvilinear approximation can be made. In some embodiments, the positions of one or more, and preferably all, of the linear segments are adjustable (pivotable about an axis) so that the shape of the tracks 54 can be adjusted if desired. Adjustment can be manual or the adjustment can be performed mechanically, such as under control of a computer or other device coupled to a driver. It will be understood that curvilinear segments can be used instead of or in addition to linear segments.

Continuous tracks 54 can also be used through each of the regions 52, 58, 66, 70, 80. In particular, a continuous, curvilinear track 54 can be used through the primary stretching region 66. The continuous, curvilinear track 54 typically includes at least one continuous rail that defines the track 54 along which the gripping members 90 run. In one embodiment, the curvilinear track 54 includes two pairs of inner and outer rails with tenter clips mounted on top and bottom bearings rolling between the four rails.

Figure 14:
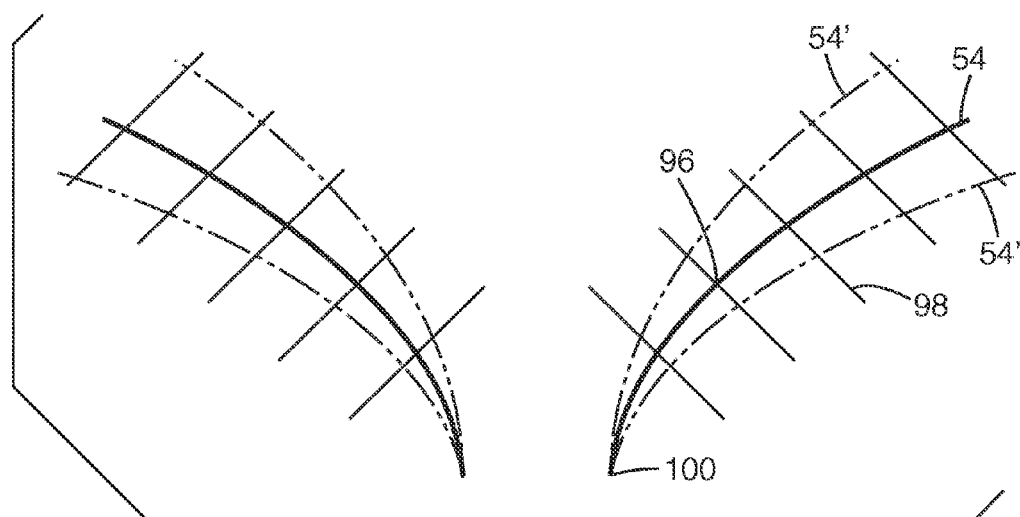
FIG. 14 is a schematic illustration of one embodiment of adjustable tracks for a primary stretching region of a stretching apparatus.

In some embodiments, the continuous track 54 is adjustable. One method of making an adjustable continuous track 54 includes the use of one or more track shape control units. These track shape control units are coupled to a portion of the continuous track 54, such as the continuous rail, and are configured to apply a force to the track 54 as required to bend the track 54. FIG. 14 schematically illustrates one embodiment of such an arrangement with the track shape control units 96 coupled to the track 54. Generally, the track shape control units 96 have a range of forces that, the track shape control unit 96 can apply, although some embodiments may be limited to control units 96 that are either on or off.

The track shape control units 96 can typically apply a force toward the center of the film 32 or apply a force away from the center of the film 32 or, preferably, both. The track shape control units 96 can be coupled to a particular point on the adjustable continuous track 54 or the track shape control units 96 can be configured so that the track 54 can slide laterally along the control unit 96 while still maintaining coupling between the track 54 and control unit 96. This arrangement can facilitate a larger range of motion because it allows the track 54 to more freely adjust, as the control units 96 are activated. Generally, the track shape control units 96 allow the track 54 to move through a range of shapes that, deviate from the equilibrium shape of the track 54, for example, shapes 54 and 54' of FIG. 14. The equilibrium and the adjusted shapes of the tracks may be linear or curvilinear. Typically, the track shape control unit 96 and the track 54 can move along a line (or other geometric shape) of motion 98. When more than one track shape control unit 96 is used, the track shape control units 96 can have the same or similar lines of motion and ranges of motion 98 or the lines and ranges of motions 98 for the individual track shape control units 96 can be different.

In some embodiments, one or more points 100 of the track are fixed. The fixed points 100 can be anywhere along the track 54 including at or near the start (as illustrated in FIG. 14) or end of the primary stretching region 66. The fixed points 100 can also be positioned at other points along the track 54 as illustrated in FIG. 18.

Figure 15:
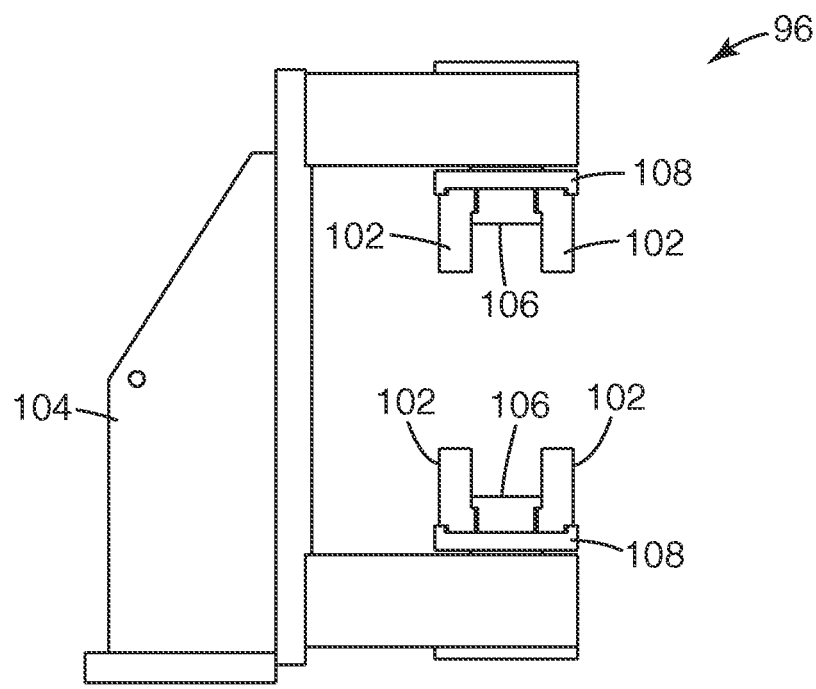
FIG. 15 is a schematic side cross-sectional view of one embodiment of tracks and a track shape control unit for a stretching apparatus.

One example of a suitable track shape control unit 96 and track 54 is illustrated in FIG. 15. The track 54 in this embodiment includes four rails 102 with tenter clips (not shown) mounted on bearings (not shown) rolling between the four rails 102. The track shape control unit 96 includes a base 104 that is coupled to a driver (not shown), top and bottom inner contact members 106, and top and bottom outer contact members 108. The inner and outer contact members 106, 108 are coupled to the base 104 so that moving the base 104 allows the contact members 106, 108 to apply a force to inner and outer surfaces of the rails 102, respectively.

Figure 16:
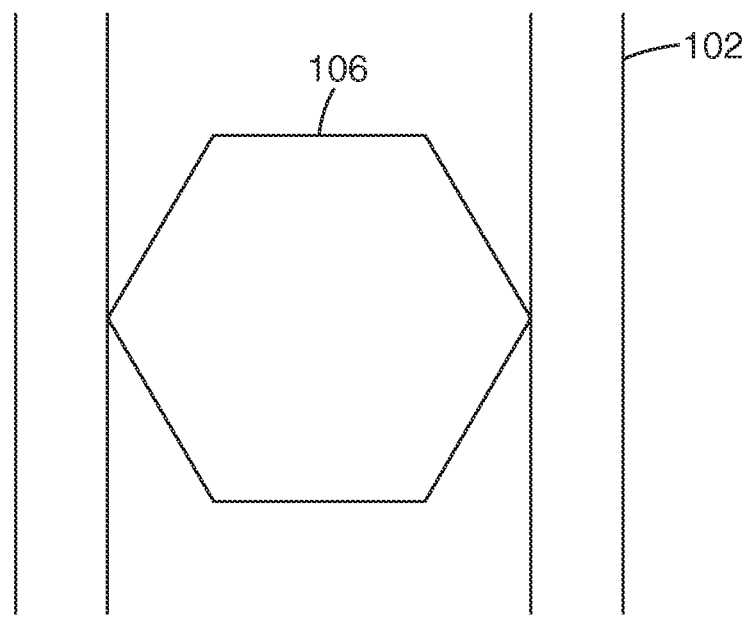
FIG. 16 is a schematic view of a portion of the track and track shape control unit of one embodiment of FIG. 10.
Figure 17:
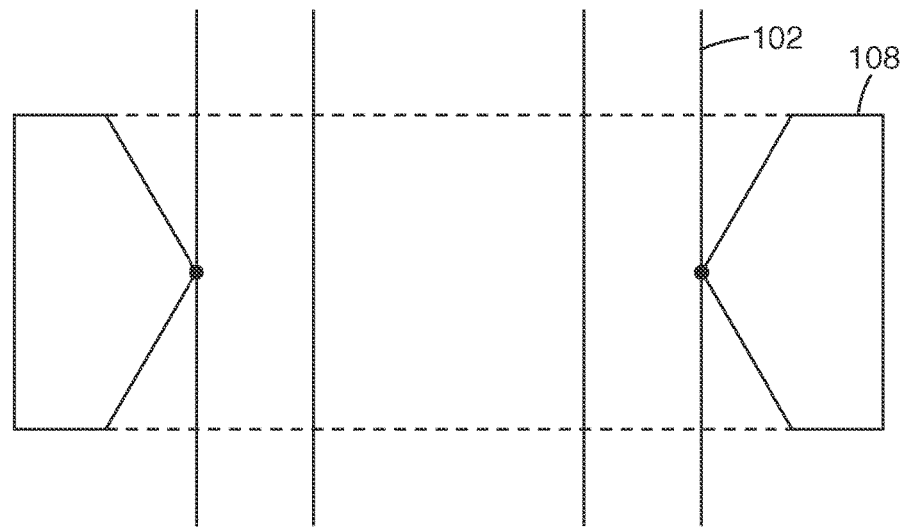
FIG. 17 is a schematic view of another portion of the track and track shape control unit of one embodiment of FIG. 10.

In exemplary embodiments, the inner contact members 106 have a shape, when viewed from above or below, that provides only small areas of contact between the contact members 106, 108 and the rails 102, as illustrated in FIGS. 16 and 17 (FIG. 16 shows the rails 102 and inner contact member 106). Examples of such shapes include circular and ovoid, as well as diamond, hexagonal, or other similar shapes where contact between the inner contact members 106 and the rails 102 is made at the apex of these shapes. The outer contact members 108 can be similarly fashioned so that the portion of the outer contact member 108, when viewed from above or below, comes to a point to make contact with the rails 102, as illustrated in FIG. 17 (FIG. 17 shows the rails 102 and the portion of the outer contact member 108 that makes contact with the rails 102). Using such shapes allows the track shape control unit 96 to exert a force, if desired, to modify the track shape while allowing the track 54 to slide laterally through the control unit 96 rather than being fixed to the control unit 96. This configuration can also allow the track 54 to adjust its instantaneous slope within the control unit 96. For one or both of these reasons, the track 54 can have a larger range of shape adjustment. In other embodiments, there can be fewer or more contact members 106, 108 or there may be only inner or only outer contact members 106, 108.

Figure 18:
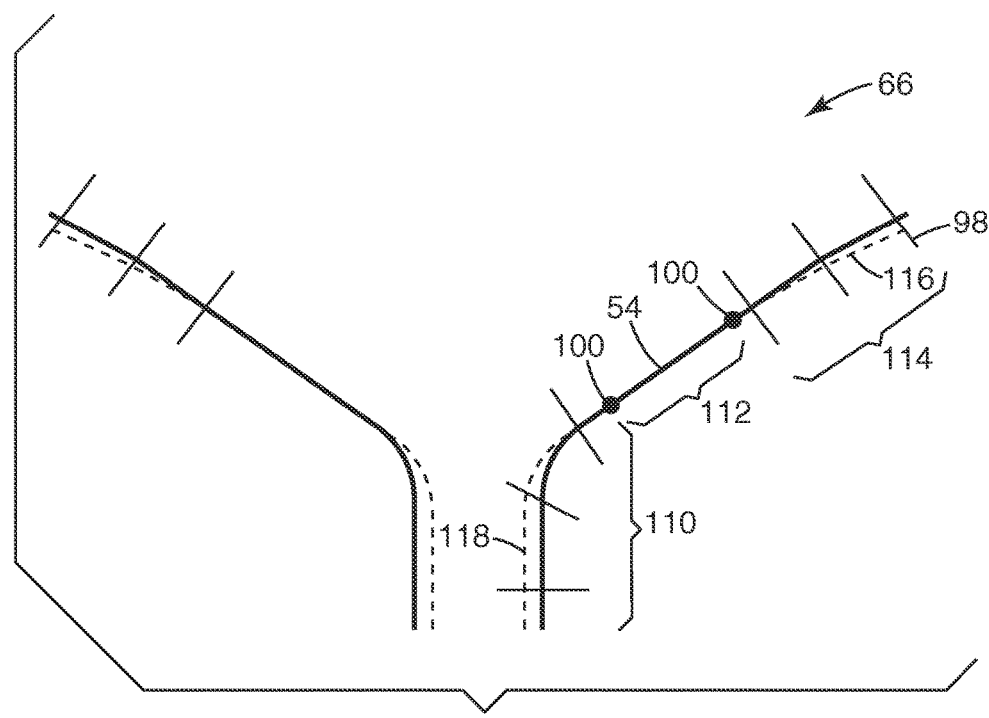
FIG. 18 is a schematic illustration of another embodiment of tracks for a primary stretching region of a stretching apparatus.

As further illustrated in FIG. 18, the tracks 54 can be configured to provide zones 110, 112, 114 within the primary stretching region 66 that have different stretching characteristics or that can be described by different mathematical equations. In some embodiments, the tracks 54 have a shape that defines these different zones 110, 112, 114. In other embodiments, the tracks 54 can be adjusted, using for example the track shape control units 96 discussed above, to provide a variety of shapes 116, 118 beyond simple, monofunctional arrangements. This can be advantageous because it allows different portions of the primary stretching region 66 to accomplish desired functions. For example, an initial stretching zone may have a particular shape (for example, a super-uniaxial shape with U>1 and F>1 as described below) followed by one or more later zones with different shapes (for example, a uniaxial shape). Optionally, intermediate zones can be provided that transition from one shape to another. In some embodiments, the individual zones 110, 112, 114 can be separated or defined by points 100 of the track 54 that are fixed.

In some embodiments, the track 54 has a non-uniform cross-sectional shape along the length of the track 54 to facilitate bending and shaping of the track 54. For example, one or more rails 102 used in the track 54 can have different cross-sectional shapes. As an example, in the four-rail construction described above, each of the rails 102, or a subset of the rails 102, has a varied cross-section along the length of the track 54. The cross-section can be varied by, for example, altering either the height or thickness of the track 54 (or a component of the track 54 such as one or more continuous rails 102) or both. As an example, in one embodiment the thickness of the track 54 or one or more rails 102 in the track 54 decreases or increases along the length of the track 54 in the machine direction. These variations can be used to support a particular track shape or a variation in track shape adjustability. For example, as described above, the track 54 may have several different zones 110, 112, 114, each zone 110, 112, 114 having a different track shape 54. The cross-sectional variation of the track 54 or component of the track 54 can vary within each zone 110, 112, 114 to achieve or facilitate a particular rail 102 shape and can vary between zones 110, 112, 114. As an example, a zone 112 with a relatively thick cross-sectional shape can be disposed between two other zones 110, 114 to isolate or provide a transitional space between the two zones 110, 114.

As an example of variation in track 54 or rail 102 cross-section, the arclength, s, can be used to represent a position along the track 54 in the design of the thickness profile of a track 54 or portion of a track, such as a rail 102. The arclength, s, at the start of stretch is defined as zero and at the other end of the stretch is defined as L with corresponding thicknesses at the beginning and end of stretch being designated as h(0) and h(L), respectively. The track 54 or track component (e.g., rail 102) in this particular embodiment has a taper over a portion of the beam from L' to L" between s=0 and s=L such that the thickness h(L') at position L' is greater than the thickness h(L") at position L". In this manner, either L' or L" may be at the higher arclength coordinate (i.e., L'>L" or L'<L"). One example of a useful thickness profile is a taper given by the function for thickness, h(s), as a function of arclength s over the rail 102 from L' to L", provided by the equation:

$$h(s)=(h(L')-h(L''))(1-(s-L')/(L''-L'))^{\alpha}+h(L'')$$

where α is the positive rate of taper resulting in decreasing thickness from L' to L".

When L' is less than L", this results in a decreasing thickness with arclength. When L' is greater than L" this results in an increasing thickness with arclength. The track 54 can optionally be apportioned into sections, each with its own local L', L" and rate of taper. The maximum thickness of the track 54 or track component, such as a rail, depends on the amount of flexibility desired at that point on the track 54. Using beam theory as applied to a track or rail, it can be shown that in the case of a straight beam with a taper, a value for α of one third provides a beam that bends parabolically in response to a load at one end. When the beam begins in a curved equilibrium configuration or is loaded by several control points, other tapers may be more desirable. For transformation across a variety of other shapes, it may be useful to have both increasing and decreasing thickness within a given track 54 or track component, or numerically calculated forms of the taper over any of these sections. The minimum thickness at any point along the track 54 or track component depends on the amount of required strength of the track 54 to support the stretching forces. The maximum thickness can be a function of the level of needed flexibility. It is typically beneficial to maintain the level of track adjustment within the elastic range of the track 54 or track component, e.g. to avoid the permanent yielding of the track 54 or track component and loss of repeatable adjustment capability.

The paths defined by the opposing tracks 54 affect the stretching of the film 32 in the MD, TD, and ND directions. The stretching transformation can be described as a set of draw ratios: the machine direction draw ratio (MDDR), the transverse direction draw ratio (TDDR), and the normal direction draw ratio (NDDR). When determined with respect to the film 32, the particular draw ratio is generally defined as the ratio of the current size (for example, length, width, or thickness) of the film 32 in a desired direction (for example, TD, MD, or ND) and the initial size (for example, length, width, or thickness) of the film 32 in that same direction. Although these draw ratios can be determined by observation of the polymer film 32 as stretched, unless otherwise indicated, reference to MDDR, TDDR, and NDDR refers to the draw ratio determined by a track 54 used to stretch the polymer film 32.

At any given point in the stretching process, TDDR corresponds to a ratio of the current separation distance of the boundary trajectories, L, and the initial separation distance of the boundary trajectories, $L_0$, at the start of the stretch. In other words, TDDR=$L/L_0$. In some instances (as in FIGS. 2 and 9, for example), TDDR is represented by the symbol λ. At any given point in the stretching process, MDDR is the cosine of the divergence angle, θ, the positive included angle between MD and the instantaneous tangent of the boundary trajectory, e.g. track 54 or rail 102. It follows that cot(θ) is equal to the instantaneous slope (i.e., first derivative) of the track 54 at that point. Upon determination of TDDR and MDDR, NDDR=1/[(TDDR)(MDDR)] provided that the density of the polymer film is constant during the stretching process. If, however, the density of the film changes by a factor of $\rho_f$, where $\rho_f=\rho_0/\rho$ with ρ being the density at the present point in the stretching process and $\rho_0$ being the initial density at the start of the stretch, then NDDR=$\rho_f$/[(TDDR)(MDDR)] as expected. A change in density of the material can occur for a variety of reasons including, for example, due to a phase change, such as crystallization or partial crystallization, caused by stretching or other processing conditions.

Perfect uniaxial stretching conditions, with an increase in dimension in the transverse direction, result in TDDR, MDDR, and NDDR of λ, $(\lambda)^{-1/2}$, and $(\lambda)^{-1/2}$, respectively, as illustrated in FIG. 8 (assuming constant density of the material). In other words, assuming uniform density during the stretch, a uniaxially oriented film is one in which MDDR=(TDDR)$^{-1/2}$ throughout the stretch. A useful measure of the extent of uniaxial character, U, can be defined as:

$$U = \frac{\frac{1}{MDDR} - 1}{TDDR^{1/2} - 1}$$

For a perfect uniaxial stretch, U is one throughout the stretch. When U is less than one, the stretching condition is considered "subuniaxial". When U is greater than one, the stretching condition is considered "super-uniaxial". In a conventional tenter, the polymer film 12 is stretched linearly along edges 16, as illustrated in FIG. 2, to stretch a region 18 of the film to a stretched region 20. In this example, the divergence angle is relatively small (e.g., about 3° or less), MDDR is approximately 1 and U is approximately zero. If the film 12 is biaxially stretched so that MDDR is greater than unity, U becomes negative. In some embodiments, U can have a value greater than one. States of U greater than unity represent various levels of over-relaxing. These over-relaxed states produce an MD compression from the boundary edge. If the level of MD compression is sufficient for the geometry and material stiffness, the film will buckle or wrinkle.

As expected, U can be corrected for changes in density to give $U_f$ according to the following formula:

$$U_f = \frac{\frac{1}{MDDR} - 1}{\left(\frac{TDDR}{\rho_f}\right)^{1/2} - 1}$$

Preferably, the film is stretched in plane (i.e., the boundary trajectories and tracks are coplanar) such as shown in FIG. 10, although non-coplanar stretching trajectories are also acceptable. The design of in-plane boundary trajectories is simplified because the in-plane constraint reduces the number of variables. The result for a perfect uniaxial orientation is a pair of mirror symmetric, in-plane, parabolic trajectories diverging away from the in-plane MD centerline. The parabola may be portrayed by first defining TD as the "x" direction and MD as the "y" direction. The MD centerline between the opposing bounding parabolas may be taken as the y coordinate axis. The coordinate origin may be chosen to be the beginning of the primary stretching region 66 and corresponds to the initial centerpoint of the central trace between the parabolic trajectories. The left and right bounding parabolas are chosen to start (y=0) at minus and plus $x_0$, respectively. The right bounding parabolic trajectory, for positive y values, that embodies this embodiment of the present disclosure is:

$$x/x_0 = (1/4)(y/x_0)^2 + 1$$

The left bounding parabolic trajectory is obtained by multiplying the left-hand side of the above equation by minus unity. In the discussion below, descriptions of and methods for determining the right bounded trajectory are presented. A left bounded trajectory can then be obtained by taking a mirror image of the right bounded trajectory over the centerline of the film.

For sub-uniaxial stretches, the final extent of truly uniaxial character can be used to estimate the level of refractive index matching between the y (MD) and z (ND) directions by the equation:

$$\Delta n_{yz} = \Delta n_{yz}(U=0) \times (1-U)$$

where $\Delta n_{yz}$ is the difference between the refractive index in the MD direction (i.e., y-direction) and the ND direction (i.e., z-direction) for a value U and $\Delta n_{yz}(U=0)$ is that refractive index difference in a film stretched identically except that MDDR is held at unity throughout the stretch. This relationship has been found to be reasonably predictive for polyester systems (including PEN, PET, and copolymers of PEN or PET) used in a variety of optical films. In these polyester systems, $\Delta n_{yz}(U=0)$ is typically about one-half or more of the difference $\Delta n_{xy}(U=0)$, which is the refractive difference between the two in-plane directions MD (y-axis) and TD (x-axis). Typical values for $\Delta n_{xy}(U=0)$ range up to about 0.26 at 633 nm. Typical values for $\Delta n_{yz}(U=0)$ range up to about 0.15 at 633 ma For example, a 90/10 coPEN, i.e. a copolyester comprising about 90% PEN-like repeat units and 10% PET-like repeat units, has a typical value at high extension of about 0.14 at 633 nm. Films comprising this 90/10 coPEN with values of U of 0.75, 0.88 and 0.97 as measured by actual film draw ratios with corresponding values of $\Delta n_{yz}$ of 0.02, 0.01, 0.03 and 0.003 at 633 nm have been made according to the methods described herein.

A coplanar parabolic trajectory can provide uniaxial orientation under ideal conditions. However, other factors can affect the ability to achieve uniaxial orientation including, for example, non-uniform thickness of the polymer film, non-uniform heating of the polymer film during stretching, and the application of additional tension (for example, machine direction tension) from, for example, down-web regions of the apparatus. In addition, in many instances it is not necessary to achieve perfect uniaxial orientation. Instead, a minimum or threshold U value or an average U value that is maintained throughout the stretch or during a particular portion of the stretch can be defined. For example, an acceptable minimum/threshold or average U value can be 0.2, 0.5, 0.7, 0.75, 0.8, 0.85, 0.9, or 0.95, as desired, or as needed for a particular application. Generally, any minimum/threshold or average U value that is more than 0 is suitable.

As an example of acceptable nearly uniaxial applications, the off-angle characteristics of reflective polarizers used in liquid crystalline display applications is strongly impacted by the difference in the MD and ND indices of refraction when TD is the principal stretch direction. An index difference in MD and ND of 0.08 is acceptable in some applications. A difference of 0.04 is acceptable in others. In more stringent applications, a difference of 0.02 or less is preferred. For example, the extent of uniaxial character of 0.85 is sufficient in many cases to provide an index of refraction difference between the MD and ND directions in polyester systems containing polyethylene naphthalate (PEN) or copolymers of PEN of 0.02 or less at 633 nm for single-direction transversely stretched films. For some polyester systems, such as polyethylene terephthalate (PET), a lower U value of 0.80 or even 0.75 may be acceptable because of lower intrinsic differences in refractive indices in non-substantially uniaxially stretched films.

Oriented optical films made by methods of the present disclosure include reflective polarizers such as multilayer reflective polarizers and diffusely reflective polarizers. Descriptions of the latter can be found in commonly owned U.S. Provisional Application Ser. No. 60/668,944, filed Apr.

6, 2005, and U.S. application Ser. No. 11/398,276, filed Apr. 5, 2006, both entitled, "Diffuse Reflective Polarizing Films with Orientable Polymer Blends," and in U.S. Pat. Nos. 5,825,543, 6,057,961, 6,590,705, and 6,057,961, incorporated herein by . Such diffusely reflective polarizers include a continuous phase of a first thermoplastic polymer and a discontinuous or disperse phase of a second thermoplastic polymer. Either or both of the first or second polymers may be a birefringent material. In one embodiment, a diffusely reflective polarizer includes more than one continuous phase and/or more than one disperse phase.

In another embodiment, oriented optical films made by methods of the present disclosure include compensators and retarders. An exemplary embodiment is an "a-plate," which is a birefringent optical element, such as, for example, a plate or film, having its principle optical axis within the x-y plane of the optical element. Positively birefringent a-plates can be fabricated using, for example, uniaxially stretched films of polymers such as, for example, polyvinyl alcohol, or uniaxially aligned films of nematic positive optical anisotropy liquid crystal polymer (LCP) materials. Negatively birefringent a-plates can be formed using uniaxially aligned films of negative optical anisotropy nematic LCP materials, including for example discotic compounds.

When the volume fraction for binary blends of high polymers of roughly equivalent viscosity is greater than about 40% and approaches 50%, the distinction between the disperse and continuous phases becomes difficult, as each phase becomes continuous in space. Depending upon the materials of choice, there may also be regions where the first phase appears to be dispersed within the second, and vice versa. For a description of a variety of co-continuous morphologies and for methods of evaluating, analyzing, and characterizing them, see Sperling and the s cited therein (L. H. Sperling, "Microphase Structure," *Encyclopedia of Polymer Science and Engineering,* 2nd Ed., Vol. 9, 760-788, and L. H. Sperling, Chapter 1, "Interpenetrating Polymer Networks: An Overview," *Interpenetrating Polymer Networks*, edited by D. Klempner, L. H. Sperling, and L. A. Utracki, *Advances in Chemistry Series* #239, 3-38, 1994).

One set of acceptable parabolic trajectories that is nearly or substantially uniaxial in character can be determined by the following method. This described method determines the "right" boundary trajectory directly, and the "left" boundary trajectory is taken as a mirror image. First, a condition is set by defining an instantaneous functional relationship between TDDR measured between the opposing boundary trajectories and MDDR defined as the cosine of the non-negative divergence angle of those boundary trajectories, over a chosen range of TDDR.

Next, the geometry of the problem is defined as described in the discussion of the parabolic trajectories, $x_1$ is defined as the initial half distance between the boundary trajectories and a ratio $(x/x_1)$ is identified as the instantaneous TDDR, where x is the current x position of a point on the boundary trajectory. Next, the instantaneous functional relationship between the TDDR and MDDR is converted to a relationship between TDDR and the divergence angle. When a specific value of U is chosen, the equations above provide a specific relationship between MDDR and TDDR which can then be used in the algorithm to specify the broader class of boundary trajectories that also includes the parabolic trajectories as a limiting case when U approaches unity. Next, the boundary trajectory is constrained to satisfy the following differential equation:

$$d(x/x_1)/d(y/x_1)=\tan(\theta)$$

where $\tan(\theta)$ is the tangent of the divergence angle $\theta$, and y is the y coordinate of the current position of the opposing point on the right boundary trajectory corresponding to the given x coordinate. Next, the differential equation may be solved, e.g. by integrating $1/\tan(\theta)$ along the history of TDDR from unity to the maximum desired value to obtain the complete coordinate set $\{(x,y)\}$ of the right boundary trajectory, either analytically or numerically.

As another example of acceptable trajectories, a class of in-plane trajectories can be described in which the parabolic trajectory is used with smaller or larger initial effective web TD length. If $x_1$ is half of the separation distance between the two opposing boundary trajectories at the inlet to the primary stretching region 66 (i.e. the initial film TD dimension minus the selvages held by the grippers which is the initial half distance between opposing boundary trajectories), then this class of trajectories is described by the following equation:

$$\pm(x)/(x_1)=(1/4)(x_1/x_0)(y/x_1)^2+1$$

where $x_1/x_0$ is defined as a scaled inlet separation. The quantity $x_0$ corresponds to half of the separation distance between two opposing tracks required if the equation above described a parabolic track that provided a perfectly uniaxial stretch. The scaled inlet separation, $x_1/x_0$, is an indication of the deviation of the trajectory from the uniaxial condition. In one embodiment, the distance between the two opposing tracks in the primary stretching zone is adjustable, as described above, allowing for the manipulation of the trajectory to provide values of U and F (described below) different than unity. Other methods of forming these trajectories can also be used including, for example, manipulating the shape of the trajectories using track shape control units or by selecting a fixed shape that has the desired trajectory.

For super-uniaxial stretches, the severity of the wrinkling can be quantified using the concept of overfeed. The overfeed, F, can be defined as the uniaxial MDDR (which equals $(TDDR)^{-1/2}$) divided by the actual MDDR. If the actual MDDR is less than the uniaxial MDDR, the overfeed F is less than unity and the MDDR is under-relaxed resulting in a U less than unity. If F is greater than unity, the stretch is super-uniaxial and the MDDR is over-relaxed relative to the uniaxial case. At least a portion of the extra slack can be accommodated as a wrinkle because the compressive buckling threshold is typically low for thin, compliant films. When F is greater than unity, the overfeed corresponds at least approximately to the ratio of the actual film contour length in the wrinkles along MD to the in-plane contour length or space.

Because of the relationship between TDDR and MDDR in the case of constant density, F can be written as:

$$F=1/(MDDR \times TDDR^{1/2})$$

Typically, F is taken as density independent for design purposes. Large values of F anytime during the process can cause large wrinkles that can fold over and stick to other parts of the film, thereby causing defects. In at least some embodiments, the overfeed, F, remains at 2 or less during the stretch to avoid or reduce severe wrinkling or fold-over. In some embodiments, the overfeed is 1.5 or less throughout the course of the stretch. For some films, a maximum value of F of 1.2 or even 1.1 is allowed throughout the stretch.

For at least some embodiments, particularly embodiments with U>1 through the entire stretch, rearranging the definition of overfeed provides a relative bound on a minimum MDDR given a current TDDR:

$$MDDR>1/(F_{max} \times TDDR^{1/2})$$

where $F_{max}$ can be chosen at any preferred level greater than unity. For example, F can be selected to be 2, 1.5, 1.2, or 1.1, as described above.

When the over-feed is less than unity, there is effectively more in-plane space along MD than is desired for the truly uniaxial stretch and the MDDR may be under-relaxed and causing MD tension. The result can be a U value less than unity. Using the relationships between U, F, MDDR and TDDR there is a corresponding correlation between U and F which varies with TDDR. At a critical draw ratio of 2, a minimum U value corresponds to a minimum overfeed F of about 0.9. For at least some boundary trajectories including boundary trajectories in which U>1 for the entire stretch, MDDR can be selected to remain below a certain level during a final portion of stretch, e.g.:

$$MDDR<1/(F_{min} \times TDDR^{1/2})$$

where $F_{min}$ is 0.9 or more for a final portion of stretch after a draw ratio of 2.

As an example, trajectories can be used in which MDDR< $(TDDR)^{-1/2}$ (i.e., U>1) throughout the stretch, $F_{max}$ is 2, and the film is stretched to a TDDR of at 4. If the trajectories are coplanar, then the film is stretched to a TDDR of at least 2.4 and often at least 5.3. If $F_{max}$ is 1.5, then the film is stretched to a TDDR of at least 6.8. If the trajectories are coplanar, then the film is stretched to a TDDR of at least 2.1 and often at least 4.7. If $F_{max}$ is 1.2, then the film is stretched using coplanar trajectories to a TDDR of at least 1.8 and often at least 4.0. For coplanar or non-coplanar boundary trajectories, if no limit is placed on F, then the film is stretched to a TDDR of greater than 4 and often at least 6.8. In another example, coplanar trajectories can be used in which $(F_{min})(MDDR)<(TDDR)^{-1/2}$ throughout the stretch, $F_{max}$ is 2, $F_{min}$ is 0.9, and the film is stretched to a TDDR of at least 4.6 and often at least 6.8. If $F_{max}$ is 1.5, then the film is stretched to a TDDR of at least 4.2 and often at least 6.1, If $F_{max}$ is 1.2, then the film is stretched to a TDDR of at least 3.7 and often at least 5.4. If no limit is placed on F, then the film is stretched to a TDDR of at least 8.4. A boundary trajectory can also be used in which $(F_{min})(MDDR)<(TDDR)^{-1/2}$ throughout the stretch, $F_{max}$ is 1.5, $F_{min}$ is 0.9, and the film is stretched to a TDDR of at least 6.8.

Other useful trajectories can be defined using $F_{max}$. Useful trajectories include coplanar trajectories where TDDR is at least 5, U is at least 0.85 over a final portion of the stretch after achieving a TDDR of 2.5, and $F_{max}$ is 2 during stretching. Useful trajectories also include coplanar trajectories where TDDR is at least 6, U is at least 0.7 over a final portion of the stretch after achieving a TDDR of 2.5, and $F_{max}$ is 2 during stretching.

Yet other useful coplanar trajectories include those in which MDDR<$TDDR^{-1/2}$<$(F_{max})(MDDR)$ during a final portion of the stretch in which TDDR is greater than a critical value TDDR'. The following provides minimum draw ratios that should be achieved for the trajectory in some exemplary embodiments. When TDDR' is 2 or less, then for $F_{max}$=2, the minimum draw is 3.5; for $F_{max}$=1.5, the minimum draw is 3.2; and for $F_{max}$=2, the minimum draw is 2.7. When TDDR' is 4 or less, then for $F_{max}$=2, the minimum draw is 5.8; for $F_{max}$1.5, the minimum draw is 5.3; and for $F_{max}$=1.2, the minimum draw is 4.8. When TDDR' is 5 or less, then for $F_{max}$=2, the minimum draw is 7; for $F_{max}$=1.5, the minimum draw is 6.4; and for $F_{max}$=1.2, the minimum draw is 5.8.

In general, a variety of acceptable trajectories can be constructed using curvilinear and linear tracks so that the overfeed remains below a critical maximum level through-out the stretching to prevent fold-over defects while remaining above a critical minimum level to allow the desired level of truly uniaxial character with its resulting properties.

Figure 19:
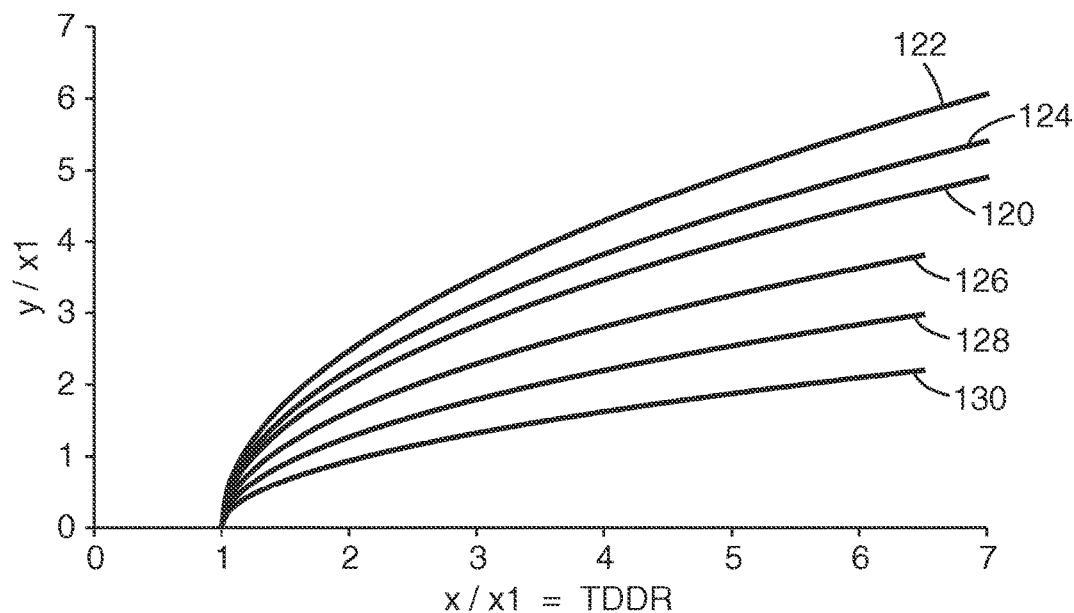
FIG. 19 is a graph of examples of suitable boundary trajectories for a primary stretching region of a stretching apparatus.

A variety of sub-uniaxial and super-uniaxial trajectories may be formed using the parabolic shape. FIG. 19 illustrates examples of different levels of minimum U after a critical TDDR and demonstrate different maximum overfeeds up to a final desired TDDR. The curves are represented by coordinates x and y as scaled by $x_1$, half the initial separation distance of the tracks. The scaled x coordinate, the quantity $(x/x_1)$, is therefore equal to the TDDR. Curve 120 is the ideal case with a value of $x_1/x_0$ of 1.0. Curve 122 is the parabolic case with a value of $x_1/x_0$ of 0.653 in which U remains greater than 0.70 above a draw ratio of 2.5. Curve 124 is the parabolic case with a value of $x_1/x_0$ of 0.822. in which U remains above 0.85 after a draw ratio of 2.5.

Curves 126, 128, and 130 illustrate various levels of overfeed. The overfeed, TDDR and scaled inlet width are related by:

$$x_1/x_0=(F^2(TDDR)-1)/(TDDR-1)$$

It follows directly that the overfeed increases with increasing TDDR in the parabolic trajectories described here. Curve 126 is the parabolic case with a value of $x_1/x_0$ of 1.52 in which the overfeed remains below 1.2 up to a final draw ratio of 6.5. Curve 128 is the parabolic case with a value of $x_1/x_0$ of 2.477 in which the overfeed remains below 1.5 up to a final draw ratio of 6.5. Curve 130 is the parabolic case with a value of $x_1/x_0$ of 4.545 in which the overfeed remains below 2 up to a final draw ratio of 6.5. The level of overfeed is a function of the final draw ratio in these cases. For example, using a value of $x_1/x_0$ of only 4.333 rather than 4.545 allows stretching to a final TDDR of 10 while keeping the overfeed under 2.

For the parabolic trajectories, a relationship allows the direct calculation of MDDR at any given TDDR for a fixed scaled inlet width:

$$MDDR=(TDDR(x_1/x_0)+(1-x_1/x_0))^{-1/2}$$

Figure 20:
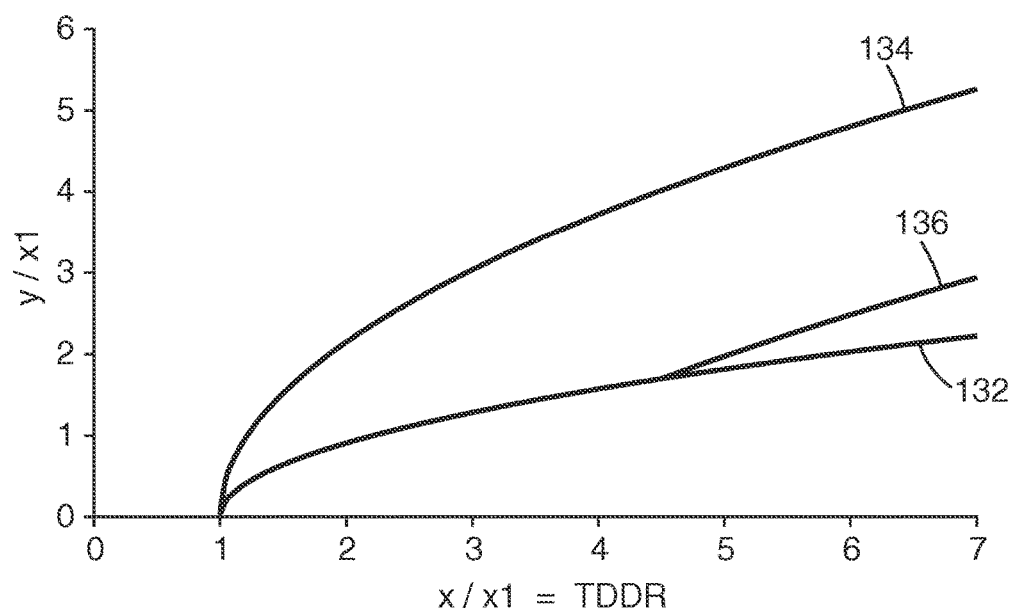
FIG. 20 is a graph of examples of suitable boundary trajectories for a primary stretching region of a stretching apparatus illustrating the use of different stretching regions with different, parabolic configurations.

One observation is that the relationship between MDDR and TDDR is not an explicit function of the y position. This allows the construction of composite hybrid curves comprising sections of parabolic trajectories that are vertically shifted in $y/x_1$. FIG. 20 illustrates one method. A parabolic trajectory for the initial portion of the stretch is chosen, curve 132, and a parabolic trajectory is chosen for the final portion, curve 134. The initial curve 132 is chosen to provide a super-uniaxial stretch with a maximum overfeed of 2.0 at a draw ratio of 4.5. Curve 132 has a scaled inlet width of 4.857, The final curve 134 is chosen to be a sub-uniaxial stretch with a minimum U of 0.9 at the 4.5 draw ratio. Curve 134 has a scaled inlet width of 0.868. The actual track or rail shape follows curve 132 up to TDDR of 4.5 and then continues on curve 136 which is a vertically shifted version of curve 134. In other words, a trajectory can have an initial stretching zone with tracks having a functional form corresponding to:

$$\pm(x)/(x_1)=(1/4)(x_1/x_1)^2+1$$

and then a later stretching zone with tracks having a functional form corresponding to:

$$\pm(x)/(x_2)=(1/4)(x_2/x_0)((y-A)/x_2)^2+1;$$

where $x_1$ and $x_2$ are different and A corresponds to the vertical shift that permits coupling of the trajectories. Any number of parabolic segments may be combined in this manner.

The parabolic trajectories, and their composite hybrids, can be used to guide the construction of related trajectories. One embodiment involves the use of linear segments to create trajectories. These linear approximations can be constructed within the confines of parabolic trajectories (or composite hybrids) of maximum overfeed and minimum overfeed (or minimum U) at a chosen TDDR' larger than a critical draw ratio, TDDR*. Values for TDDR* can be selected which relate to the onset of strain-induced crystallinity with examples of values of 1.5, 2, and 2.5 or may be related to elastic strain yielding with lower values of 1.2 or even 1.1. The range of TDDR* generally falls between 1.05 and 3. Portions of the rail or track below TDDR* may not have any particular constraints on minimum overfeed or U and may fall outside the confines of the constraining parabolic trajectories.

Figure 21:
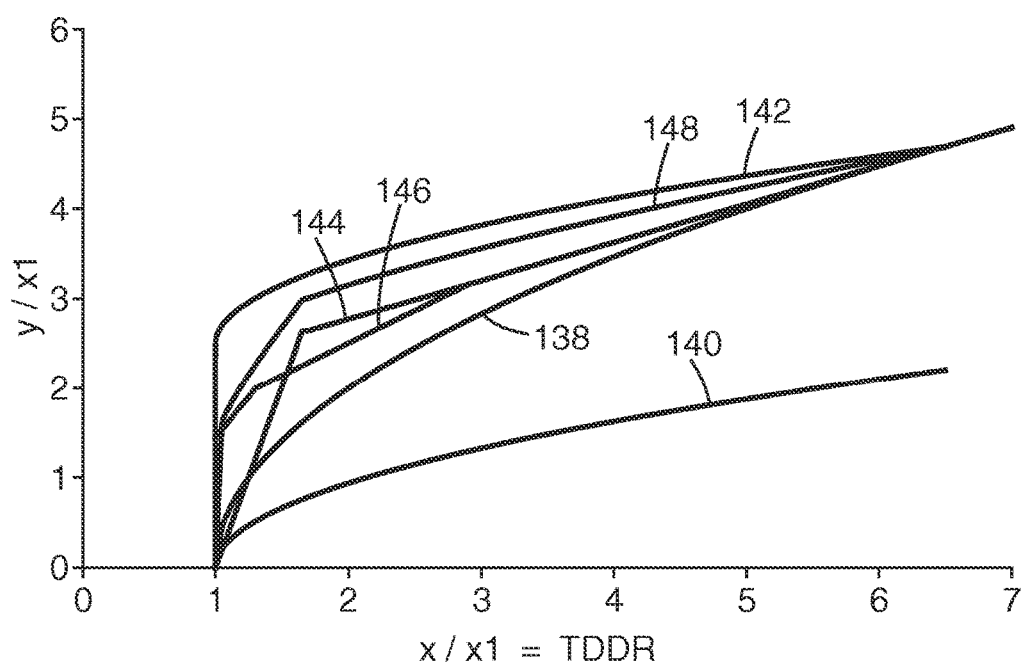
FIG. 21 is a graph of examples of suitable boundary trajectories for a primary stretching region of a stretching apparatus including boundary trajectories that are linear approximations to suitable parabolic or substantially parabolic boundary trajectories.

In FIG. 21, curve 138 is chosen to be the constraining parabolic trajectory of minimum overfeed at the chosen draw ratio, TDDR', illustrated here at a value of 6.5. For illustration, the minimum overfeed constraining parabolic trajectory has been chosen as the ideal curve with a scaled inlet width of unity. Using the relationship between overfeed, TDDR and scaled inlet width, curve 140 is identified as the constraining parabolic trajectory of maximum overfeed where the maximum value of F is 2.0 at the TDDR value of 6.5. Curve 140 is now vertically shifted to form curve 142 so that the two constraining parabolic trajectories meet at the chosen TDDR' of 6.5. It should be remarked that curves 140 and 142 are equivalent with respect to stretching character. Curve 142 merely delays the stretch until a later spatial value of $y/x_1$ of 2.489. An approximation of linear or non-parabolic curvilinear segments will tend to lie between these constraining trajectories above TDDR*.

Unlike parabolic trajectories that possess increasing divergence angles with increasing TDDR, linear trajectories have a fixed divergence angle. Thus the overfeed decreases with increasing TDDR along a linear segment. A simple linear approximation can be constructed by choosing a line with a divergence angle equal to the desired minimum overfeed at the chosen TDDR. The line segment may be extrapolated backwards in TDDR until the overfeed equals the maximum allowed. A subsequent linear segment is started in similar fashion. The procedure is repeated as often as necessary or desired. As the maximum overfeed decreases, the number of segments needed for the approximation increases.

When the TDDR drops below TDDR*, any number of methods may be used to complete the track or rail as long as the constraint on maximum overfeed is maintained. In FIG. 21, curve 144 is a linear approximation constrained by a maximum overfeed of 2. Because of this large maximum overfeed, it comprises only two linear sections. The final linear segment extends all the way backwards from the chosen TDDR of 6.5 to a lower TDDR of 1.65. In this case, TDDR* is taken as 2. Without a constraint on U below a TDDR of 2, one method of finishing the track is to extrapolate a second linear segment from TDDR at 1.65 back to TDDR of unity at the $y/x_1$ zero point. Note that this causes the second segment to cross the lower constraining parabola, since the constraint is not effective below TDDR*.

In FIG. 21, curve 146 is the result of using a tighter value for the maximum overfeed of 1.5. Here the constraining parabolic trajectory of maximum overfeed is not shown. Three linear segments are required. The first segment extends backwards from TDDR of 6.5 to TDDR of 2.9. The second segment assumes a divergence angle equal to the constraining parabolic trajectory of minimum overfeed at this TDDR value of 2.9 and extends backwards to a TDDR of 1.3. This second segment ends below TDDR*. The final segment completes the track or rail shape for curve 146 using a different method than that used for curve 144. Here the same procedure for the last segment is used as for the previous segments, resulting in a delay of the onset of stretching with a higher $y/x_1$ value. A third method of completing the track is to set the overfeed to the maximum at the initial TDDR of unity.

General, non-linear and non-parabolic trajectories fitting the requirements of the present disclosure can be constructed using the constraining parabolic trajectories. The maximum overfeed constraining parabolic trajectory is the curve of minimum slope, i.e. maximum divergence angle, as a function of TDDR. The minimum overfeed constraining parabolic trajectory is the curve of maximum slope, i.e. minimum divergence angle, as a function of TDDR. In general, curves can be extrapolated backwards from the chosen TDDR' using any function of slope that lies between the constraining bounds.

A simple method for defining a function for the slope that lies between these constraints is to take a simple linear combination of known curves within the envelope. Curve 148 in FIG. 21 illustrates this simple method. In this example, curve 148 is formed by a linear combination of the maximum overfeed constraining parabolic trajectory, curve 142, and the linear approximation to it, curve 144, with the linear weights of 0.7 and 0.3, respectively. In general, functions that are not simple linear combinations can also be used.

The aforementioned method for describing the various non-parabolic trajectories of the present disclosure can be applied over different sections of the track, e.g. the example of FIG. 21 for TDDR up to 6.5 may be combined with another section for TDDR over 6.5 with different requirements and therefore different maximum and minimum constraining trajectories over that higher range of TDDR. In this case, the TDDR' of the previous section of lower stretch takes on the role of TDDR*. In general, TDDR' may be chosen across the range of desired stretching. Various sections may be used to account for the various phenomenon of stretching, such as yielding, strain-induced crystallization, onset of necking or other stretch non- uniformity, onset of strain-hardening or to account for the development of various properties within the film. Typical breakpoints include those for TDDR*, the range of 3 to 7 for strain-hardening in polyesters, and typical final draw values in the range of 4 to 10 or more.

The procedures for determining boundary trajectories for the present disclosure and the method of extrapolating backwards to lower TDDR from a chosen TDDR' may be used in an analogous method of extrapolating forward to higher TDDR from a chosen TDDR". Again, two constraining trajectories are formed, joined at the lowest chosen TDDR". A convenient value for TDDR" is the initial TDDR of unity. In this method, the constraining trajectory of minimum overfeed or U lies above the maximum overfeed curve. FIG. 20 exhibits an example of this method in which the hybrid curve 136 lies between the minimum overfeed constraint, curve 134, and the maximum overfeed constraint, curve 132.

Still another class of boundary trajectories can be defined and may, in some embodiments, be useful in suppressing residual wrinkles. Because the uniaxial condition in the absence of shear provides a principal MD stress of zero, it is anticipated, using finite strain analysis, that the principal MD stress will actually go into slight compression under these conditions. Using finite strain analysis and a Neo-Hookean elastic solid constitutive equation, it is discovered that a suitable criterion for preventing compressive stresses may optionally be given by the following equation:

$$((TDDR)(MDDR))^{-4} + ((TDDR)(MDDR))^{2} - (TDDR)^{-2} - (MDDR)^{-2} - \sin^{2}(\theta)((TDDR)(MDDR))^{-2} = 0$$

where MDDR is the cosine of the divergence angle. This optional method of the present disclosure then specifies this class of boundary trajectories.

As indicated above, the film may be stretched out-of-plane using out-of-plane boundary trajectories, i.e. boundary trajectories that do not lie in a single Euclidean plane. There are innumerable, but nevertheless particular, boundary trajectories meeting relational requirements of this preferred embodiment of the present disclosure, so that a substantially uniaxial stretch history may be maintained using out-of-plane boundary trajectories. The boundaries may be symmetrical, forming mirror images through a central plane, e.g. a plane comprising the initial center point between the boundary trajectories, the initial direction of film travel and the initial normal to the unstretched film surface. In this embodiment, the film may be stretched between the boundary trajectories along a cylindrical space manifold formed by the set of line segments of shortest distance between the two opposing boundary trajectories as one travels along these boundary trajectories at equal rates of speed from similar initial positions, i.e., colinear with each other and the initial center point.

The trace of this ideal manifold on the central plane thus traces out the path of the film center for an ideal stretch. The ratio of the distance along this manifold from the boundary trajectory to this central trace on the central plane to the original distance from the start of the boundary trajectory to the initial center point is the instantaneous nominal TDDR across the film spanning the boundary trajectories, i.e. the ratios of the half-distances between the current opposing points on the boundary trajectories and the half-distances between the initial positions of the opposing points on the boundary trajectories. As two opposing points move at constant and identical speeds along the opposing boundary trajectories, the corresponding center point on the central trace changes speed as measured along the arc of the central trace, i.e. the curvilinear MD. In particular, the central trace changes in proportion with the projection of the unit tangent of the boundary trajectory on the unit tangent of the central trace.

The classes of trajectories described above are illustrative and should not be construed as limiting. A host of trajectory classes are considered to lie within the scope of the present disclosure. As indicated above, the primary stretching region can contain two or more different zones with different stretching conditions. For example, one trajectory from a first class of trajectories can be selected for an initial stretching zone and another trajectory from the same first class of trajectories or from a different class of trajectories can be selected for each of the subsequent stretching zones.

Although exemplary embodiments of the present disclosure encompass all boundary trajectories comprising a minimum value of U>0, typical embodiments of the present dislosure include all nearly or substantially uniaxial boundary trajectories comprising a minimum value of U of about 0.2, about 0.5, about 0.7, more preferably approximately 0.75, still more preferably about 0.8 and even more preferably about 0.85. The minimum U constraint may be applied over a final portion of the stretch defined by a critical TDDR preferably of about 2.5, still more preferably about 2.0 and more preferably about 1.5. In some embodiments, the critical TDDR can be about 4 or 5. Above a critical TDDR, certain materials, e.g. certain monolithic and multilayer films comprising orientable and birefringent polyesters, may begin to lose their elasticity or capability of snap back because of the development of structure such as strain-induced crystallinity. The critical TDDR may coincide with a variety of material and process (e.g. temperature and strain rate) specific events such as the critical TDDR for the onset of strain-induced crystallization. The minimum value of U above such a critical TDDR can relate to an amount of non-uniaxial character set into the final film.

A variety of boundary trajectories are available when U is subuniaxial at the end of the stretching period. In particular, useful boundary trajectories include coplanar trajectories where TDDR is at least 5, U is at least 0.7 over a final portion of the stretch after achieving a TDDR of 2.5, and U is less than 1 at the end of the stretch. Other useful trajectories include coplanar and non-coplanar trajectories where TDDR is at least 7, U is at least 0.7 over a final portion of the stretch after achieving a TDDR of 2.5, and U is less than 1 at the end of the stretch. Useful trajectories also include coplanar and non-coplanar trajectories where TDDR is at least 6.5, U is at least 0.8 over a final portion of the stretch after achieving a TDDR of 2.5, and U is less than 1 at the end of the stretch. Useful trajectories include coplanar and non-coplanar trajectories where TDDR is at least 6, U is at least 0.9 over a final portion of the stretch after achieving a TDDR of 2.5, and U is less than 1 at the end of the stretch.

Useful trajectories also include coplanar and non-coplanar trajectories where TDDR is at least 7 and U is at least 0.85 over a final portion of the stretch after achieving a TDDR of 2.5.

In some embodiments, a small level of MD tension is introduced into the stretching process to suppress wrinkling. Generally, although not necessarily, the amount of such MD tension increases with decreasing U. In some embodiments, it is useful to increase the tension as the stretch proceeds. For example, a smaller value of U earlier in the stretch may tend to set more non-uniaxial character into the final film. Thus it may be advantageous to combine the attributes of various trajectory classes into composite trajectories. For example, a uniaxial parabolic trajectory may be preferred in the earlier portions of the stretch, while the later portions of the stretch may converge on a different trajectory. In another arrangement, U may be taken as a non-increasing function with TDDR. In still another arrangement, the overfeed, F, may be a non-increasing function with TDDR after a critical draw ratio of, for example, 1.5, 2, or 2.5.

The uniaxial parabolic trajectory assumes a uniform spatial stretching of the film. Good spatial uniformity of the film can be achieved with many polymer systems with careful control of the crossweb and downweb caliper (thickness) distribution of the initial, unstretched film or web, coupled with the careful control of the temperature distribution at the start of and during the stretch. For example, a uniform temperature distribution across the film initially and during stretch on a film of initially uniform caliper should suffice in most cases. Many polymer systems are particularly sensitive to non-uniformities and will stretch in a non-uniform fashion if caliper and temperature uniformity are inadequate.

Non-uniform film stretching can occur for a variety of reasons including, for example, non-uniform film thickness or other properties, non-uniform heating, etc. In many of these instances, portions of the film near the gripping members stretch faster than those near the center. This creates an MD tension in the film that can limit ability to achieve a final uniform MDDR. One compensation for this problem is to modify the parabolic or other uniaxial trajectory to present a lower MDDR. In other words, MDDR<(TDDR)$^{-1/2}$ for all or a portion of the stretch.

In one embodiment, a modified parabolic or other uniaxial trajectory is selected in which MDDR<(TDDR)$^{-1/2}$, corresponding to a larger divergence angle, for all of the stretch. In at least some instances, this condition can be relaxed because a U value of less than unity is acceptable for the application. In such instances, a modified parabolic or other uniaxial trajectory is selected in which (0.9)MDDR<(TDDR)$^{-1/2}$.

In another embodiment, a modified parabolic or other uniaxial trajectory is selected in which MDDR<(TDDR)$^{-1/2}$ for an initial stretching zone in which the TDDR is increased by at least 0.5 or 1. A different trajectory is then maintained for the remainder of the stretch. For example, a later stretching zone (within the stretching region 34) would have a parabolic or other uniaxial trajectory in which MDDR is equal to or approximately equal to (within ±5% and, preferably, within ±3%) (TDDR)$^{-1/2}$. As an example, the initial stretching zone can accomplish a TDDR level up to a desired value. In one embodiment, this desired value is typically no more than about 4 or 5. The later stretching zone can then increase the TDDR from the desired value of the initial stretching zone (or from a higher value if there are intervening stretching zones). Generally, the later stretching zone is selected to increase the TDDR value by 0.5 or 1 or more.

Again, in at least some instances, the MDDR and TDDR relationship can be relaxed because a U value of less than unity is acceptable for the application. In such instances, the modified parabolic or other uniaxial trajectory of the initial stretching zone is selected in which (0.9)MDDR<(TDDR)$^{-1/2}$.

The heat set procedure of the present disclosure may be performed during various portions of the stretching process. In one embodiment, the film 32 may be heat set following stretching and hand-off to a takeaway system, i.e. in a heated takeaway zone. In another embodiment, the film 32 may be heat set in an on-line zone subsequent to initial quenching and setting of the film 32, e.g. in a separate oven device that re-heats the film 32. In yet another embodiment, the film 32 may be heat set after winding into a roll after the initial process, e.g. in a separate oven device not connected on-line to the stretching apparatus 50.

During heat setting, the draw ratio used for stretching the film may be increased, maintained, or decreased compared to the draw ratio used to induce the substantially uniaxial orientation. In other words, the film 32 may be further stretched or the stretching may be relaxed, e.g. with a toe-in (reduction in stretch ratio) as provided by an edge gripping mechanism in any of these steps. For example, the take-away can be toed-in or the film 32 may be gripped in a clip system and conveyed by it through the separate oven device with a variable width profile, e.g. a toe-in or an increase in stretch perhaps also followed by a subsequent toe-in. The heat set procedure may be performed with the film continuously gripped and under tension, e.g. using an edge gripping profile of increase or reduced tension or both as controlled by the separation profile of the opposing grips, or gripped continuously or discontinuously along a system of converging and diverging rails. The film can also be unconstrained at the edges.

Heat setting can also be combined with other film post-processing. For example, the film may be coated and dried or cured in an oven with some heat setting effect.

Figure 22:
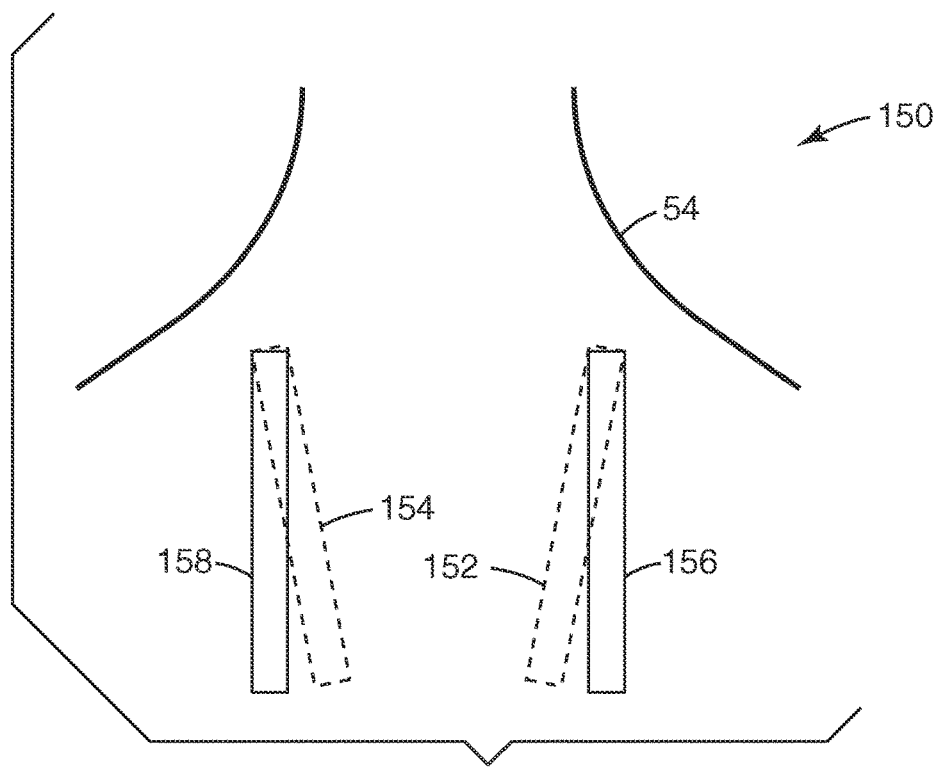
FIG. 22 is a schematic illustration of one embodiment of a take-away system for a stretching apparatus according to the present disclosure.

In some embodiments, such as that illustrated in FIG. 22, a takeaway system 150 can use any film conveyance structures such as tracks 150, 152 with gripping members such as, for example, opposing sets of belts or tenter clips. TD shrinkage control can be accomplished using tracks 152, 154 which are angled (as compared to parallel tracks 156, 158 that could be used in other embodiments of a suitable take-away system 150). For example, the tracks 152, 154 of the take-away system 150 can be positioned to follow a slowly converging path (in one embodiment, making an angle θ of no more than about 5°) through at least a portion of the post conditioning region 70 to allow for TD shrinkage of the film 32 with cooling. The tracks 152, 154 in this configuration allow the control of TD shrinkage to increase uniformity in the shrinkage. In other embodiments, the two opposing tracks 152, 154 can be diverging typically at an angle of no more than about 3° although wider angles can be used in some embodiments. This can be useful to increase the MD tension of the film 32 in the primary stretching region 66 to, for example, reduce property non-uniformity such as the variation of principal axes of refractive index across the film 32.

Figure 23:
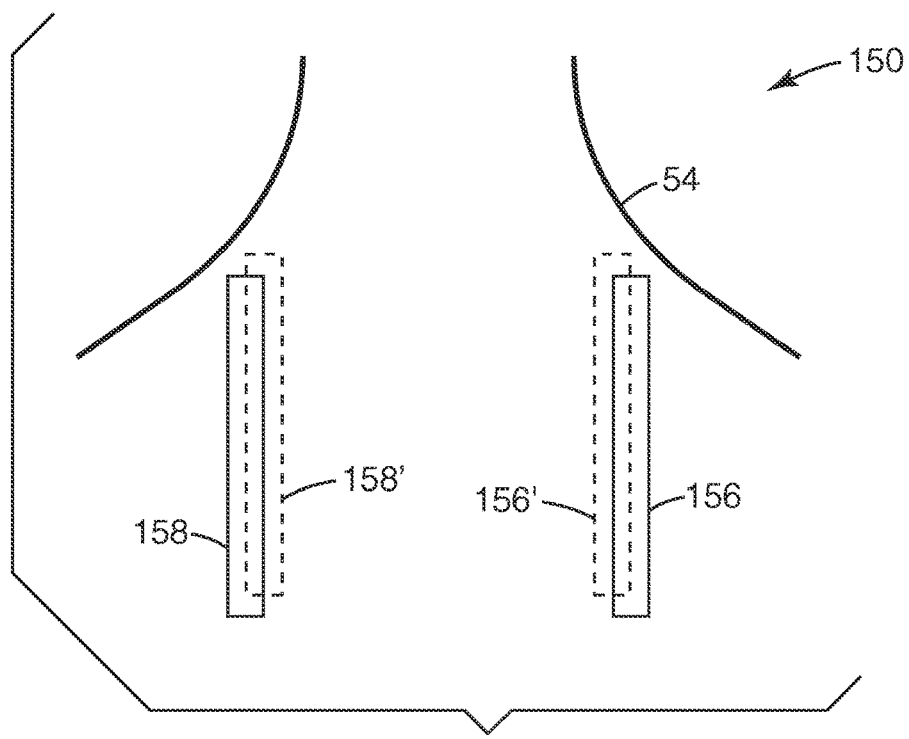
FIG. 23 is a schematic illustration of another embodiment of a take-away system for a stretching apparatus.

In some embodiments, the position of the take-away system 150 can be adjustable to vary the position along the stretching apparatus 50 at which the take-away system 150 grips the film 32, as illustrated in FIG. 23, This adjustability provides one way to control the amount of stretching to which the film 32 is subjected. Film 32 received by tracks 156', 158' of a take-away system earlier in the stretch (shown by dotted lines in FIG. 23) will generally have a smaller TDDR than would film received by a tracks 156, 158 of a take-away system 150 positioned later in the stretch (shown in solid lines in FIG. 23). The take-away system 150 can also, optionally, allow adjustment in the distance between the opposing tracks 152, 154, 156, 158 of the take-away system 150. In addition, the take-away system 150 can also, optionally, be configured to allow adjustment in the length of the take-away system 150.

Figure 24:
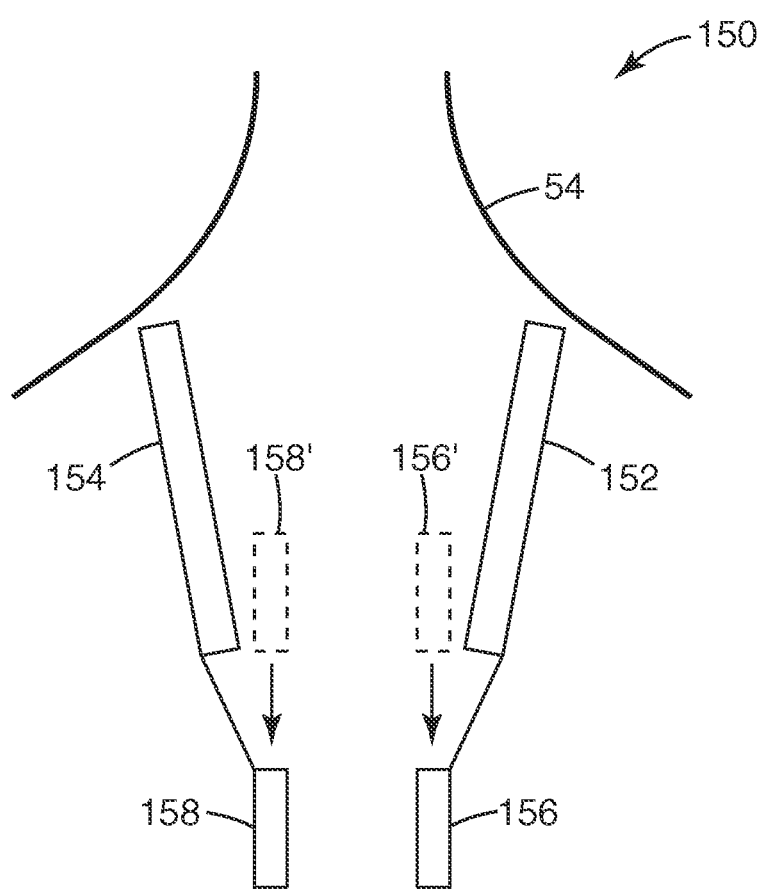
FIG. 24 is a schematic illustration of a third embodiment of a take-away system for a stretching apparatus.
Figure 25:
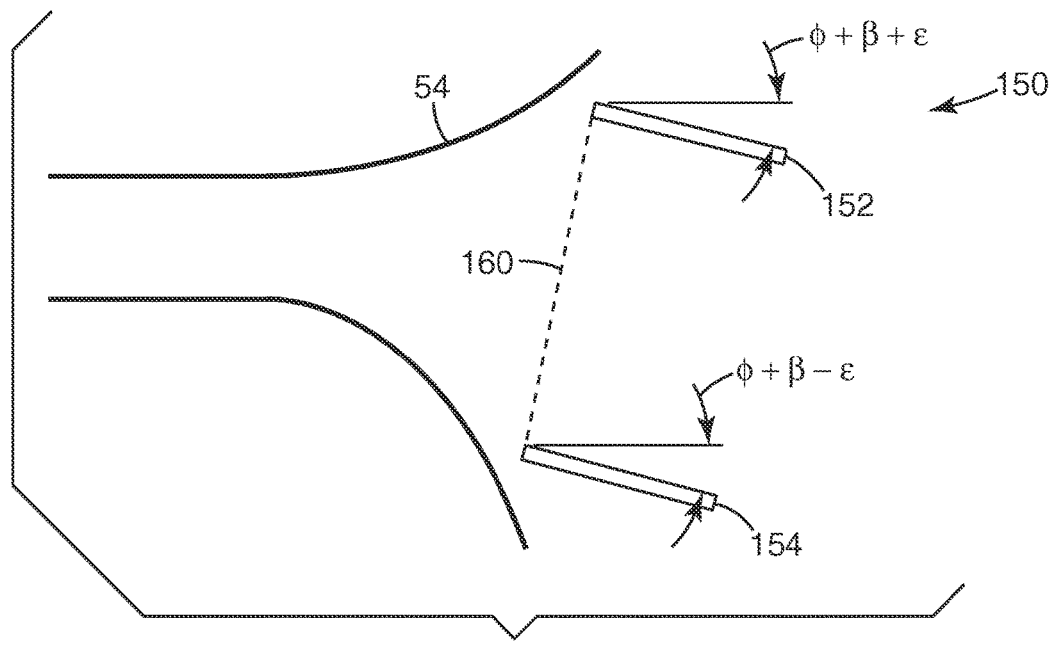
FIG. 25 is a schematic illustration of a fourth embodiment of a take-away system for a stretching apparatus.

Another example of a possible take-away system 150, illustrated in FIG. 25, includes at least two different regions with separated tracks 152, 154, 156, 158. These regions can be formed using two separate sets 152, 154 and 156, 158 of opposing tracks as illustrated in FIG. 24. In one embodiment, illustrated in FIG. 24, the first region can include tracks 152, 154 that are disposed, at a convergence angle to provide TD shrinkage control and the tracks 156, 158 in the second regions can be parallel. In other embodiments, the opposing tracks of the two different regions can be set at two different convergence angles to provide TD shrinkage control, as described above, or the first region can have parallel tracks and the second region have tracks disposed at a convergence angle to provide TD shrinkage control. Alternatively or additionally, the two different tracks can be set at two different takeaway speeds to decouple the primary stretching region 66 from a takeaway region that applies tension to remove wrinkles.

In one embodiment of the take-away system 150 illustrated in FIG. 24, the tracks 156', 158' are nested within the opposing tracks 152, 154 prior to receiving the film 32. When the film 32 is initially received by the opposing tracks 152, 154, the tracks 156', 158' move to the position 156, 158 illustrated in FIG. 24. In other embodiments, the opposing tracks 152, 154, 156, 158 are positioned as illustrated in FIG. 24 (i.e., not nested) in the absence of any film 32. Another example of a take-away system is illustrated in FIG. 25, In this example, the tracks 152, 154 of the take-away system are angled with respect to the centerline of the film 32 as the film 32 is conveyed through the tracks 54 of the primary stretching region 66.

The angle of the two opposing conveyance mechanisms 152, 154 can be the same, for example, an angle β, or the angle can be different and can be described as β+ε for one track 152 and β−ε for the other track 154. Typically, β is at least about 1° and can be an angle of about 5°, 10°, or 20° degrees or more. The angle ε corresponds to the converging or diverging angle described above to provide TD shrinkage control, for example. In some embodiments, the tracks 54 in the primary stretching zone 66 can also be disposed at an angle φ and the tracks 152, 154 are angled at φ+β+ε and φ+β−ε as illustrated in FIG. 25. An angled take-away system 150, primary stretching zone 66, or both can be useful to provide films 32 where the principal axis or axes of a property of the film 32, such as the refractive index axes or tear axis, is angled with respect to the film 32. In some embodiments, the angle that the take-away system 150 makes with respect to the primary stretching zone 66 is adjustable manually or mechanically using a computer-controlled driver or other control mechanism or both.

Figure 26:
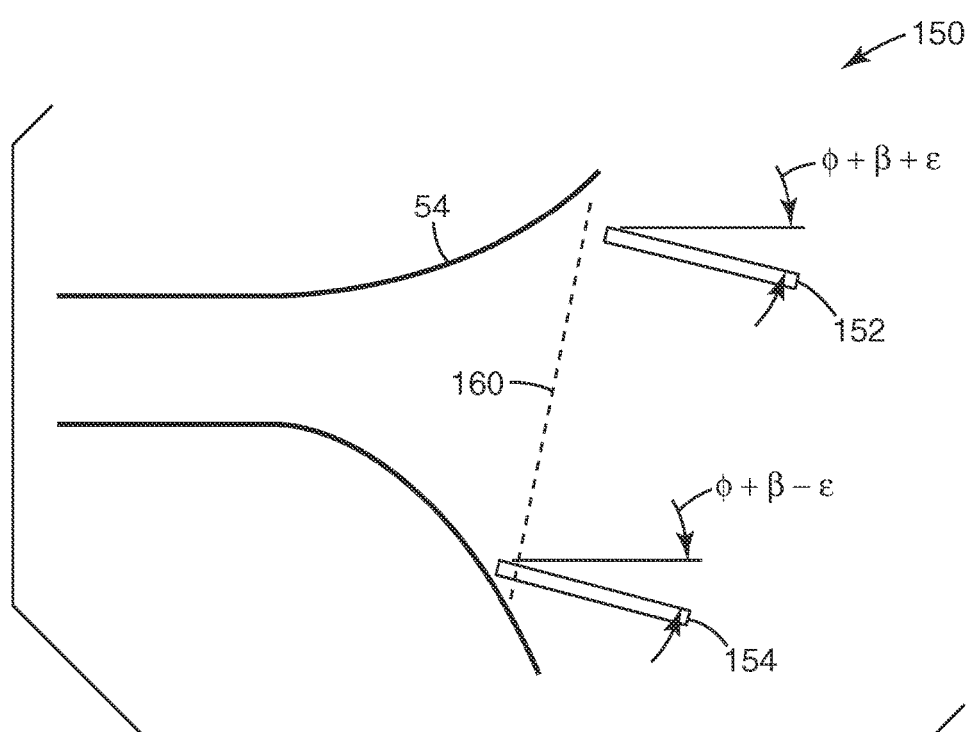
FIG. 26 is a schematic illustration of a fifth embodiment of a take-away system for a stretching apparatus.

In some embodiments using an angled take-away system 150, the two opposing tracks 152, 154 are positioned to receive film 32 having the same or substantially similar TDDR (where the dotted line 160 indicates film 32 at the same TDDR), as illustrated in FIG. 25. In other embodiments, the two opposing tracks 152, 154 are positioned to receive the film 32 so that the TDDR is different, for the two opposing tracks 152, 154 (the dotted line 160 of FIG. 26 indicates film 32 at the same TDDR), as illustrated in FIG. 26. This latter configuration can provide a film 32 with properties that change over the TD dimension of the film 32.

Referring back to FIG. 10, release of the selvages from a continuous gripping mechanism can be done continuously; however, release from discrete gripping mechanisms, such as tenter clips, should preferably be done so that all the material under any given clip is released at once. Discrete release mechanisms may cause larger upsets in stress that may be felt by the stretching web upstream. In order to assist the action of the isolating takeaway device, it is preferred in one embodiment to use a continuous selvage separation mechanism in the device, such as, for example, the "hot" slitting of the selvage 76 from the central portion of a heated, stretched film.

In one embodiment, the slitting location 78 is preferably located near enough to the "gripline," e.g. the isolating takeaway point of first effective contact by the gripping members of the take-away system, to minimize or reduce stress upsets upstream of that point. If the film is slit before the film is gripped by the take-away system, instable take-away can result, for example, by film "snapback" along TD. The film is thus preferably slit at or downstream of the gripline. Slitting is a fracture process and, as such, typically has a small but natural variation in spatial location. Thus it may be preferred to slit slightly downstream of the gripline to prevent any temporal variations in slitting from occurring upstream of the gripline. If the film is slit substantially downstream from the gripline, the film between the take-away and boundary trajectory will continue to stretch along TD. Since only this portion of the film is now stretching, it now stretches at an amplified draw ratio relative to the boundary trajectory, creating further stress upsets that could propagate upstream, for example, undesirable levels of machine direction tension propagating upstream.

The slitting is preferably mobile and re-position able so that it can vary with the changes in takeaway positions needed to accommodate variable final transverse draw direction ratio or adjustment of the position of the take-away system. An advantage of this type of slitting system is that the draw ratio can be adjusted while maintaining the stretch profile simply by moving the take-away slitting point 78.

A variety of slitting techniques can be used including a heat razor, a hot wire, a laser, a focused beam of intense infrared (IR) radiation or a focused jet of heated air. In the case of the heated jet of air, the air may be sufficiently hotter in the jet to blow a hole in the film, such as by heat softening, melting, or controlled fracture under the jet. Alternatively, the heated jet may merely soften a focused section of the film sufficiently to localize further stretching imposed by the still diverging boundary trajectories, thus causing eventual fracture downstream along this heated line through the action of continued film extension. The focused jet approach may be preferred in some cases, especially when the exhaust air can be actively removed, e.g. by a vacuum exhaust, in a controlled fashion to prevent stray temperature currents from upsetting the uniformity of the stretching process. For example, a concentric exhaust ring around the jet nozzle can be used. Alternatively, an exhaust underneath the jet, e.g. on the other side of the film, can be used. The exhaust may be further offset or supplemented downstream to further reduce stray flows upstream into the stretching zone.

Another attribute of one embodiment of the take-away system is a method of speed and or MD tension control so that the film can be removed in a manner compatible with the output speed. In one embodiment, this take-away system is used to pull out any residual wrinkles in the film. In one example, the wrinkles are initially pulled out during start up by a temporary increase in the takeaway speed above the output speed of the final, released portion of the stretched film. In another example, the wrinkles are pulled out by a constant speed above the output film MD speed during continuous operation, such as in the case of a super-uniaxial stretch in the final portion of stretch. In yet another example, the speed of the takeaway is set above the MD velocity of the film along the boundary trajectories at the gripline. This can also be used to alter the properties of the film. This over-speed of the takeaway can also reduce the final value of U; in some cases, this is a consideration in the context of the final end use of the film.

Figure 27:
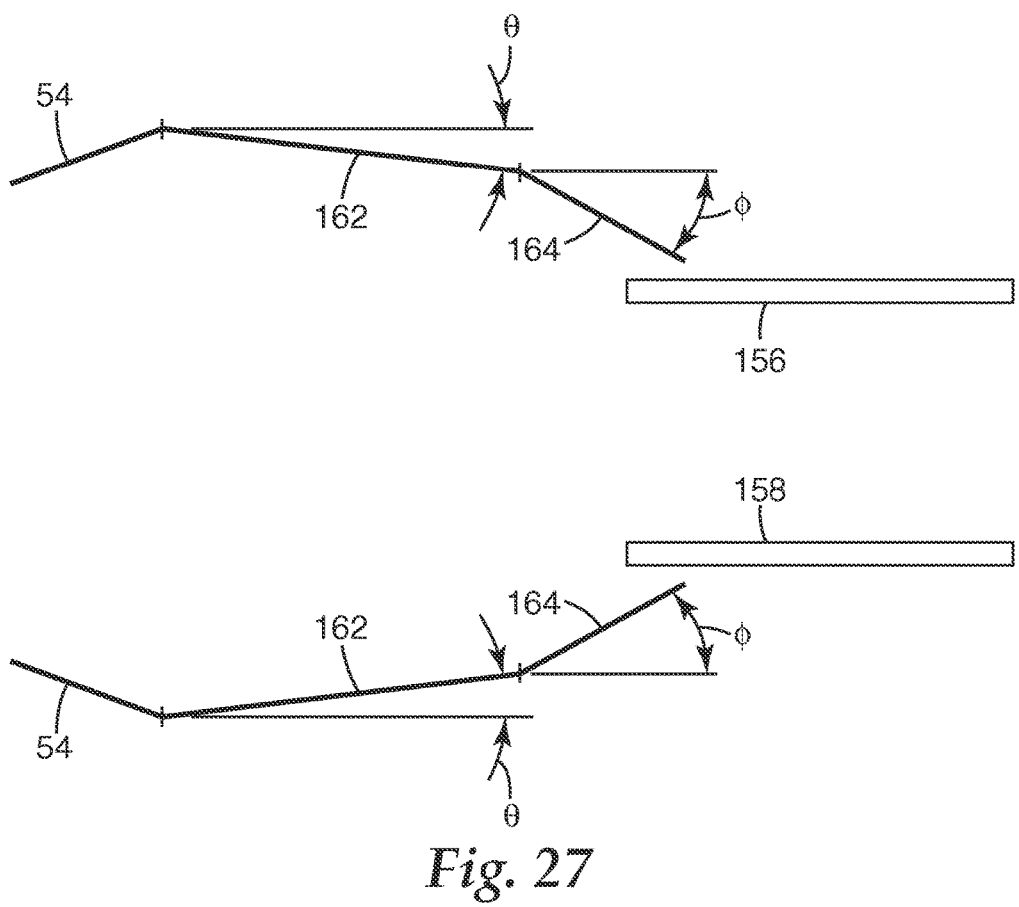
FIG. 27 is a schematic illustration of one embodiment of a take-away system, for using in, for example, a conventional stretching apparatus such as that illustrated in FIG. 2.

The principles of MD and TD shrinkage control described above can also be applied to other stretching apparatuses including the conventional tenter configuration illustrated in FIG. 2. FIG. 27 illustrates an embodiment in which the tracks 54 from a primary stretching region 66 (such as the linear diverging tracks illustrated in FIG. 2) continue into or through a portion of a post-conditioning region 70 (see FIG. 10). The film is then optionally captured by an isolated takeaway system 156, 158, if desired. The continuation of the tracks 54 can be used to cool the film and allow for shrinkage of the film.

In some embodiments, the continued tracks 162 follow a slowly converging path (making an angle θ of no more than about 5° in one embodiment) through at least a portion of the post conditioning region 70 to allow for TD shrinkage of the film with cooling. The tracks in this configuration allow the control of TD shrinkage to increase uniformity in the shrinkage. In some embodiments, the tracks 164 follow a more aggressively converging path (making an angle φ of at least 15° in some embodiments, and typically in the range of 20° and 30°) through at least a portion of the post conditioning region 70 to provide MD shrinkage control of the film with cooling. In some embodiments as illustrated in FIG. 27, the post conditioning region 70 includes both slowly converging tracks 162 and more aggressively converging tracks 164. In other embodiments, only one set of tracks 162 or tracks 164 is used.

One useful measure of the uniaxial character of the film made in accordance with a substantially uniaxial stretch process is the "extent of unixial character" described e.g. in U.S. Pat. No. 6,939,499, incorporated herein by . The approximate uniaxial character of the resulting film can be discerned by this process measurement. In one measure, the extent of uniaxial character is derived from the nominal draw ratios as set by the bounding trajectories at the gripping edges of the device during stretching, as further modified by the conditions of the take away system. In another measure of the extent of uniaxial character, the actual draw ratios of the film can be directly measured, e.g., by physical marking of the initial input cast web or film with a grid pattern of known size, and re-measurement after final film formation, e.g. the factor $\rho_f$.

The heat setting of the present disclosure allows for a greater range of control on the allowable set of refractive indices. In particular, higher values can be obtained at a fixed level of optical power as measured by the difference between nx and nu (discussed below), or a still higher nu value at lower levels of optical power can be obtained.

The heat treatment allows an additional measure of control on the set of principal refractive indices initially resulting from the stretch and may impart additional advantages such as, for example, improved dimensional stability including shrinkage control, enhanced creep resistance, improved imprint resistance, as well as enhanced tear resistance and other physical properties.

In some films comprising certain material systems, the heat treatment maintains or even improves the extent of uniaxial character in the resulting final film. In the case of optical films, this can maintain or even improve performance in applications using non-normal incident light. For example, so-called off-angle color performance can be maintained or improved in multilayer optical films (MOF) used for brightness enchancement. MOF films used for polarizing beam splitting can also be enhanced. The method can also be used to enhance orientation and performance of microstructures formed on the surface of the film, e.g. in a polarizing beam splitting application.

For multilayer reflective polarizing films with a high degree of uniaxial orientation (e.g. as achieved by a truly uniaxial stretching process), higher levels of contrast can be achieved with a fixed material constructions, i.e. fixed low index material. This can be applied generally in applications that use these films, for example, in polarizing beam splitter applications, e.g. as described in U.S. Pat. No. 6,609,795 and U.S. Patent Application Publication No. 2004/0227994 using the films separately or together in stacks of two of more such films.

Using a heat setting step, imprint resistance can be achieved using a high index skin layer. In many systems, the imprint resistance is increased through the increased crystallinity in an oriented skin layer. The oriented skin layer may comprise a material similar to a birefringent layer in the optical stack of an MOF or it may include a different material suitably chosen to co-extrude and orient in the film formation process.

Heat setting may also relieve the existence of "residual stresses" often remaining in the film after stretch, depending for example on the restraint conditions during or after heat setting. Reduced restraint, achieved by toe-in, for example, can contribute to stress reduction. This can lead to improved dimensional stability including lower levels of shrinkage, lower levels of thermal expansion, and improved resistance to warpage.

Other possible mechanical improvements upon heat setting may be increased tear resistance or even increased inter-layer delamination resistance. In some systems, high temperature heat setting near the melting point improves the interlayer adhesion. For example, it may improve the interfacial penetration between layers that can be perturbed during the stretching process.

Further, when the method of the present disclosure is applied to a film construction including a strain-induced crystallized polyester skin layer, the imprint resistance of the film is improved. Light levels of heat treatment do not significantly change the result; however, a heavier level of heat treatment creates a film with essentially no denting.

In one embodiment, one or more of the heat set film layers remains amorphous, leading to improved web handling and mechanical properties. In an exemplary embodiment, the amorphous layers comprise polycarbonate or a blend of polycarbonate and copolyester.

In certain polyester systems, heat setting provides higher optical power or birefringence at a much lower draw ratio than is otherwise typically achieved by stretching alone. For example, polyesters such as PET, PEN and compositions including both PET and PEN are typically stretched to draw ratios of 4, 5, 6 or higher. These materials may be stretched to just above the strain-induced crystallization point and then heat set to achieve index values comparable to those higher draw ratios. As a further example, a film with a microstructured surface may be stretched in the cross direction, e.g. perpendicular to an elongate direction, at a substantially reduced draw ratio that may not overly destroy the shape of the intended final structures. See, for example, copending, commonly assigned U.S. Provisional Application Ser. No. 60/638,732; U.S. application Ser. No. 11/184,027; filed Dec. 23, 2004, incorporated herein by . High levels of index can be achieved throughout the microtextured structure along the cross direction as long as the onset point of significant strain-induced crystallization has been surpassed throughout the structure. This is especially useful for making structures with "fiber symmetric" index sets with high birefringence when the structures have a height varying or "profile" direction perpendicular to the stretch direction.

In the case of true or nearly uniaxially oriented films, the ny and nz are nearly identical, e.g. within a few hundredths of an index unit. An interesting and informative view of the space of allowable index sets can be obtained with the data reduction illustrated in FIG. 28.

Figure 28:
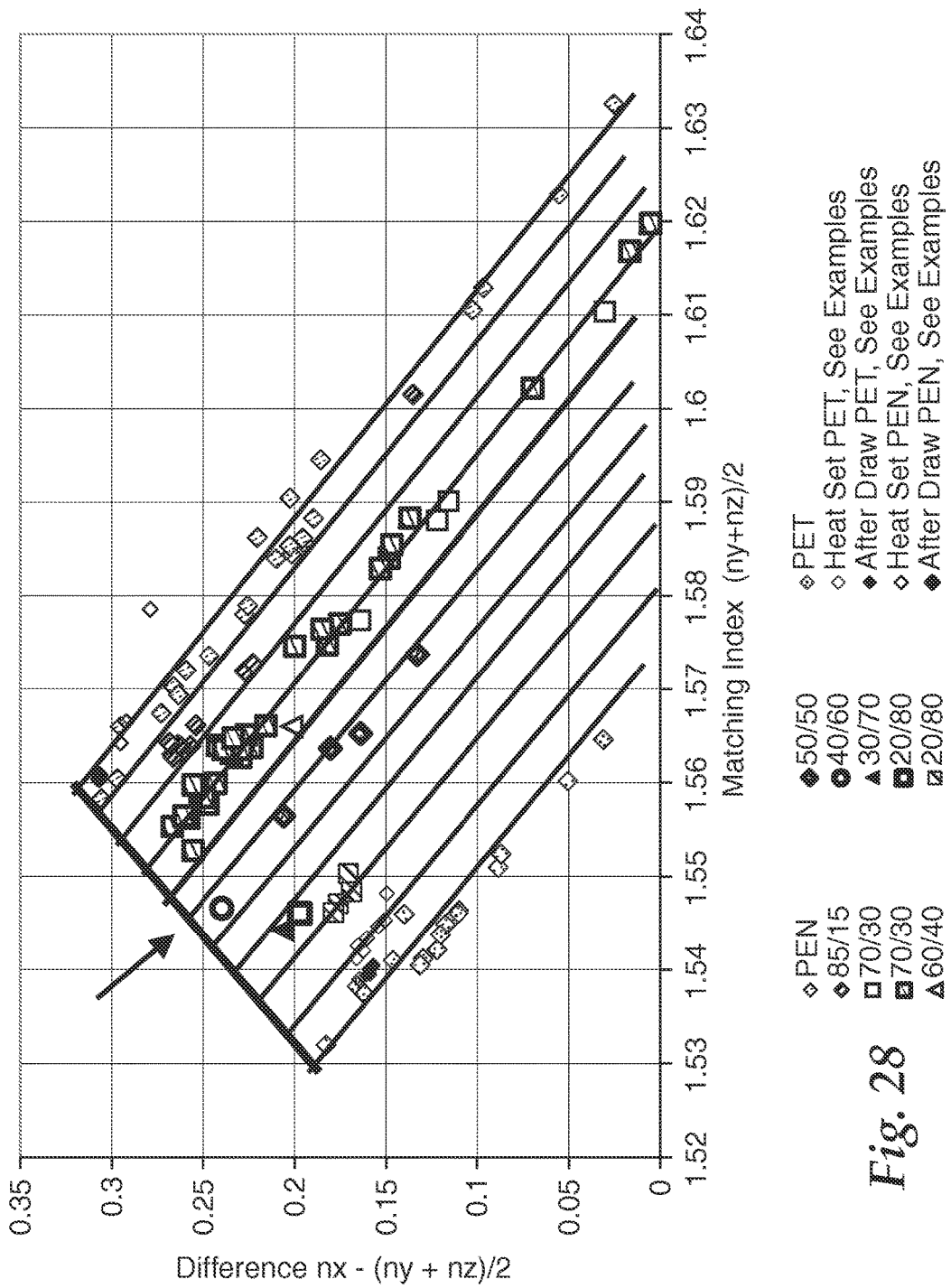
FIG. 28 is a plot of refractive index trends with composition.

To obtain the data plotted in FIG. 28, one first calculates the average of the ny and nz indices actually obtained, regardless of process conditions. The average value, defined here as nu for "uniaxial index of refraction," is a measure of the expected ny/nz value in a "virtual" truly uniaxial condition. In a multilayer optical film (MOF) polarizer, which includes alternating layers of birefringent and isotropic polymeric materials, nu is the target pass state refractive index value of the birefringent material to match to the isotropic index of the second, in some cases low index, material layer.

Second, one takes the difference between nx and nu. This difference is the block state index difference, a measure of the reflective power or optical power of the MOF polarizer in the virtual state.

Third, one plots the block state index difference versus the virtual truly uniaxial pass state index nu.

FIG. 28 shows the resulting plot for a variety of stretch conditions, both truly uniaxial as described above and simply one-directional as performed in a conventional tenter apparatus (FIGS. 2-3). The data cover a wide range of effective molecular orientations as induced by stretch temperature, rate and draw ratio, for polyesters spanning the range of homopolymer PEN, through the various "coPENs" to the homopolymer PET. The coPENS are expressed in terms of the ratio of mole percent PEN-like moiety to mole percent PET-like moiety; for example, 85/15 co-polymer, a so-called "85/15 coPEN," is a copolymer having 85 mole percent PEN-like moiety and 15 mole percent PET-like moiety.

As a guide to the data, un-fitted, equally spaced, parallel lines are arranged in 10 weight % intervals across the composition range. So, the top line follows the trend for 100% PEN. The next line represents 90% PEN and 10% PET; the following line represents 80% PEN and 20% PET, and so forth. The bottom line follows the trend for 100% PET.

The data remarkably falls close to these lines across the composition range. The effect of heat setting following a substantially uniaxial orientation is shown for the examples of PET and PEN and intermediate compositions including both PET and PEN. With to PET, for example, it can be seen that heat setting effectively moves the index set up a line. Thus, after 100% PET is heat set, it optically behaves more like a coPEN of 10% PEN and 90% PET. With reference to PEN, for example, it can be seen that heat setting also effectively moves the index set up. Thus, heat setting generally results in higher optical power (on the y-axis) for a given material, particularly at a given matching index (on the x-axis).

Moreover, for a given level of optical power (on the y-axis), heat setting increases the matching index (on the x-axis) by about 0.01 or more, compared to the untreated material. The greater control in nu for a given high index, birefirengent material, such as PET, for example, allows additional flexibility in the choice of materials, especially the second, in some cases low index, material in an optical film such as a MOF. Typically this second material is chosen to match the ny index of the oriented polyester in a polarizing film. Often this second material is a copolyester chosen not only for its index matching but also for its flow compatibility and mechanical attributes. Generally, a higher index target allows for a higher glass transition of such materials. Thus an additional advantage is the additional dimensional stability obtained in MOF construction using a low index material with higher glass transition temperature. Moreover, the use of higher index materials allows for MOF construction with thinner and/or fewer layers.

Remarkably, unlike the asymmetric case, it appears that the heat setting of the present disclosure of substantially uniaxially stretched films either maintains or actually increases the extent of uniaxial character of the films.

Another measure of uniaxial character is the relative birefringence, which compares the differences between the two similar refractive indices, e.g. ny and nz, and between the significantly different refractive index, e.g. nx along the main stretch direction, and the average of the two similar indicies, e.g. nu. More precisely, the relative birefringence is given by:

Relative birefringence=|ny−nz|/|nx−nu| where again nu is the average of the two similar indices of refraction, ny and nz, and the absolute values of the differences are taken. The relative birefringence decreases as the uniaxial character of the films increases.

In some exemplary embodiments, it appears that the heat setting of the present invention either maintains or actually decreases the relative birefringence, particularly in certain polyester systems in which the relative birefringence before heat-setting is 0.1 or less. In other exemplary embodiments, small increases in the relative birefringence result. In many embodiments, the final relative birefringence can be 0.1 or less, even as an (absolute) in-plane birefringence (e.g. at 632.8 nm) of 0.1 or more is achieved. In other embodiments, the final relative birefringence is 0.25, 0.2 or less.

The nature of the tension in the stretch direction (TD in one example) during the heat setting of the present example is an important factor in the control of the index set. In general, a higher level of TD tension through the heat setting process tends to increase nx more than ny/nz, while a lower or zero level of TD tension tends to increase the ny/nz while the nx increases slightly or even decreases in value. Thus, low tension is useful in increasing the ny/nz value, while high tension is useful in increasing optical power at a fixed nu level. Thus the processes described herein provide a method for contrast improvement with a fixed material construction.

EXAMPLES

General Notes on Examples:

Two polyester-based constructions using two methods for making nearly truly uniaxial film are exemplified. The first set of examples include multilayered optical films (MOF) with a PET outer skin layer made through a batch tentering process as described herein with to FIG. 7. The second set of examples comprise MOF with a PEN outer skin made through a parabolic tentering process such as that described in U.S. Pat. Nos. 6,939,499; 6,916,440; 6,949,212; and 6,936,209.

Heat setting was performed in a batch stretching device in which the film could be constrained in the x and or y directions with edge grippers. The stress in these constrained directions was also measured during the course of the heat setting. The films were heat set at 175° C. for three minutes, unless otherwise noted.

In the examples, the x direction is associated with the so-called transverse direction (TD) and the y direction is associated with the machine direction (MD).

Indices of refraction were measured using a Metricon Prism Coupler, available from Metricon, located in Piscataway, N.J. In general, two modes can be measured with the device. The TE mode is used to measure an in-plane index of refraction. The TM mode is used to measure the through-thickness (for example, "z") index of refraction. One may therefore measure in the TM mode for various orientations of the in-plane states. For example, one may use the TM mode when the film is oriented to measure the in-plane index in the TD direction (noted as TD/z). As another example, the TM mode may be used with the film rotated to measure the MD in-plane index (noted as MD/z). In general, the through-thickness indices should be about the same regardless of the in-plane orientation. However, discrepancies may arise due to the sharpness of the signal as a function of film orientation.

PET Examples:

MOF films with PET skin layers were highly extended using the batch tentering process described in FIG. 7 (Examples 1-7). The index development in the PET skins after the stretching step was measured using an average of "top"

and "bottom" sides using a Metricon Prism coupler. Because of the extreme thinness of the outer PET layer, wave coupling modes rather than a sharp knee were observed in the reflected intensity vs. incidence angle plot. To improve precision, the index was uniformly measured as the location of the leading edge of the first observed mode. This reasonably agrees with wave mode fitting under certain circumstances, but may lead to a small understatement of nx in other circumstances. The ny and nz modes typically have less sharp readings. Again the leading edge of the intensity drop was used.

Using this method the initial indices averaged 1.699, 1.541 and 1.539 at 632.8 nm, for the nx, ny and nz respectively. The initial relative birefringence using these index values is thus 0.013.

The overall results are presented in Table 1 below.

TABLE 1

| PET Examples | Refractive Indices at 632.8 nm TD top | TD bot | TD ave | MD top | MD bot | MD ave | In-plane orientation/ TM mode measured TD/z top | MD/z top | TD/z bot | MD/z bot | ND ave | Uniax limit MD − Z | TD − MD |
|---|---|---|---|---|---|---|---|---|---|---|---|---|---|
| | | | | | Example 1: Slight Draw TD w heat | | | | | | | | |
| Start, Before Heat Set | 1.6939 | 1.7035 | 1.6987 | 1.5407 | 1.5402 | 1.5405 | 1.5391 | 1.5392 | 1.5387 | 1.5385 | 1.5389 | 0.0016 | 0.1583 |
| 5% stretch & Heat Set | 1.7042 | 1.7106 | 1.7074 | 1.542 | 1.545 | 1.5435 | 1.5382 | 1.5385 | 1.5385 | 1.5402 | 1.5389 | 0.0046 | 0.1639 |
| Diff 1st-Start | | | 0.0087 | | | 0.0031 | | | | | 0.0000 | 0.0031 | 0.0056 |
| | | | | | Example 2: Slight Draw TD w heat | | | | | | | | |
| Start, Before Heat Set | 1.6936 | 1.7027 | 1.6982 | 1.5403 | 1.5403 | 1.5403 | 1.5391 | 1.5391 | 1.5378 | 1.5387 | 1.5387 | 0.0016 | 0.1579 |
| 5% stretch & Heat Set | 1.7012 | 1.7063 | 1.7038 | 1.5403 | 1.5403 | 1.5403 | 1.5374 | 1.5378 | 1.5371 | 1.5383 | 1.5377 | 0.0026 | 0.1635 |
| Diff 1st-Start | | | 0.0056 | | | 0.0000 | | | | | −0.0010 | 0.0010 | 0.0056 |
| | | | | | Example 3: Constrain TD/MD | | | | | | | | |
| Start, Before Heat Set | 1.6962 | 1.7043 | 1.7003 | 1.5409 | 1.5416 | 1.5413 | 1.5391 | 1.5385 | 1.5363 | 1.5365 | 1.5376 | 0.0036 | 0.1590 |
| After 1st Heat Set | 1.6995 | 1.7095 | 1.7045 | 1.5429 | 1.5421 | 1.5425 | 1.5418 | 1.5418 | 1.5421 | 1.5405 | 1.5416 | 0.0010 | 0.1620 |
| Diff 1st-Start | | | 0.0042 | | | 0.0012 | | | | | 0.0039 | −0.0027 | 0.0030 |
| | | | | | Example 4: Taut start MD free | | | | | | | | |
| Start, Before Heat Set | 1.6918 | 1.7029 | 1.6974 | 1.5412 | 1.5414 | 1.5413 | 1.5394 | 1.5396 | 1.5385 | 1.54 | 1.5394 | 0.0019 | 0.1561 |
| After 1st Heat Set | 1.7037 | 1.7124 | 1.7081 | 1.5438 | 1.5423 | 1.5431 | 1.5414 | 1.5421 | 1.5416 | 1.5432 | 1.5421 | 0.0010 | 0.1650 |
| Diff 1st-Start | | | 0.0107 | | | 0.0017 | | | | | 0.0027 | −0.0010 | 0.0090 |
| | | | | | Example 5: Slight Slack at start TD Tension dev. MD free | | | | | | | | |
| Start, Before Heat Set | 1.6933 | 1.7027 | 1.6980 | 1.5412 | 1.5403 | 1.5408 | 1.5389 | 1.5409 | 1.5382 | 1.5403 | 1.5396 | 0.0012 | 0.1573 |
| After 1st Heat Set | 1.6999 | 1.7080 | 1.7040 | 1.5441 | 1.5436 | 1.5439 | 1.544 | 1.5434 | 1.5418 | 1.5423 | 1.5429 | 0.0010 | 0.1601 |
| Diff End-Start | | | 0.0059 | | | 0.0031 | | | | | 0.0033 | −0.0002 | 0.0029 |
| | | | | | Example 6: TD no tension MD free | | | | | | | | |
| Start, Before Heat Set | 1.6925 | 1.703 | 1.6978 | 1.5418 | 1.5418 | 1.5418 | 1.54 | 1.5392 | 1.5391 | 1.5391 | 1.5394 | 0.0025 | 0.1560 |
| After 1st Heat Set | 1.6921 | 1.7003 | 1.6962 | 1.5476 | 1.5454 | 1.5465 | 1.5421 | 1.5443 | 1.5446 | 1.5454 | 1.5441 | 0.0024 | 0.1497 |
| Diff 1st-Start | | | −0.0016 | | | 0.0047 | | | | | 0.0048 | −0.0001 | −0.0063 |
| After 2nd Heat Set | 1.6928 | 1.703 | 1.6979 | 1.5472 | 1.5494 | 1.5483 | 1.5456 | 1.5458 | 1.5508 | 1.5501 | 1.5481 | 0.0002 | 0.1496 |
| Diff 2nd-start | | | 0.0002 | | | 0.0065 | | | | | 0.0087 | −0.0022 | −0.0063 |
| | | | | | Example 7: No Tension MD free | | | | | | | | |
| Start, Before Heat Set | 1.6957 | 1.7033 | 1.6995 | 1.5412 | 1.5398 | 1.5405 | 1.5392 | 1.5396 | 1.5398 | 1.5398 | 1.5396 | 0.0009 | 0.1590 |
| After 1st Heat Set | 1.6952 | 1.7029 | 1.6991 | 1.5449 | 1.5449 | 1.5449 | 1.5427 | 1.5447 | 1.5437 | 1.5461 | 1.5443 | 0.0006 | 0.1542 |
| Diff 1st-Start | | | −0.0004 | | | 0.0044 | | | | | 0.0047 | −0.0003 | −0.0048 |

The first two PET examples demonstrate the use of heat setting with a small continuing stretch ending at an addition 5% draw ratio. In these examples, the films were mounted taut in both x(TD) and y(MD) directions. Due to the discontinuous nature of the edge gripping system, the MD constraint is less than constant initial strain. The films demonstrate an increased nx and nearly constant ny and nz. A very small increase in asymmetry is noted. Removal of the MD constraint may reduce this asymmetry.

In the third PET example, the films were mounted taut in x and y but no stretching took place during heat setting. Again, the x index (TD index) increased while the try held nearly constant. Surprisingly, the nz increased upon heat setting, although some of this effect may be a result of the measurement as the knee sharpened after heat setting. Thus the asymmetry may have decreased or at least maintained in this case.

In the fourth PET example, the film was mount taunt only in the x direction. The largest increase in nx was observed here. The ny and nz each increased marginally.

In the fifth PET example, the film was begun with a slight slack built into the mounting. The 2.5 inch TD span was deflected about 0.25 inch out-of-plane by this slack. In this case, the nx increase was just slightly one-half that of the fourth PET example, but the ny increase was nearly double. The nz only marginally increased. The film appeared taut at the end of the heat setting.

In the sixth and seventh PET examples, the films were provided with double the initial slack of the fifth PET example. In these replicate cases, the films retained a slight residual slack after heat setting. The nx essentially remained constant in these cases, even as the ny and nz increased in nearly identical amounts. In the sixth case, the film was measured after the first heat setting and re-mounted for a second step, again 3 minutes at 175° C. Further increases in nx and ny were observed, again at nearly constant nx.

The effect of heat setting on the level of crystallinity was estimated using the estimated increase in density as inferred by the increases in the indices of refraction in accord with an anisotropic analogue of the Lorenz-Lorentz relationship as described in U.S. Pat. No. 6,788,463, incorporated herein by reference (see Lorentzian in Tables 2 and 4). The amorphous density was taken as 1.335 g/cc and the fully crystalline density as 1.457 g/cc. The volumetric polarizability was taken as 0.73757 cc/g. As shown in Table 2, the analysis indicates that the crystallinity (e.g. a crystal fraction of 0.32 fraction equals a 32% crystallinity) increased from just over 30% in these samples to 40% in the case of the double treated sixth PET example. In an exemplary embodiment, the PET has a crystallinity after heat setting greater than 33% (e.g., Example 2); in another exemplary embodiment, the PET has a crystallinity greater than 36% (e.g., Example 3 and Example 6 after $1^{st}$ heat set); in another exemplary embodiment, the PET has a crystallinity greater than 37% (e.g., Example 1 and Example 7 after $1^{st}$ heat set); in another exemplary embodiment, the PET has a crystallinity greater than 38% (e.g., Example 5); in another exemplary embodiment, the PET has a crystallinity greater than 39% (e.g., Example 4); and in another exemplary embodiment, the PET has a crystallinity greater than 40% (e.g., Example 6 after $2^{nd}$ heat set).

Higher extremes in time and temperature would be expected to further increase the levels of crystallinity and index changes.

TABLE 2

| PET Examples | TD ave | MD ave | ND ave | Relative Birefringence | Lorentzian | Density est | Crystal est. |
|---|---|---|---|---|---|---|---|
| Example 1: Slight Draw TD w heat ||||||||
| Start, Before Heat Set | 1.6987 | 1.5405 | 1.5389 | 0.0099 | 1.013126 | 1.3736004 | 0.316 |
| 5% stretch& Heat Set | 1.7074 | 1.5435 | 1.5389 | 0.0280 | 1.018289 | 1.3805995 | 0.374 |
| Diff 1st-Start | 0.0087 | 0.0031 | 0.0000 | | | | 0.057 |
| Example 2: Slight Draw TD w heat ||||||||
| Start, Before Heat Set | 1.6982 | 1.5403 | 1.5387 | 0.0102 | 1.012722 | 1.3730524 | 0.312 |
| 5% stretch& Heat Set | 1.7038 | 1.5403 | 1.5377 | 0.0161 | 1.014613 | 1.3756157 | 0.333 |
| Diff 1st-Start | 0.0056 | 0.0000 | −0.0010 | | | | 0.021 |
| Example 3: Constrain TD/MD ||||||||
| Start, Before Heat Set | 1.7003 | 1.5413 | 1.5376 | 0.0227 | 1.013557 | 1.3741843 | 0.321 |
| After 1st Heat Set | 1.7045 | 1.5425 | 1.5416 | 0.0058 | 1.017881 | 1.380046 | 0.369 |
| Diff 1st-Start | 0.0042 | 0.0012 | 0.0039 | | | | 0.048 |
| Example 4: Taut start MD free ||||||||
| Start, Before Heat Set | 1.6974 | 1.5413 | 1.5394 | 0.0123 | 1.013202 | 1.3737032 | 0.317 |
| After 1st Heat Set | 1.7081 | 1.5431 | 1.5421 | 0.0059 | 1.019906 | 1.3827922 | 0.392 |
| Diff 1st-Start | 0.0107 | 0.0017 | 0.0027 | | | | 0.075 |
| Example 5: Slight Slack at start ||||||||
| TD Tension dev. MD free ||||||||
| Start, Before Heat Set | 1.6980 | 1.5408 | 1.5396 | 0.0074 | 1.013311 | 1.3738507 | 0.318 |
| After 1st Heat Set | 1.7040 | 1.5439 | 1.5429 | 0.0061 | 1.018937 | 1.3814789 | 0.381 |
| Diff End-Start | 0.0059 | 0.0031 | 0.0033 | | | | 0.063 |
| Example 6: TD no tension MD free ||||||||
| Start, Before Heat Set | 1.6978 | 1.5418 | 1.5394 | 0.0156 | 1.013603 | 1.3742459 | 0.322 |
| After 1st Heat Set | 1.6962 | 1.5465 | 1.5441 | 0.0159 | 1.017499 | 1.3795283 | 0.365 |
| Diff 1st-Start | −0.0016 | 0.0047 | 0.0048 | | | | 0.043 |
| After 2nd Heat Set | 1.6979 | 1.5483 | 1.5481 | 0.0015 | 1.021004 | 1.3842807 | 0.404 |
| Diff 2nd-start | 0.0002 | 0.0065 | 0.0087 | | | | 0.082 |

TABLE 2-continued

| PET Examples | TD ave | MD ave | ND ave | Relative Birefringence | Lorentzian | Density est | Crystal est. |
|---|---|---|---|---|---|---|---|
| Example 7: No Tension MD free | | | | | | | |
| Start, Before Heat Set | 1.6995 | 1.5405 | 1.5396 | 0.0056 | 1.013843 | 1.3745717 | 0.324 |
| After 1st Heat Set | 1.6991 | 1.5449 | 1.5443 | 0.0039 | 1.018043 | 1.380266 | 0.371 |
| Diff 1st-Start | −0.0004 | 0.0044 | 0.0047 | | | | |

PEN Examples:

Multilayer optical films (MOF) with PEN skin layers were highly extended using the parabolic tentering process. Film was used from a single MD lane of the continuous final film to enhance reproducibility of the initial state. The index development in the PEN skin layers after the stretching step was measured using an average of "top" and "bottom" sides using a Metricon Prism coupler. The method of index measurements using the leading edge of the wave modes and intensity knees, as per the PET examples, were again used.

Two PEN skin replicate examples were made (Examples 8-9). The films were begun with a slight slack built into the mounting. The 2.5 inch TD span was deflected about 0.5 inch out-of-plane by this slack. Heat setting conditions were applied for 3 minutes at 175° C. The film retained residual slack after treatment. The index changes with heat setting are presented in Table 3.

As indicated in Table 3 below, the leading edge method ("by knee") compared very closely to the "offset" mode method provided in the software accompanying the Metricon. (The leading edge method was operator estimated, rather than using the knee estimation software accompanying the Metricon.) Using these methods the initial indices averaged 1.868, 1.569 and 1.553 at 632.8 nm, for nx, ny and nz respectively. The initial relative birefringence using these index values is thus 0.053.

As seen in the PET low/no tension cases, the ny and nz increased. However, under these conditions, the nx actually dropped significantly. One would therefore expect less subsequent film shrinkage. One difference between these cases is that the current PEN case does not have a large toe-in condition after stretch that the PET cases have. Thus, some of this index drop is related to residual stress relief and visco-elastic relaxation during the heat setting. It is expected that the PEN skin films after heat setting have significantly less high temperature shrinkage (for example, at temperatures above the glass transition of the PEN, up to the heat set temperature) than the untreated initial film. In the second replicate, the film was measured after the first heat setting and re-mounted for a second step, this time for 3 minutes at 190° C. Significant increases in ny and nz were observed, with only a slight drop in nx, in agreement with the trend of the sixth and seventh PET skin cases.

The untreated PEN-skin film, the film after the first heat set and the film after the more severe second heat set were all tested for mechanical dent/imprint resistance. To test for imprint resistance, a pressure sensitive adhesive was laminated onto one surface of the film and that surface was then laminated onto a glass slide. A piece of BEF™ brightness enhancement film, available from 3M Company, St. Paul Minn. was placed with its micro-textured surface against an exposed film surface with a weight of 150 g on top to ensure intimate contact. The resulting pressure was estimated as 200 g/sq. inch. The film was then tested for 24 hours at 85°

TABLE 3

| PEN Examples | Refractive Indices at 632.8 nm TD top | TD bot | TD ave | MD top | MD bot | MD ave | In-plane orientation/ TM mode measured TD/z top | MD/z top | TD/z bot | MD/z bot | ND ave | Uniax limit MD − Z | TD − MD |
|---|---|---|---|---|---|---|---|---|---|---|---|---|---|
| Example 8: | | | | | | | | | | | | | |
| Meas. By Knee, Start before Heat Set | 1.8690 | 1.8662 | 1.8676 | 1.5681 | 1.5699 | 1.5690 | 1.5526 | 1.5542 | 1.5514 | | 1.5527 | 0.0163 | 0.2986 |
| Meas. By Offset, Start before Heat Set | 1.8671 | 1.8677 | 1.8674 | 1.5677 | 1.5691 | 1.5684 | 1.5530 | 1.5523 | 1.5511 | 1.5526 | 1.5523 | 0.0162 | 0.2990 |
| Averages between measurement methods | | | 1.8675 | | | 1.5687 | | | | | 1.5525 | | 0.2988 |
| After 1st Heat Set | 1.8593 | 1.8602 | 1.8598 | 1.5702 | 1.5709 | 1.5706 | 1.5577 | 1.5582 | 1.5580 | 1.5577 | 1.5579 | 0.0126 | 0.2892 |
| Diff 1st-Start | | | −0.0078 | | | 0.0015 | | | | | 0.0052 | −0.0036 | −0.0096 |
| Example 9: | | | | | | | | | | | | | |
| Meas. By Knee | 1.8671 | 1.8672 | 1.8672 | 1.5699 | 1.5704 | 1.5702 | 1.5506 | 1.5512 | 1.5496 | 1.5523 | 1.5509 | 0.0192 | 0.2970 |
| After 1st Heat Set | 1.8588 | 1.8587 | 1.8588 | 1.5740 | 1.5706 | 1.5723 | 1.5609 | | 1.5598 | 1.5613 | 1.5607 | 0.0116 | 0.2865 |
| Diff 1st-Start | | | −0.0084 | | | 0.0022 | very poor knees here | | | | 0.0097 | −0.0076 | −0.0106 |
| After 2nd Heat Set | | 1.8577 | 1.8577 | | 1.5825 | 1.5825 | | | 1.5738 | 1.5754 | 1.5746 | 0.0079 | 0.2752 |
| Diff 2nd-start | | | −0.0095 | | | 0.0124 | | | | | 0.0237 | −0.0113 | −0.0218 |

C. The initial film and the film with the light first heat setting were modestly imprint resistance, but significant denting occurred. The film with the second, more severe heat setting exhibited almost no dents.

Again, the effect of heat setting on the level of crystallinity was estimated using the estimated increases in density as inferred by the increases in the indices of refraction in accord with an anisotropic analogue of the Lorenz-Lorentz relationship as described in U.S. Pat. No. 6,788,463. The amorphous density for PEN was taken as 1.329 g/cc and the fully crystalline density as 1.407 g/cc. The volumetric polarizability was taken as 0.81501 cc/g. As shown in Table 4, the analysis indicates that the crystallinity increased very little in the first heat step, providing further evidence for the mechanism of index changes as one of visco-elastic relaxation.

This also indicates that the level of crystallinity is a major factor in imprint resistance. After the more extreme heat setting, the film acquired a much higher level of crystallinity, estimated at about 48%. This more crystalline final film exhibited the highest level of imprint resistance among the example presented here.

In an exemplary embodiment, the PEN has a crystallinity after heat setting greater than 28% (e.g., Example 8); in another exemplary embodiment, the PEN has a crystallinity greater than 30% (e.g., Example 9 after 1st heat set); in another exemplary embodiment, the PEN has a crystallinity greater than 48% (e.g., Example 9 after $2^{nd}$ heat set).

As shown by the examples, second or subsequent heat setting steps can be used to obtain desired film properties.

After stretching, the film was quenched to room temperature and the refractive indices were measured at 632.8 nm using the Metricon Prism Coupler as 1.8436, 1.5668 and 1.5595 along the length, width and thickness directions, respectively. Thus, a relative birefringence of 0.061 was obtained after stretching.

The oriented film was then mounted with slight initial tension along the length, and uncontrained in the width, and heat at 170 degrees C. for two minutes. The film was quenched again, and the refractive indices were measured at 632.8 nm using the Metricon Prism Coupler as 1.8404, 1.5718 and 1.5492 along the length, width and thickness directions, respectively. Thus, a relative birefringence of 0.081 was obtained after stretching.

Co-polyester Example 11:

An 85/15 coPEN was formed and drawn in similar manner to of example 10. A film comprising this material can be used as a birefringent layer in a multilayer optical film, e.g. a reflective polarizer film.

The oriented film was then mounted with slight initial tension along the length, and uncontrained in the width, and heated at 190 degrees C. for 30 seconds. The film was further heated for 90 more seconds at 190 degrees C. while the draw ratio was reduced from its initial 5.5× after stretching to 4.7× after heat setting. The film was quenched again, and the refractive indices were measured at 632.8 nm using the Metricon Prism Coupler as 1.8185, 1.5827 and 1.5576 along the length, width and thickness directions, respectively. Thus, a relative birefringence of 0.101 was obtained after stretching.

TABLE 4

| PEN Examples | TD ave | MD ave | ND ave | Relative Birefringence | Lorentzian | Density est | Crystal est. |
|---|---|---|---|---|---|---|---|
| Example 8: | | | | | | | |
| Meas. By Knee, Start before Heat Set | 1.8676 | 1.5690 | 1.5527 | 0.0530 | 1.100845 | 1.3507131 | 0.278 |
| Meas. By Offset, Start before Heat Set | 1.8674 | 1.5684 | 1.5523 | 0.0526 | 1.100255 | 1.3499895 | 0.269 |
| Averages between measurement methods | 1.8675 | 1.5687 | 1.5525 | 0.0528 | | | 0.274 |
| After 1st Heat Set | 1.8598 | 1.5706 | 1.5579 | 0.0428 | 1.101116 | 1.3510461 | 0.282 |
| Diff 1st-Start | −0.0078 | 0.0015 | 0.0052 | | | | 0.009 |
| Example 9: | | | | | | | |
| Meas. By Knee | 1.8672 | 1.5702 | 1.5509 | 0.0627 | 1.100354 | 1.3501114 | 0.271 |
| After 1st Heat Set | 1.8588 | 1.5723 | 1.5607 | 0.0398 | 1.102886 | 1.3532172 | 0.310 |
| Diff 1st-Start | −0.0084 | 0.0022 | 0.0097 | | | | 0.040 |
| After 2nd Heat Set | 1.8577 | 1.5825 | 1.5746 | 0.0283 | 1.11388 | 1.3667074 | 0.483 |
| Diff 2nd-start | −0.0095 | 0.0124 | 0.0237 | | | | 0.213 |

CoPEN Examples:

Co-polyester Example 10:

A co-polyester, intermediate in composition between PEN and PET, was formed by charging an extruder with a pellet mixture of 85 mol % PEN (with an approximate intrinsic viscosity (IV) of 0.5) and 15 mol % PET (with an approximate IV of 0.8). These transesterified in-situ during extrusion and were cast to form a clear unoriented cast web comprising a so-called 85/15 coPEN. A film comprising this material can be used as a birefringent layer in a multilayer optical film, e.g. a reflective polarizer film.

A strip 6 cm long by 2.5 cm wide was cut from the cast web and drawn on a laboratory stretching apparatus. The strip was pre-heated for 1 minute at 130 degrees C. and drawn along its length without constraint in its width at a nominal draw rate of 20%/second to a final draw ratio of 5.5 as measured by fiducial marks placed on the film before stretching.

Heat Set Uniaxially Oriented Multi-layer Optical Films with Polycarbonate/Copolyester Blend Isotropic Layers Comparative Example 1

Multilayer Optical Film—PEN/CoPEN5545HD/CoPEN7525HD Reflective Polarizer

A multilayer reflective polarizer film was constructed with first optical layers created from a polyethylene naphthalate and second optical layers created from copolyethylenenaphthalate (CoPEN5545HD) and skin layers or non-optical layers created from a higher Tg copolyethylenenaphthalate (CoPEN7525HD).

The above described PEN and CoPEN5545HD were coextruded through a multilayer melt manifold to create a multilayer optical film with 275 alternating first and second optical layers. This 275 layer multi-layer stack was divided into 3 parts and stacked to form 825 layers. The PEN layers were the first optical layers and the CoPEN5545HD layers were the second optical layers. In addition to the first and second optical layers, a set of non-optical layers, also comprised of CoPEN5545HD were coextruded as PBL (protective boundary layers) on either side of the optical layer stack. Two sets of skin layers comprising CoPEN7525HD were also coextruded on the outer side of the PBL non-optical layers through additional melt ports. The multi-layer film construction was in order of layers: CoPEN7525HD skin layer, a CoPen5545HD PBL, 825 alternating layers of optical layers PEN/CoPEN5545HD, a second CoPen5545HD PBL, and a second skin layer CoPEN7525HD.

The multilayer extruded film was cast onto a chill roll at 15 meters per minute (45 feet per minute) and heated in an oven at 150° C. (302° F.) for 30 seconds, and then uniaxially oriented at a 5.5:1 draw ratio. After orientation, the drawn multi-layer film was passed through a heat set oven at 200° C. for 15 seconds. A reflective polarizer film of approximately 150 microns (6 mils) thickness was produced which was too mechanically brittle for web handling, winding into a roll, or die-cutting into film parts without breaking.

Comparative Example 2

Multilayer Optical Film—CoPEN9010/CoPEN-tbia/CoPEN-tbia Reflective Polarizer

A multilayer reflective polarizer film was constructed with first optical layers created from a copolyethylenenaphthalate (CoPEN9010) and second optical layers created from copolyethylenenaphthalate (CoPEN-tbia) and skin layers or non-optical layers created from copolyethylenenaphthalate (CoPEN-tbia).

The above described CoPEN9010 and CoPEN-tbia were coextruded through a multilayer melt manifold to create a multilayer optical film with 275 alternating first and second optical layers. The CoPEN9010 layers were the first optical layers and the CoPEN-tbia layers were the second optical layers. In addition to the first and second optical layers, a set of non-optical layers, also comprised of CoPEN-tbia, were coextruded as PBL(protective boundary layers) on either side of the optical layer stack. Two sets of skin layers comprising CoPEN-tbia were also coextruded on the outer side of the PBL non-optical layers through additional melt ports. The multi-layer film construction was in order of layers: CoPEN-tbia skin and PBL layers, 275 alternating layers of optical layers CoPEN9010/CoPEN-tbia, and a second set of skin and PBL layers of CoPEN-tbia.

The multilayer extruded film was cast onto a chili roll at 15meters per minute (45 feet per minute) and heated in an oven at 150° C. (302° F.) for 30 seconds, and then uniaxially oriented at a 6.5:1 draw ratio. After orientation, the drawn multi-layer film was passed through a heat set oven at 200° C. for 15 seconds. A reflective polarizer film of approximately 37 microns (1.5 mils) thickness was produced which was too mechanically brittle for web handling, winding into a roll, or die-cutting into film parts without breaking.

Example 3

Multilayer Optical Film—PEN/CoPEN5050HH/SA115 Reflective Polarizer Film

A multilayer reflective polarizer film was constructed with first optical layers created from a polyethylene naphthalate and second optical layers created from copolyethylene naphthalate (CoPEN5050HH) and skin layers or non-optical layers created from a cycloaliphatic polyester/polycarbonate blend commercially available from Eastman Chemical CO. under the tradename "SA115."

The above described PEN and CoPEN5050HH were coextruded through a multilayer melt manifold to create a multilayer optical film with 275 alternating first and second optical layers. This 275 layer multi-layer stack was divided into 3 parts and stacked to form 825 layers. The PEN layers were the first optical layers and the CoPEN-5050HH layers were the second optical layers. In addition to the first and second optical layers, a set of non-optical layers, also comprised of CoPEN5050HH were coextruded as PBL (protective boundary layers) on either side of the optical layer stack. Two sets of SA115 skin layers were also coextruded on the outer side of the PBL non-optical layers through additional melt ports. The construction was in order of layers: SA115 skin layer, CoPEN5050HH PBL layer, 825 alternating layers of optical layers of PEN and CoPEN-5050HH, a second CoPEN5050HH PBL layer, and a second SA115 skin layer.

The multilayer extruded film was cast onto a chill roll at 15 meters per minute (45 feet per minute) and heated in an oven at 150° C. (302° F.) for 30 seconds, and then uniaxially oriented at a 5.5:1 draw ratio. After orientation, the drawn multi-layer film was passed through a heat set oven at 200° C. for 15 seconds. A reflective polarizer film of approximately 150 microns (6 mils) thickness was produced. This film was not mechanically brittle, could easily be wound into a film roll, and die cut into film parts without breaking.

Example 4

Multilayer Optical Film—CoPEN9010/SA115/SA115 Reflective Polarizer Film

A multilayer reflective polarizer film was constructed with first optical layers created from a polyethylene naphthalate (CoPEN9010), and with second optical layers and skin layers created from a cycloaliphatic polyester/polycarbonate blend commercially available from Eastman Chemical under the series tradename "SA115".

This CoPEN9010 was coextruded with SA115 through a multilayer melt manifold to create a multilayer optical film with 275 alternating first and second optical layers. The CoPEN9010 layers were the first optical layers and the SA115 layers were the second optical layers. In addition to the first and second optical layers, a set of non-optical layers, also comprised of SA115, were coextruded as PBL (protective boundary layers) on either side of the optical layer stack. Two skin layers comprised of SA115 were also coextruded on the outer side of the PBL non-optical layers through additional melt ports. The construction was in order of layers: SA115 outer skin and PBL layers, 275 alternating optical layers of CoPEN9010 and SA115, and a further set of SA115 PBL and outer skin layers.

The multilayer extruded film was cast onto a chill roll at 22 meters per minute (66 feet per minute) and heated in an oven at 139° C. (283° F.) for 30 seconds, and then nearly truly uniaxially oriented at a 6:1 draw ratio. After orientation, the drawn multi-layer film was passed through a heat set oven at 200° C. for 15 seconds. A reflective polarizer film of approximately 30 microns (1.2 mils) was produced which was not mechanically brittle, could easily be wound into a film roll, and die cut into film parts without breaking.

Description of Polymer Making for Above Examples.
Manufacture of PEN

The polyethylene naphthalate (PEN) used to form the first optical layers was synthesized in a batch reactor with the following raw material charge: dimethyl naphthalene dicarboxylate (136 kg), ethylene glycol (73 kg), manganese (II) acetate (27 g), cobalt (II) acetate (27 g) and antimony (III) acetate (48 g). Under a pressure of 2 atmospheres (1520 torr or 2×105 N/m2), this mixture was heated to 254° C. while removing methanol (a transesterification reaction by-product). After 35 kg of methanol was removed, triethyl phosphonoacetate (49 g) was charged to the reactor and the pressure was gradually reduced to 1 torr (131 N/m2) while heating to 290° C. The condensation reaction by-product, ethylene glycol, was continuously removed until a polymer with an intrinsic viscosity of 0.48 dL/g (as measured in 60/40 wt. % phenol/o-dichlorobenzene) was produced.

Manufacture of CoPEN9010

The copolyethylene naphthalate(CoPEN9010) used to form the first optical layers was synthesized in a batch reactor with the following raw material charge: 126 kg dimethyl naphthalene dicarboxylate, 11 kg dimethyl terephthalate, 75 kg ethylene glycol, 27 g manganese acetate, 27 g cobalt acetate, and 48 g antimony triacetate. Under pressure of 2 atm (2×105 N/m2), this mixture was heated to 254° C. while removing methanol. After 36 kg of methanol is removed, 49 g of triethyl phosphonoacetate was charged to the reactor and than the pressure was gradually reduced to 1 torr while heating to 290° C. The condensation reaction by-product, ethylene glycol, was continuously removed until a polymer with an intrinsic viscosity of 0.50 dL/g, as measured in 60/40 wt. % phenol/o-dichlorobenzene, was produced.

Manufacture of CoPEN5545HD

The copolyethylene-hexamethylene naphthalate polymer (CoPEN5545HD) used to form the second optical layers was synthesized in a batch reactor with the following raw material charge: dimethyl 2,6-naphthalenedicarboxylate (88.5 kg), dimethyl terephthalate (57.5 kg), 1,6-hexane diol (4.7 kg), ethylene glycol (81 kg), trimethylol propane (239 g), cobalt (II) acetate (15 g), zinc acetate (22 g), and antimony (III) acetate (51 g). The mixture was heated to a temperature of 254° C. at a pressure of two atmospheres (2×105 N/m2) and the mixture allowed to react while removing the methanol reaction product. After completing the reaction and removing the methanol (approximately 39.6 kg) the reaction vessel was charged with triethyl phosphonoacetate (37 g) and the pressure was reduced to one torr (263 N/m2) while heating to 290° C. The condensation by-product, ethylene glycol, was continuously removed until a polymer with intrinsic viscosity 0.56 dl/g as measured in a 60/40 weight percent mixture of phenol and o-dichlorobenzene was produced. The CoPEN5545HD polymer produced by this method had a glass transition temperature (Tg) of 94° C. as measured by differential scanning calorimetry at a temperature ramp rate of 20° C. per minute. The CoPEN5050HH polymer had a refractive index of 1.612 at 632 nm.

Manufacture of CoPEN7525HD

The copolyethylene-hexamethylene naphthalate polymer (CoPEN7525HD) used to form the second optical layers was synthesized in a batch reactor with the following raw material charge: dimethyl 2,6-naphthalenedicarboxylate (114.8 kg), dimethyl terephthalate (30.4 kg), 1,6-hexane diol (5.9 kg), ethylene glycol (75 kg), trimethylol propane (200 g), cobalt (II) acetate (15 g), zinc acetate (22 g), and antimony (III) acetate (51 g). The mixture was heated to a temperature of 254° C. at a pressure of two atmospheres (2×105 N/m2) and the mixture allowed to react while removing the methanol reaction product. After completing the reaction and removing the methanol (approximately 39.6 kg) the reaction vessel was charged with triethyl phosphonoacetate (37 g) and the pressure was reduced to one torr (263 N/m2) while heating to 290° C. The condensation by-product, ethylene glycol, was continuously removed until a polymer with intrinsic viscosity 0.52 dl/g as measured in a 60/40 weight percent mixture of phenol and o-dichlorobenzene was produced. The CoPEN7525HD polymer produced by this method had a glass transition temperature (Tg) of 102° C. as measured by differential scanning calorimetry at a temperature ramp rate of 20° C. per minute. The CoPEN7525HD polymer had a refractive index of 1.624 at 632 nm.

Manufacture of CoPEN5050HH

The copolyethylene-hexamethylene naphthalate polymer (CoPEN5050HH) used to form the second optical layers was synthesized in a batch reactor with the following raw material charge: dimethyl 2,6-naphthalenedicarboxylate (80.9 kg), dimethyl terephthalate (64.1 kg), 1,6-hexane diol (15.45 kg), ethylene glycol (75.4 kg), trimethylol propane (2 kg), cobalt (II) acetate (25 g), zinc acetate (40 g), and antimony (III) acetate (60 g). The mixture was heated to a temperature of 254° C. at a pressure of two atmospheres (2×105 N/m2) and the mixture allowed to react while removing the methanol reaction product. After completing the reaction and removing the methanol (approximately 42.4 kg), the reaction vessel was charged with triethyl phosphonoacetate (55 g) and the pressure was reduced to one torr (263 N/m2) while heating to 290° C. The condensation by-product, ethylene glycol, was continuously removed until a polymer with intrinsic viscosity 0.55 dl/g as measured in a 60/40 weight percent mixture of phenol and o-dichlorobenzene was produced. The CoPEN5050HH polymer produced by this method had a glass transition temperature (Tg) of 85° C. as measured by differential scanning calorimetry at a temperature ramp rate of 20° C. per minute. The CoPEN5050HH polymer had a refractive index of 1.601 at 632 nm.

Manufacture of CoPEN-tbia

The synthesis of the CoPEN-tbia polymer was carried out in a batch reactor which was charged with the following materials: dimethyl 2,6-naphthalenedicarboxylate (47.3 kg), dimethyl terephthalate (18.6 kg), 1,4-cyclohexane dimethanol (40.5 kg), neopentyl glycol (15 kg), ethylene glycol (41.8 kg), trimethylol propane (2 kg), cobalt (II) acetate (36.3 g), zinc acetate (50 g), and antimony (III) acetate (65 g). The mixture was heated to a temperature of 254° C. at a pressure of two atmospheres (2×105 N/m2) and the mixture allowed to react while removing the methanol reaction product.

After completing the reaction and removing all of the methanol (approximately 13.1 kg) the reaction vessel was charged with tertiary-butyl isophthalate (43.2 kg). The reaction was continued at 254° C. until approximately 7.4 kg of water was removed and the reaction was complete. The reaction vessel was charged with triethyl phosphonoacetate (70 g) and the pressure was reduced to one torr (263 N/m2) while heating to 290° C. The condensation by-product, ethylene glycol, was continuously removed until a polymer with intrinsic viscosity 0.632 dl/g as measured in a 60/40 weight percent mixture of phenol and o-dichlorobenzene was produced. The CoPEN-tbia polymer produced by this method had a glass transition temperature (Tg) of 102° C. as measured by differential scanning calorimetry at a temperature ramp rate of 20° C. per minute. The CoPEN-tbia polymer had a refractive index of 1.567.

All patents, patent applications, provisional applications, and publications referred to or cited herein are incorporated by in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

The invention claimed is:

1. A method of making an optical film, the method comprising:
    providing a film comprising a polyester-based polymeric material capable of developing birefringence;
    conveying the film along a machine direction while holding opposing edge portions of the film, wherein the film has an intended stretch direction transverse and orthogonal to the machine direction, an in-plane machine direction orthogonal to the stretch direction, and a thickness direction;
    substantially uniaxially orienting the film in the stretch direction while allowing contraction of the film in the in-plane and thickness directions thereof, the oriented film having an initial refractive index in each of the stretch, in-plane, and thickness directions which define an initial relative birefringence of the oriented film; and
    heat setting the substantially uniaxially oriented film, the heat setting thereby altering each of the initial refractive indices in the stretch, in-plane, and thickness directions to a final refractive index in each of the stretch, in-plane, and thickness directions, respectively, the final refractive indices in the stretch, in-plane, and thickness directions defining a final relative birefringence of the heat set film,
    wherein the polyester-based material, a draw ratio and temperature for said uniaxially orienting, and a temperature and time for said heat setting are chosen such that the final relative birefringence is less than the initial relative birefringence, with the chosen heat setting temperature being above the glass transition temperature and below the melting temperature of the polyester-based polymer material, and
    wherein the initial and final relative birefringence are each defined as $|ny-nz|/|nx-nu|$, where nx represents refractive index in the stretch direction, ny represents refractive index in the in-plane direction orthogonal to the stretch direction, nz represents refractive index in the thickness direction, and nu represents the average of ny and nz.

2. The method of claim 1 wherein the heat setting time is between about 1 second and about 10 minutes.

3. The method of claim 1 wherein:
    the film comprises one or more polymeric materials in addition to the polyester-based polymeric material; and
    the step of heat setting comprises heating the film to a temperature above the glass transition temperature and below the melting point of each of the polyester-based and the one or more additional polymeric materials forming the film.

4. The method of claim 1 wherein
    the heat setting temperature is higher than the orienting temperature.

5. The method of claim 1 wherein the polyester-based polymeric material is selected from the group consisting of polyethylene naphthalate, polyethylene terephthalate, and copolymers thereof.

6. The method of claim 1 wherein the polyester-based polymeric material comprises a semicrystalline polymer.

7. The method of claim 1 wherein the film further comprises a polyester/polycarbonate blend.

8. The method of claim 1 wherein the provided film is in roll form.

9. The method of claim 1 wherein the step of providing a film comprises providing the film from an extruder.

10. The method of claim 1 wherein
    the final refractive index in the in-plane direction orthogonal to the stretch direction is greater than the initial refractive index in the in-plane direction orthogonal to the stretch direction.

11. The method of claim 10 wherein the final refractive index in the thickness direction is greater than the initial refractive index in the thickness direction.

12. The method of claim 1 wherein
    the final refractive index in the thickness direction is greater than the initial refractive index in the thickness direction.

13. The method of claim 1 wherein a difference between the final refractive indices in the in-plane and thickness directions is less than a difference between the initial refractive indices in the in-plane and thickness directions.

14. The method of claim 1 wherein
    the final refractive index in the stretch direction is less than the initial refractive index in the stretch direction.

15. The method of claim 1 wherein a difference between the final refractive indices in the stretch and in-plane directions is less than a difference between the initial refractive indices in the stretch and in-plane directions.

16. The method of claim 1 wherein the step of substantially uniaxially orienting the film comprises stretching a non-continuous portion of the film in a tenter apparatus.

17. The method of claim 1 further comprising quenching the heat set film.

18. The method of claim 1 wherein:
    the film comprises a plurality of layers; and the step of heat setting results in an increased adhesion between adjacent layers of the plurality of layers.

19. The method of claim 1 wherein:
    the film has a strain-induced crystallization point, which is a draw ratio at which significant strain-induced crystallization occurs; and
    the draw ratio applied during said orienting is less than the strain-induced crystallization point.

20. The method of claim 19 wherein the strain-induced crystallization point is about 2.2.

21. The method of claim 1 wherein
    the heat setting is conducted while applying stretch to the oriented film in the stretch direction.

22. The method of claim 1 wherein:
    the film comprises an initial density; and
    the step of heat setting results in the film having a final density greater than the initial density.

23. The method of claim 1 wherein:
    the step of providing a film comprises providing the film having a plurality of layers, at least one of the layers comprising an amorphous material; and
    the step of heat setting comprises retaining an amorphous character of the layer comprising the amorphous material.

24. The method of claim 23 wherein the amorphous material comprises polycarbonate or a blend of polycarbonate and copolyester.

25. The method of claim 1 further comprising a second step of heat setting applied to the heat set film.

26. The method of claim 1 wherein the draw ratio is less than about 2.2.

\* \* \* \* \*

UNITED STATES PATENT AND TRADEMARK OFFICE
CERTIFICATE OF CORRECTION

Page 1 of 3

PATENT NO. : 10,350,818 B2
APPLICATION NO. : 14/682622
DATED : July 16, 2019
INVENTOR(S) : William Merrill It is certified that error appears in the above-identified patent and that said Letters Patent is hereby corrected as shown below:

In the Specification

Column 2
Line 19, delete "different," and insert -- different --, therefor.
Line 53, after "of" insert -- reference --.
Line 54, delete "p." and insert -- preference. --, therefor.

Column 3
Line 5 (approx.), delete "respectively," and insert -- respectively. --, therefor.
Line 9 (approx.), delete "napthalate" and insert -- naphthalate --, therefor.
Line 25, delete "Picataway" and insert -- Piscataway --, therefor.

Column 4
Line 33, delete "heat," and insert -- heat --, therefor.
Line 53, after "with" insert -- reference --, therefor.
Line 60, after "with" insert -- reference --, therefor.

Column 9
Line 29, delete "soak," and insert -- soak --, therefor.
Line 57, delete "by )." and insert -- by reference). --, therefor.

Column 10
Line 9, delete "earn" and insert -- cam --, therefor.
Line 13, delete "roiling" and insert -- rolling --, therefor.

Column 11
Line 64, delete "that," and insert -- that --, therefor.

Signed and Sealed this
Fourth Day of February, 2020

Andrei Iancu
*Director of the United States Patent and Trademark Office*

Column 12
Line 10, delete "adjust," and insert -- adjust --, therefor.
Line 13, delete "that," and insert -- that --, therefor.

Column 15
Line 59 (approx.), delete "$x/x_0=(¼)(y/x0)^2+1$" and insert -- $x/x_0=(¼)(y/x_0)^2+1$ --, therefor.

Column 16
Line 20, delete "ma" and insert -- nm. --, therefor.
Line 26, delete "0.01, 0.03" and insert -- 0.01 --, therefor.

Column 17
Line 5, delete "by ." and insert -- by reference. --, therefor.
Line 34, delete "s" and insert -- references --, therefor.
Line 52, delete "trajectories," and insert -- trajectories. --, therefor.

Column 19
Line 36, delete "6.1," and insert -- 6.1. --, therefor.
Line 60, delete "$F_{max}1.5$," and insert -- $F_{max}=1.5$, --, therefor.

Column 20
Line 15, delete "0.822." and insert -- 0.822 --, therefor.
Line 59, delete "$±(x)/(x_1)=(¼)(x_1/x_1)^2+1$" and insert -- $±(x)/(x_1)=(¼)(x_1/x_0)(y/x_1)^2+1$ --, therefor.

Column 23
Line 62, delete "dislosure" and insert -- disclosure --, therefor.

Column 26
Line 27, delete "23," and insert -- 23. --, therefor.
Line 46, delete "disposed," and insert -- disposed --, therefor.

Column 27
Line 29, delete "different," and insert -- different --, therefor.
Line 34, delete "hack" and insert -- back --, therefor.
Line 66, delete "re-position able" and insert -- re-positionable --, therefor.

Column 28
Line 27, delete "and or" and insert -- and/or --, therefor.

Column 29
Line 6, delete "unixial" and insert -- uniaxial --, therefor.
Line 7, delete "by ." and insert -- by reference. --, therefor.
Line 40, delete "enchancement." and insert -- enhancement. --, therefor.

Column 30
Line 38, delete "by ." and insert -- by reference. --, therefor.

Column 31
Line 25 (approx.), delete "to" and insert -- reference to --, therefor.
Line 39 (approx.), delete "birefirengent" and insert -- birefringent --, therefor.
Line 62 (approx.), delete "indicies," and insert -- indices, --, therefor.

Column 32
Line 33, delete "to" and insert -- reference to --, therefor.
Line 39, delete "and or" and insert -- and/or --, therefor.

Column 35
Line 13 (approx.), delete "try" and insert -- ny --, therefor.

Column 39
Line 26, delete "1st" and insert -- $1^{st}$ --, therefor.

Column 40
Line 8, delete "uncontrained" and insert -- unconstrained --, therefor.
Line 21, delete "uncontrained" and insert -- unconstrained --, therefor.

Column 41
Line 49, delete "chili" and insert -- chill --, therefor.
Line 50, delete "15meters" and insert -- 15 meters --, therefor.

Column 43
Line 23, delete "than" and insert -- then --, therefor.

Column 45
Line 1, delete "by" and insert -- by reference --, therefor.